US012545563B1

(12) United States Patent
Yang et al.

(10) Patent No.: US 12,545,563 B1
(45) Date of Patent: Feb. 10, 2026

(54) ALIGNING METHOD, CONTROLLER, AND MATERIAL HANDLING EQUIPMENT

(71) Applicant: VisionNav Robotics USA Inc., Acworth, GA (US)

(72) Inventors: Bingchuan Yang, Acworth, GA (US); Yujie Lu, Acworth, GA (US); Mu Fang, Acworth, GA (US); Siqi Yang, Acworth, GA (US); Yong'an Shi, Acworth, GA (US); Jiexiong Deng, Acworth, GA (US); Jianbin Wang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/184,262

(22) Filed: Apr. 21, 2025

Related U.S. Application Data

(63) Continuation of application No. PCT/IB2025/052917, filed on Mar. 20, 2025.

(30) Foreign Application Priority Data

Jan. 27, 2025 (CN) .......................... 202510127556.5

(51) Int. Cl.
*B66F 9/06* (2006.01)
*B66F 9/075* (2006.01)
(Continued)

(52) U.S. Cl.
CPC ............... *B66F 9/063* (2013.01); *B66F 9/06* (2013.01); *B66F 9/0755* (2013.01); *B66F 9/142* (2013.01);
(Continued)

(58) Field of Classification Search
CPC .......... B66F 9/063; B66F 9/0755; B66F 9/06; B66F 9/142; G05D 1/667; G05D 2107/70;
(Continued)

(56) References Cited

U.S. PATENT DOCUMENTS

2025/0019214 A1* 1/2025 Nagai .................. B65G 1/0492

FOREIGN PATENT DOCUMENTS

CN     106671906 A  *  5/2017  ............... G05D 1/12
CN     115123839 B     12/2022
(Continued)

*Primary Examiner* — Thomas Randazzo
(74) *Attorney, Agent, or Firm* — Westbridge IP LLC

(57) ABSTRACT

Disclosed are an aligning method, a controller, and material handling equipment. A major technical solution includes: acquiring target data of a first stacking object and a second stacking object by using a first sensor; extracting, from the target data, first target data of the first stacking object and second target data of the second stacked object; calculating a relative pose of the first stacking object relative to the second stacking object based on the first target data and the second target data; and controlling, based on the relative pose, material handling equipment to move, to align the first stacking object with the second stacking object. In the present disclosure, a relative pose between two stacking objects is corrected by simultaneously acquiring and processing target data of the two stacking objects, thereby significantly improving accuracy and efficiency of a stacking operation.

21 Claims, 23 Drawing Sheets

(51) Int. Cl.
  *B66F 9/14*    (2006.01)
  *G01S 17/894*  (2020.01)
  *G05D 1/667*   (2024.01)
  *G06T 7/60*    (2017.01)
  *G06T 7/73*    (2017.01)
  *G05D 107/70*  (2024.01)

(52) U.S. Cl.
  CPC .............. *G05D 1/667* (2024.01); *G06T 7/60* (2013.01); *G06T 7/73* (2017.01); *G01S 17/894* (2020.01); *G05D 2107/70* (2024.01); *G06T 2207/30261* (2013.01)

(58) Field of Classification Search
  CPC ... G06T 7/60; G06T 7/73; G06T 2207/30261; G01S 17/894
  See application file for complete search history.

(56) References Cited

FOREIGN PATENT DOCUMENTS

| | | | | |
|---|---|---|---|---|
| CN | 115924452 | A |   | 4/2023 |
| CN | 115973638 | A |   | 4/2023 |
| CN | 119976700 | A | * | 5/2025 |
| EP | 3309112 | A1 | * | 4/2018 ............ G05D 1/242 |
| JP | 2022170047 | A | * | 11/2022 ............... B66F 9/24 |
| JP | 2022179331 | A | * | 12/2022 ............... B66F 9/24 |
| JP | 7517236 | B2 | * | 7/2024 ............... B66F 9/24 |
| KR | 20120070804 | A | * | 7/2012 ............... B66F 9/24 |

* cited by examiner

ALIGNING METHOD, CONTROLLER, AND MATERIAL HANDLING EQUIPMENT

CROSS-REFERENCE TO RELATED APPLICATIONS

This application is a continuation of International Application No. PCT/IB2025/052917, filed on Mar. 20, 2025, which claims priority to Chinese Patent Application No. 202510127556.5, filed on Jan. 27, 2025. The disclosures of the aforementioned applications are hereby incorporated by reference in their entireties.

TECHNICAL FIELD

The present disclosure relates to the field of warehouse logistics technologies, and in particular, to an aligning method, a controller, and material handling equipment.

BACKGROUND

A system that uses material handling equipment such as an automated guided vehicle (AGV) during operation has advantages such as being highly unmanned, automated, and intelligent, which improves production efficiency and an operational level in industries such as warehousing, manufacturing, and logistics. In a typical scenario, material handling equipment is often responsible for moving various goods, during which stacking of goods is inevitably involved. The goods are usually packed by using a cardboard box or the like, or stored by using a material cage, a wooden box, a plastic box, or the like.

In consideration of space utilization, stacking objects such as cardboard boxes, material cages, and wooden boxes that are loaded with goods may be stacked in a process of moving the goods by the material handling equipment. In view of stability, the material handling equipment is required to accurately stack one stacking object onto another stacking object. In this process, if the two stacking objects cannot be aligned, operation safety may be affected.

SUMMARY

The present disclosure provides a controlling method for material handling equipment, a controller, and material handling equipment.

The present disclosure provides the following solutions.

According to a first aspect, a controlling method for material handling equipment is provided, including: acquiring a distance in a first direction between the material handling equipment and a stacking end point in real time; controlling only material handling equipment body to move when the distance in the first direction between the material handling equipment and the stacking end point is greater than a preset first distance threshold; and controlling a fork to move in a second direction while controlling the material handling equipment body to move when the distance in the first direction between the material handling equipment and the stacking end point is not greater than the first distance threshold.

According to a second aspect, a controller is provided. The controller is configured to execute program instructions to implement the steps of the method in any implementation of the first aspect.

According to a third aspect, material handling equipment is provided, including a controller. The controller is configured to execute program instructions to implement the steps of the method in any implementation of the first aspect.

BRIEF DESCRIPTION OF THE DRAWINGS

To describe the technical solutions in the embodiments of the present disclosure or in the conventional technology more clearly, the following briefly describes the accompanying drawings required for describing the embodiments. Apparently, the accompanying drawings in the following description only show some embodiments of the present disclosure, and a person of ordinary skill in the art may still derive other drawings from these accompanying drawings without creative efforts.

DETAILED DESCRIPTION OF THE EMBODIMENTS

The following clearly and completely describes the technical solutions in embodiments of the present disclosure with reference to the accompanying drawings in embodiments of the present disclosure. Apparently, the described embodiments are merely some but not all of embodiments of the present disclosure. All other embodiments obtained by persons of ordinary skill in the art based on the embodiments of the present disclosure shall fall within the protection scope of the present disclosure.

Terms used in the embodiments of the present disclosure are merely intended to describe specific embodiments, but are not intended to limit the present disclosure. The singular forms of "a/an", "said", and "the" used in embodiments of the present disclosure and the appended claims are also intended to include plural forms, unless the context clearly implies otherwise.

It should be understood that, the term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects. In addition, the term "based on" used in this specification is not limited to being based on an object only. For example, determining B based on A may indicate: determining B directly based on A only, or determining B partially based on A.

In a related technology, stacking of two stacking objects is implemented mainly by detecting a pose of a stacking object located below. Such method may cause that two stacking objects cannot be completely aligned with each other due to an impact of a factor such as an inaccurate pickup pose of a stacking object located above, uneven ground, a cumulative error of an odometer, or an error of material handling equipment, thereby affecting operation safety.

In view of this, the present disclosure provides a new idea, and provides an aligning method, a controller, and material handling equipment.

Figure 1:
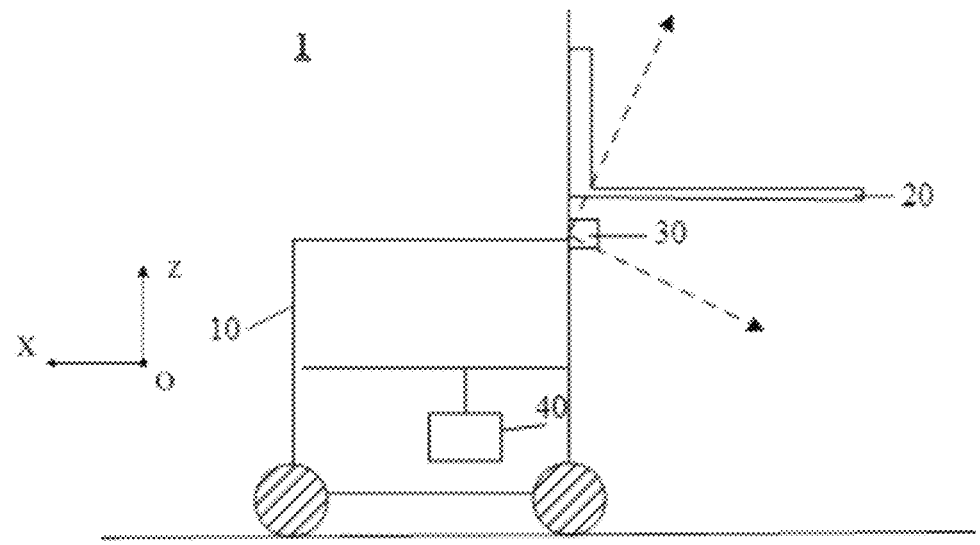
FIG. 1 is a schematic structural diagram of material handling equipment according to an embodiment of the present disclosure.

The method provided in embodiments of the present disclosure may be applied to material handling equipment shown in FIG. 1. FIG. 1 is a schematic structural diagram of material handling equipment according to an embodiment of the present disclosure. As shown in FIG. 1, the material handling equipment 1 may stack a first stacking object A onto a second stacking object B. The material handling equipment 1 includes material handling equipment body 10, a sensor 30, a stacking execution component 20, a controller 40. The controller 40 may be a system or device that performs computation or control functions, such as a control mainboard, a control box, a control unit, a vehicle-mounted computer, a computing platform, a tablet computer, or a computer on the material handling equipment body 10, or a system or device that performs computation or control functions in a local server or cloud server, or a handheld controller or remote controller, or in other forms. For example, the controller 40 may include a memory and a processor. The memory may be configured to store program instructions, and the controller 40 may be configured to execute the program instructions to implement the methods provided by embodiments of the present disclosure, which is not limited in embodiments of the present disclosure.

The material handling equipment 1 in embodiments of the present disclosure may be an automated guided forklift, a pallet truck, a crane truck, an Automated Guided Vehicle (AGV), an Autonomous Mobile Robot (AMR), a humanoid robot, or the like. A corresponding stacking execution component 20 may be a fork, a robotic arm, or the like.

Generally, the material handling equipment 1 receives a handling task from a Robot Control System (RCS). After receiving the handling task, the material handling equipment 1 may be controlled by the controller 40 to perform the handling task. For example, the material handling equipment 1 is controlled to first move to the first stacking object A, and pick up the first stacking object A by using the stacking execution component 20. Then the material handling equipment 1 may be controlled to move the first stacking object A close to the second stacking object B, and stack the first stacking object A onto the second stacking object B.

The RCS may be integrated into the material handling equipment 1, and forms a whole with the material handling equipment 1, or may be separately used as a device different from the material handling equipment 1. For example, the RCS may be a device such as a tablet computer, a notebook computer, a personal computer (Personal Computer, PC), a local server, or a cloud server, which is not limited in embodiments of the present disclosure.

The sensor 30 may be in a form of a sensor module, and may include radar for collecting point cloud data, for example, Lidar. The Lidar may be installed on the stacking execution component 20, to facilitate collection of point cloud data. Further, the Lidar may be a three-dimensional Lidar. The sensor 30 may also include a camera for collecting image data. The camera may be installed on the stacking execution component 20, to facilitate collection of image data. The sensor 30 may also include a pressure sensor for collecting pressure data, and the pressure sensor may be installed on the stacking execution component 20.

The memory may be further configured to store data collected by the sensor 30, such as point cloud data, image data, or pressure data. For example, the memory may be a non-volatile computer storage medium.

The following describes concepts of terms involved in embodiments of the present disclosure.

A processor is configured to be responsible for performing core functions such as computation, control, and decision-making. It may receive data from sensors, run control algorithms, and command actuators to complete tasks. Common types of processors may include central processing unit (CPU), digital signal processor (DSP), microcontroller unit (MCU), etc. A processor in this specification refers to a collection of processors used to perform the same or different tasks.

A memory is configured to store data or programs, etc. The memory in this specification refers to a collection of memory used to perform the same or different tasks.

A controller typically includes a processor and memory at a hardware level. Optionally, the controller may also include input/output interfaces, a motherboard, peripheral circuits, and components. At a software level, the controller usually includes control algorithms, operating systems, communication protocols, and other parts. The controller in this specification refers to a set of controllers used to perform the same or different tasks.

A control system refers to an integrated set of software and hardware used to ensure that robots are controlled according to predetermined goals or strategies during task execution, which may include controllers, sensors, and actuators. Optionally, the control system may also include peripheral circuits, wiring harnesses, etc.

Material handling equipment refers to equipment that is capable of automatically or semi automatically performing handling tasks. Common forms of the material handling equipment include forklifts, Automated Guided Vehicles (AGVs), Autonomous Mobile Robots (AMRs), humanoid robots, and robotic arms.

An Automated Guided Forklift (AGF) refers to an intelligent industrial vehicle that integrates forklift technology and Automated Guided Vehicle (AGV) technology. It can automatically complete tasks such as material handling and stacking.

Stacking refers to arranging and piling up some objects vertically according to a specific rule.

A stacking object refers to an object involved in stacking, and specifically may be goods itself or goods with a simple package such as a wrapping film, or may be a container that can hold and carry goods, for example, a material cage, a wooden box, a plastic box, or a pallet.

A stacking process refers to a process in which material handling equipment lifts a first stacking object to make the first stacking object move close to a second stacking object, and then adjusts a pose of the material handling equipment to align the first stacking object with the second stacking object, and thus places the first stacking object on the second stacking object, so as to complete stacking.

The first stacking object refers to a stacking object located above another. The second stacking object refers to a stacking object located below.

Stacking state refers to a relative position state of two stacking object in a stacking process.

Alignment means a state in which two or more stacking objects are arranged in a vertical direction, and at least part of border lines of a stacking object are parallel to or overlapped with another stacking object. The vertical direction refers to a Z-axis direction (namely, a height direction of the material handling equipment) in a coordinate system of material handling equipment.

The first stacking object has a first target region, a third target region, a fifth target region, and a seventh target region, which are specific regions that are used for detection and analysis on the first stacking object. For example, the specific regions may include key structural regions of the first stacking object, such as a border structure, a foot cup, an upright, and a corner structure.

The second stacking object has a second target region, a fourth target region, a sixth target region, and an eighth target region, which are specific regions that are used for detection and analysis on the first stacking object. For example, the specific regions may include key structural regions of the first stacking object, such as a border structure, a foot cup, an upright, and a corner structure.

It should be further noted that, in embodiments of the present disclosure, in addition to being goods or a container that holds goods, the second stacking object may also be a stationary base that serves as a basis for stacking in addition to goods or a container that holds goods.

Figure 2:
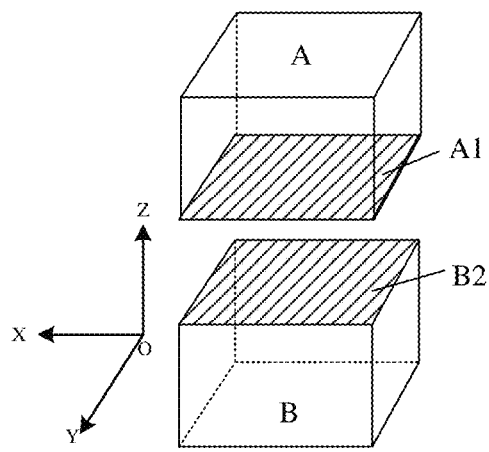
FIG. 2 is a schematic diagram of a first target region and a second target region.

FIG. 2 is a schematic diagram of a first target region and a second target region. As shown in FIG. 2, a stacking object A located above is the first stacking object, a stacking object B located below is the second stacking object. A bottom structural region of the first stacking object is the first target region A1, and a top structural region of the second stacking object is the second target region B2.

Figure 3:
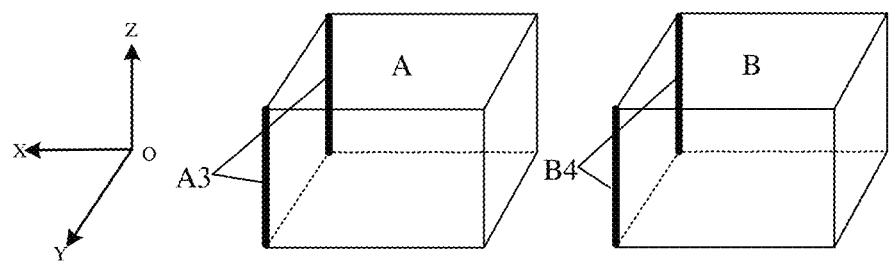
FIG. 3 is a schematic diagram of a third target region and a fourth target region.

FIG. 3 is a schematic diagram of a third target region and a fourth target region. As shown in FIG. 3, a stacking object A is the first stacking object, and a stacking object B is the second stacking object. When a controller controls material handling equipment to move to a pickup position, structural regions (such as an upright or a socket) on two sides of the stacking object A are the third target region A3, as viewed along a length direction of the material handling equipment (namely, a travel direction of the material handling equipment). When the controller controls the material handling equipment to transport the first stacking object to a stacking preparation position, structural regions (such as an upright and a socket) on two sides of the stacking object B are the fourth target region B4, as viewed along the length direction of the material handling equipment.

Figure 4A:
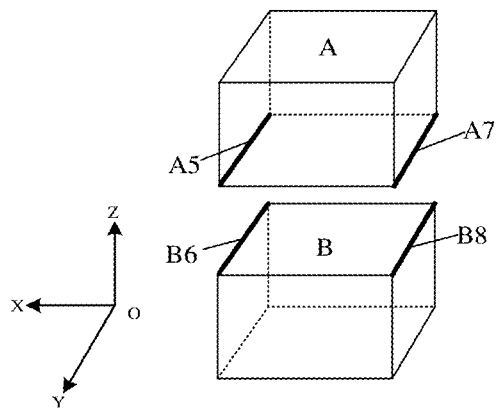
FIG. 4a is a schematic diagram of a fifth target region, a sixth target region, a seventh target region, and an eighth target region according to an embodiment of the present disclosure.
Figure 4B:
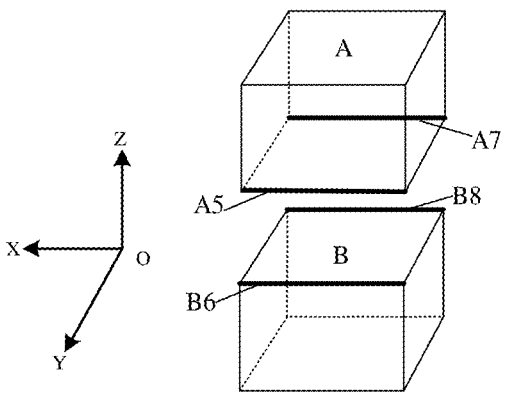
FIG. 4b is a schematic diagram of a fifth target region, a sixth target region, a seventh target region, and an eighth target region according to another embodiment of the present disclosure.

FIG. 4a is a schematic diagram of a fifth target region, a sixth target region, a seventh target region, and an eighth target region according to an embodiment. FIG. 4b is a schematic diagram of a fifth target region, a sixth target region, a seventh target region, and an eighth target region according to another embodiment. As shown in FIG. 4a and FIG. 4b, a stacking object A located above is a first stacking object, and a stacking object B located below is a second stacking object. A bottom structural region on one side of the first stacking object is a fifth target region A5, a bottom structural region on the other side of the first stacking object is a seventh target region A7, a top structural region on one side of the second stacking object is a sixth target region B6, and a top structural region on the other side of the second stacking object is an eighth target region B8. The fifth target region A5 and the seventh target region A7 are respectively located on opposite sides of the first stacking object. The sixth target region B6 and the eighth target region B8 are respectively located on opposite sides of the second stacking object. In a stacking process, both the fifth target region A5 and the sixth target region B6 are on one side, and both the seventh target region A7 and the eighth target region B8 are on the other side. FIG. 4a and FIG. 4b respectively show two different target region configuration manners.

In addition, the fifth target region and the seventh target region may alternatively be located on two adjacent sides of the first stacking object, and the sixth target region and the eighth target region may alternatively be located on two adjacent sides of the second stacking object.

It should be noted that, in embodiments of the present disclosure, as shown in FIG. 1, in a coordinate system in which a geometric center of the material handling equipment 1 is an origin O, a forward-backward travel direction (namely, a first direction of the material handling equipment body 10) of the material handling equipment is defined as an X-axis, where a positive direction of the X-axis is a direction away from an attachment (for example, a fork) of the material handling equipment 1. A lateral direction of the material handling equipment 1 (namely, a second direction of the material handling equipment body 10) is defined as a Y-axis, where a positive direction of the Y-axis is perpendicular to the page, pointing outwards (not shown in the figure); and a height direction of the material handling equipment 1 is defined as a Z-axis.

Target data refers to data, acquired by a first sensor, of a target region of a stacking object, and includes point cloud data and/or image data.

First target data refers to data, acquired by the first sensor, of the first target region of the first stacking object, and includes point cloud data and/or image data. The first target data may be used for calculating a pose, a stacking state, and the like of the first stacking object.

Third target data refers to data, acquired by the first sensor, of the third target region of the first stacking object, and includes point cloud data and/or image data. The third target data may be used for calculating a pose of the first stacking object.

Fifth target data refers to data, acquired by the first sensor, of the fifth target region of the first stacking object, and includes point cloud data and image data. The fifth target data may be used for calculating a pose, a stacking state, and the like of the first stacking object.

Seventh target data refers to data, acquired by the first sensor, of the seventh target region of the first stacking object, and includes point cloud data and/or image data. The seventh target data may be used for calculating a pose, a stacking state, and the like of the first stacking object.

Second target data refers to data, acquired by the first sensor, of the second target region of the second stacking object, and includes point cloud data and/or image data. The second target data may be used for calculating a pose, a stacking state, and the like of the second stacking object.

Fourth target data refers to data, acquired by the first sensor, of the fourth target region of the second stacking object, and includes point cloud data and/or image data. The fourth target data may be used for calculating a pose of the second stacking object.

Sixth target data refers to data, acquired by the first sensor, of the sixth target region of the second stacking object, and includes point cloud data and/or image data. The sixth target data may be used for calculating a pose, a stacking state, and the like of the second stacking object.

Eighth target data refers to data, acquired by the first sensor, of the eighth target region of the second stacking object, and includes point cloud data and/or image data. The eighth target data may be used for calculating a pose, a stacking state, and the like of the second stacking object.

In addition, in a stacking process, the following positions are involved in embodiments of the present disclosure.

Pickup position refers to a position where material handling equipment picks up the first stacking object by using a fork.

Stacking preparation region refers to a region, available for stacking the first stacking object, of the second stacking object.

Stacking preparation position refers to a position where material handling equipment is located before reaching a stacking operation position, and where the material handling equipment can acquire a pose of the second stacking object.

Stacking operation position refers to a position where the first sensor on the material handling equipment may acquire target data of both the first stacking object and the second stacking object.

Figure 5:
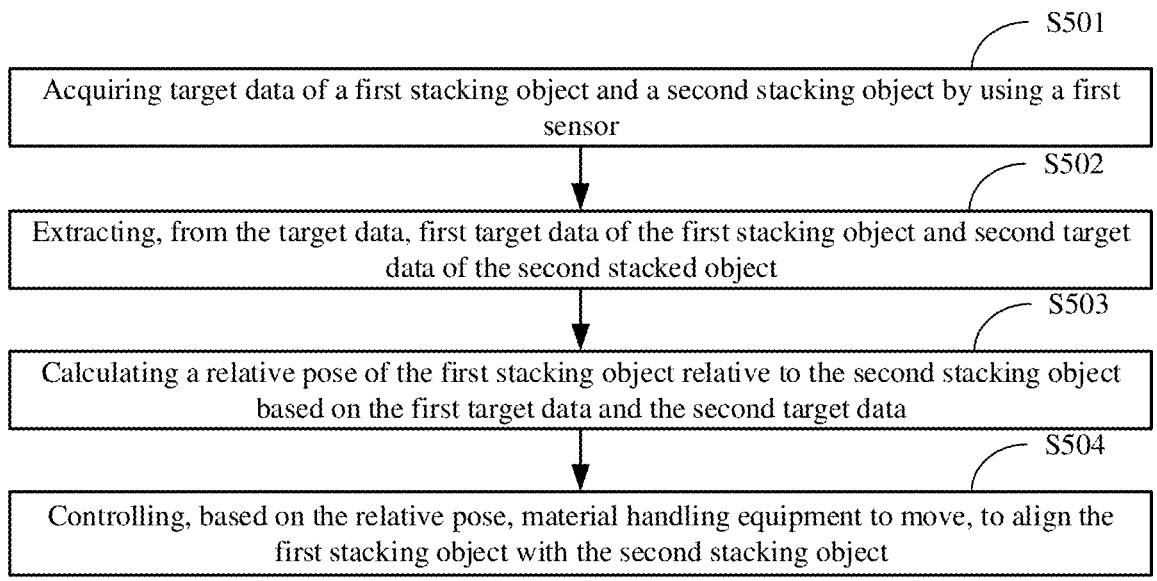
FIG. 5 is a flowchart of a method for aligning a first stacking object and a second stacking object according to an embodiment of the present disclosure.

FIG. 5 is a flowchart of an aligning method according to an embodiment of the present disclosure. As shown in FIG. 5, the method may include the following steps.

Step S501: acquiring target data of a first stacking object and a second stacking object by using a first sensor.

Step S502: extracting, from the target data, first target data of the first stacking object and second target data of the second stacked object.

Step S503: calculating a relative pose of the first stacking object relative to the second stacking object based on the first target data and the second target data.

Step S504: controlling, based on the relative pose, material handling equipment to move, to align the first stacking object with the second stacking object.

It may be learned from the foregoing procedure that, in the present disclosure, a controller acquires target data of two stacking objects by using a first sensor, and extracts first target data of a first stacking object and second target data of a second stacking object from the target data. Further, the controller calculates a relative pose of the first stacking object relative to the second stacking object, and controls, based on the relative pose, material handling equipment to move, to align the first stacking object with the second stacking object. Compared with an existing solution, in the present disclosure, a relative pose between two stacking objects is corrected by simultaneously acquiring and processing target data of the two stacking objects, thereby significantly improving accuracy and efficiency of a stacking operation.

The following describes in detail steps in the foregoing procedure and effects that can be further generated with reference to embodiments. It should be noted that terms such as "first" and "second" in the present disclosure do not have limitations on a size, a sequence, a quantity, or the like, but are merely used to distinguish between names. For example, "first stacking object" and "second stacking object" are used to distinguish between two stacking objects; and "first target data", "second target data", and "fourth target data" are used to distinguish between different pieces of target data.

The "acquiring the target data of the first stacking object and the second stacking object by using the first sensor" in Step S501 is described in detail with reference to embodiments.

Figure 28:
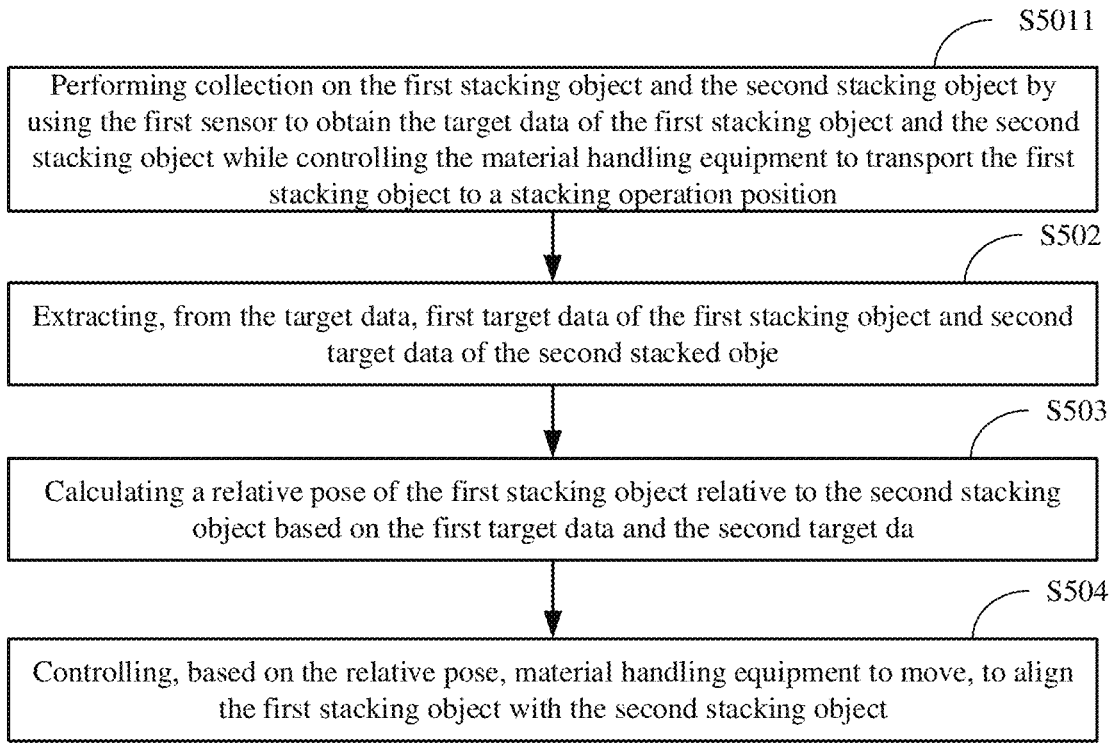
FIG. 28 is a flowchart of a method for aligning a first stacking object and a second stacking object according to another embodiment of the present disclosure.

In embodiments of the present disclosure, the first sensor is used to acquire the target data of the first stacking object and the second stacking object. Specifically, as shown in FIG. 28, step S501 may include the following steps.

Step S5011: performing collection on the first stacking object and the second stacking object by using the first sensor to obtain the target data of the first stacking object and the second stacking object while controlling the material handling equipment to transport the first stacking object to a stacking operation position.

Figure 29:
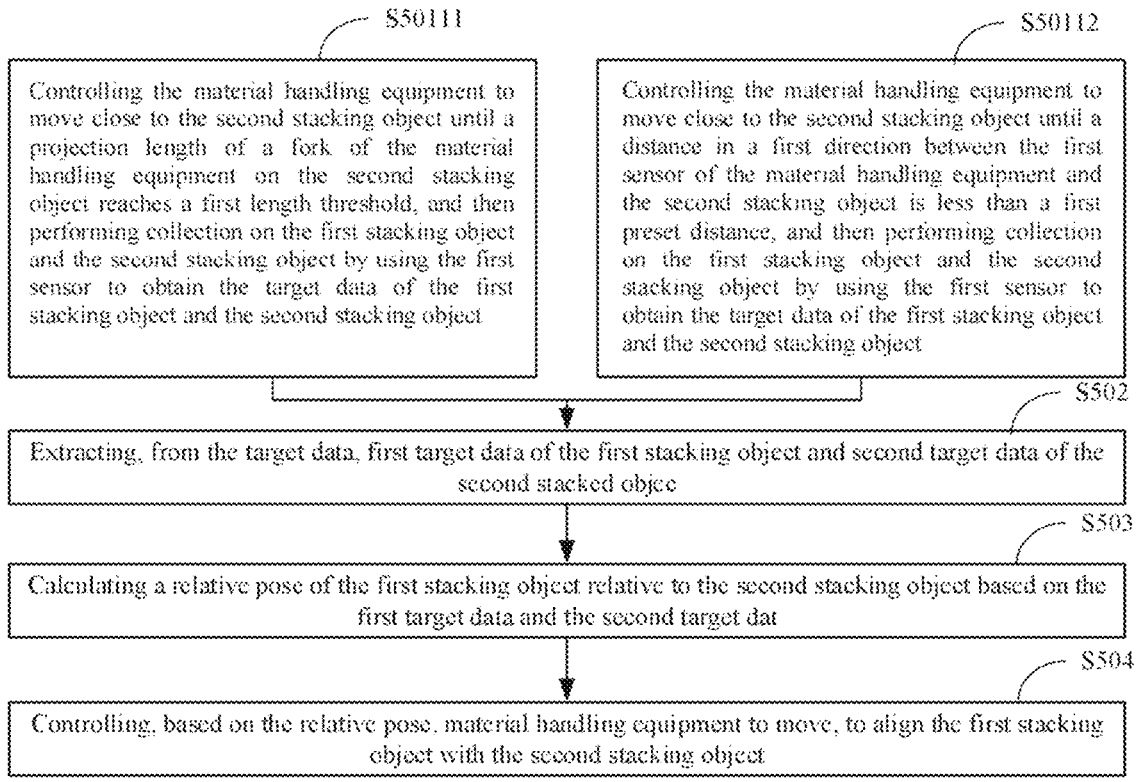
FIG. 29 is a flowchart of a method for aligning a first stacking object and a second stacking object according to still another embodiment of the present disclosure.

In an implementation, as shown in FIG. 29, the controlling the material handling equipment to move the first stacking object to the stacking operation position specifically includes the following steps.

Step S50111: controlling the material handling equipment to move close to the second stacking object until a projection length of a fork of the material handling equipment on the second stacking object reaches a first length threshold, and then performing collection on the first stacking object and the second stacking object by using the first sensor to obtain the target data of the first stacking object and the second stacking object.

Figure 6:
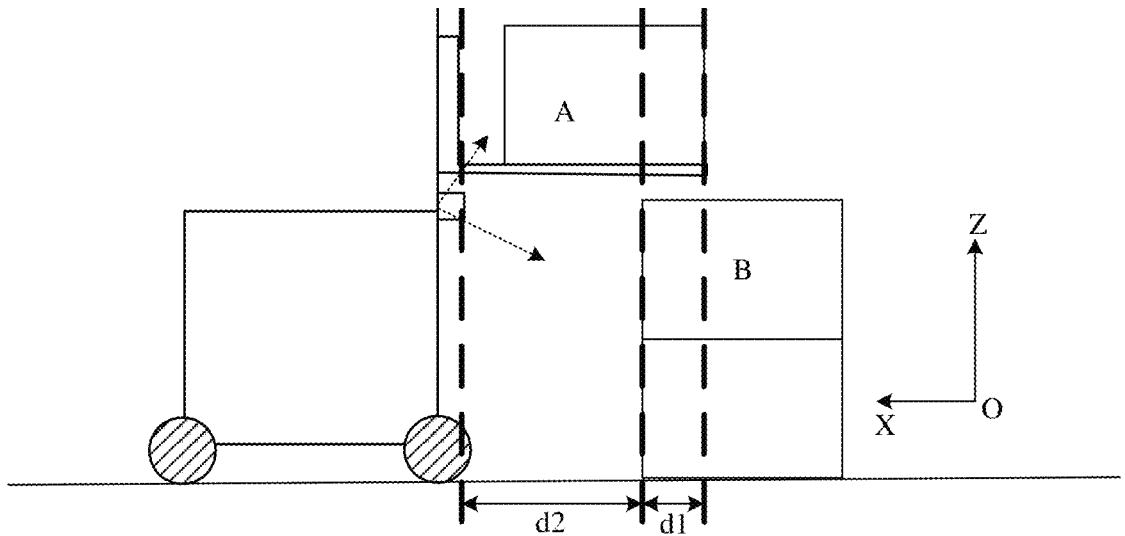
FIG. 6 is a schematic diagram in which material handling equipment moves a first stacking object to a stacking operation position.

FIG. 6 is a schematic diagram in which material handling equipment moves a first stacking object to a stacking operation position. As shown in FIG. 6, a projection length d1 of a fork of the material handling equipment on a second stacking object B reaches a first length threshold. In this case, a position where the material handling equipment is located is the stacking operation position. In embodiments of the present disclosure, the first length threshold may be set to 10 cm to 30 cm. It should be noted that, in embodiments of the present disclosure, the first length threshold is set within 10 cm to 30 cm in order to ensure that the first sensor may be located at an optimal detection distance, so that the material handling equipment may be rapidly adjusted in an alignment phase, thereby improving alignment efficiency and accuracy. In an actual application, the first length threshold may be set according to an actual requirement, which is not limited in embodiments of the present disclosure.

In another implementation, the controller controlling the material handling equipment to move the first stacking object to the stacking operation position specifically includes the following steps.

Step S50112: controlling the material handling equipment to move close to the second stacking object until a distance in a first direction between the first sensor of the material handling equipment and the second stacking object is less than a first preset distance, and then performing collection on the first stacking object and the second stacking object by using the first sensor to obtain the target data of the first stacking object and the second stacking object.

Still using FIG. 6 as an example, when a distance d2 along the first direction between the first sensor of the material handling equipment and the second stacking object reaches the first preset distance, a position where the material handling equipment is located is the stacking operation position.

When the material handling equipment arrives at the stacking operation position, an alignment phase starts. The first sensor starts to collect the target data of the first stacking object and the second stacking object, to make the first stacking object and the second stacking object be aligned based on the collected target data.

The first sensor in embodiments of the present disclosure may include a radar module and/or a camera (Camera) module. The radar module may include one or more radars, and the radar herein may be a Lidar, for example, a 3D Lidar. The camera module may include one or more cameras. A specific form of the first sensor is not limited in embodiments of the present disclosure.

When the first sensor is a 3D Lidar, the target data may be point cloud data, and the point cloud data includes 3D geometric information of the first stacking object and the second stacking object. When the first sensor is a camera, the target data may include image data. When the first sensor is a combination of a 3D Lidar and a camera, the target data includes point cloud data and image data.

Further, the material handling equipment may further go through a pickup phase and a pre-alignment phase before entering the alignment phase.

Figure 30:
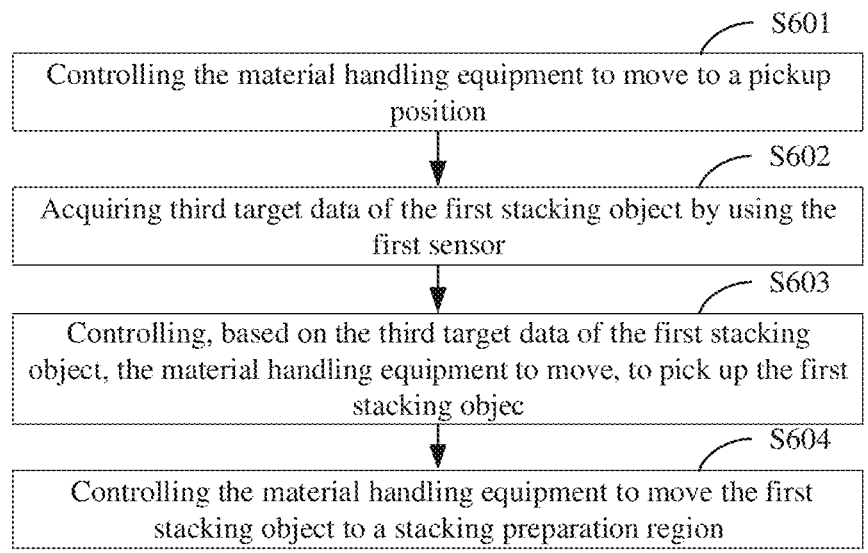
FIG. 30 is a flowchart of a pickup phase provided by an embodiment of the present disclosure.

In the pickup phase, as shown in FIG. 30, the controller may be configured to execute the following steps.

Step S601: controlling the material handling equipment to move to a pickup position.

Step S602: acquiring third target data of the first stacking object by using the first sensor.

Step S603: controlling, based on the third target data of the first stacking object, the material handling equipment to move, to pick up the first stacking object.

Step S604: controlling the material handling equipment to move the first stacking object to a stacking preparation region. Specifically, the first stacking object may be moved to the front of the second stacking object, for example, to a position within 5 m from the second stacking object.

In a handling process, step S604 may include the following step.

Step S6041: controlling, in a handling process, a material handling equipment body to move while lifting the first stacking object.

Figure 31:
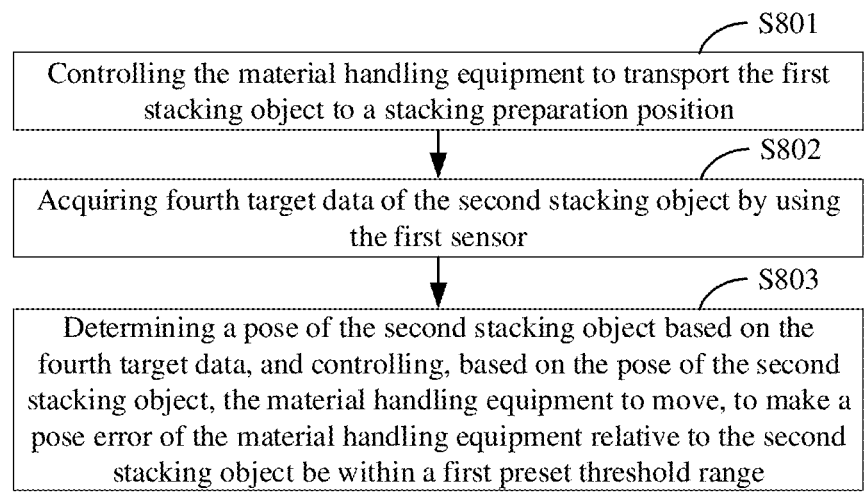
FIG. 31 is a flowchart of a pre-alignment phase provided by an embodiment of the present disclosure.

In the pre-alignment phase, as shown in FIG. 31, the controller may be configured to execute the following steps.

Step S801: controlling the material handling equipment to transport the first stacking object to a stacking preparation position.

Step S802: acquiring fourth target data of the second stacking object by using the first sensor.

Step S803: determining a pose of the second stacking object based on the fourth target data, and controlling, based on the pose of the second stacking object, the material handling equipment to move, to make a pose error of the material handling equipment relative to the second stacking object be within a first preset threshold range.

The pose error of the material handling equipment relative to the second stacking object refers to positioning and an orientation of the material handling equipment relative to the second stacking object in a three-dimensional space. Specifically, the pose error includes a coordinate difference ($\Delta y1$) in the Y-axis and a rotation angle difference ($\Delta\theta1$) in the Z-axis between the material handling equipment and the second stacking object.

Optionally, the first preset threshold range may be set as follows: a Y-axis coordinate difference is within a range of a threshold of ±10 cm, that is, $-10\ cm<\Delta y1<10\ cm$, and a Z-axis rotation angle difference is within a range of a threshold of ±5°, that is, $-5°<\Delta\theta1<5°$.

It should be noted that, the threshold range is only an example and may be adjusted depending on different stacking objects and material handling equipment in practice.

The "extracting, from the target data, the first target data of the first stacking object and the second target data of the second stacked object" in Step S502 is described below in detail with reference to the embodiment.

After acquiring the target data, the controller is required to extract the first target data of the first stacking object and the second target data of the second stacking object from the target data.

Optionally, the first target data may be data of a first target region of the first stacking object, and the second target data may be data of a second target region of the second stacking object.

The first target region refers to a bottom stacking structure of the first stacking object, and the second target region refers to a top stacking structure of the second stacking object.

For example, both the first stacking object and the second stacking object are material cages. Because a material cage is generally a frame structure, the bottom stacking structure of the first stacking object refers to a bottom frame structure, and the top stacking structure of the second stacking object refers to a top frame structure.

In addition, when the second stacking object is a static base, the second target region refers to a boundary line on a top surface of the static base.

The "calculating the relative pose of the first stacking object relative to the second stacking object based on the first target data and the second target data" in Step S503 is described below in detail with reference to embodiments.

After extracting the first target data and the second target data from the target data, the controller may determine a pose of the first stacking object based on the first target data and a pose of the second stacking object based on the second target data, and then calculate the relative pose between the first stacking object and the second stacking object by comparing the pose of the first stacking object and the pose of the second stacking object.

In an implementation, when the first sensor is a combination of a 3D Lidar and a camera, the obtained target data of the first stacking object and the second stacking object includes an image and a point cloud of the first stacking object and an image and a point cloud of the second stacking object.

Figure 7:
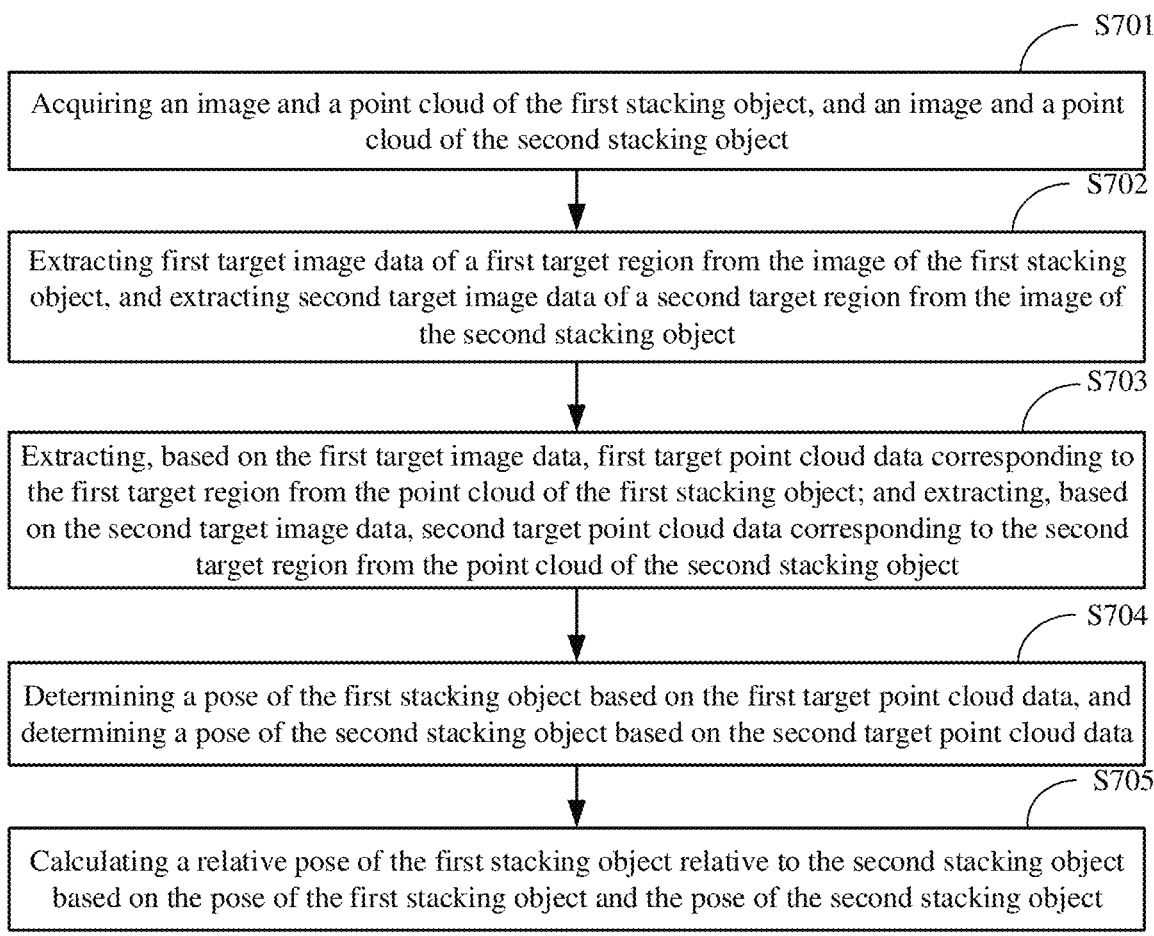
FIG. 7 is a flowchart of calculating a relative pose of a first stacking object relative to a second stacking object according to an embodiment of the present disclosure.

FIG. 7 is a flowchart of calculating a relative pose of a first stacking object relative to a second stacking object according to an embodiment of the present disclosure. As shown in FIG. 7, calculating the relative pose of the first stacking object relative to the second stacking object may be implemented in the following manner.

Step S701: acquiring an image and a point cloud of the first stacking object, and an image and a point cloud of the second stacking object.

When the controller controls material handling equipment to move the first stacking object to a stacking operation position and controls the material handling equipment to lift the first stacking object. A radar scans the first stacking object and the second stacking object to acquire point clouds of the first stacking object and the second stacking object, and simultaneously a camera shoots the first stacking object and the second stacking object to acquire images of the first stacking object and the second stacking object.

Considering distortions in the images and the point clouds collected when the camera shoots and the radar scans the first stacking object and the second stacking object simultaneously, in embodiments of the present disclosure, the acquiring the image and the point cloud of the first stacking object, and the image and the point cloud of the second stacking object may specifically include: acquiring, by the camera, an original image of the first stacking object and an original image of the second stacking object, and acquiring, by the radar, an original point cloud of the first stacking object and an original point cloud of the second stacking object; performing distortion correction on the original images based on a pre-calibrated camera intrinsic parameter; transforming the original point clouds from a coordinate system in which the radar is located to a coordinate system in which the material handling equipment is located, and performing distortion correction on the original point clouds based on odometer information and time stamps corresponding to the original images; and performing time synchronization between the distortion-corrected images and the distortion-corrected point clouds, to obtain images and point clouds that are time-synchronized.

Herein, a time stamp corresponding to an original image may be a time stamp at which the camera captures the original image (that is, the original image of the first stacking object or the original image of the second stacking object). Camera intrinsic parameters, also referred to as camera internal parameters or inherent parameters, are parameters that describe internal attributes of a camera. These parameters include a focal length, coordinates of a principal point (optical center), and distortion coefficients (for example, k1, k2, k3 for radial distortion, and p1 and p2 for tangential distortion). The intrinsic parameters are typically determined during camera calibration.

Image distortion is mainly caused by optical characteristics of a camera lens. When light passes through the lens, due to refraction and manufacturing limitations, radial distortion and tangential distortion may occur. The radial distortion causes straight lines in an image to appear curved, with the distortion increased as a pixel is far away from the center of the image. The tangential distortion is generated because the lens and a photosensitive element are not completely parallel. Therefore, distortion correction is performed on the original images based on the pre-calibrated camera intrinsic parameter, to obtain the distortion-corrected images.

A distortion in an original point cloud refers to a shape distortion caused by movement of the radar or external factors. The odometer information contains motion information of the radar while collecting the original point cloud. The information generally includes a position, a speed, acceleration, and the like. Subsequently, a compensation transformation matrix is determined based on the time stamp of the image and the odometer information. The compensation transformation matrix is then applied to the original point cloud to obtain the distortion-corrected point cloud.

It should be noted that, an odometer is configured to estimate a traveling distance of the material handling equipment by measuring its motion, and calculate, in combination with sensor data, physical quantities such as a position, a velocity, and an orientation of the material handling equipment. The odometer may be disposed at a position near a wheel of the material handling equipment to record a quantity of rotations of the wheel, thereby estimating the traveling distance. Alternatively, the odometer also may be disposed at a center of a chassis of the material handling equipment.

Step S702: extracting first target image data of a first target region from the image of the first stacking object, and extracting second target image data of a second target region from the image of the second stacking object.

The first target image data refers to image data of the first target region that is extracted by a first sensor from an image of the first stacking object. The first target image data may be used for extracting first target point cloud data corresponding to the first target region from a point cloud of the first stacking object.

The second target image data refers to image data of the second target region that is extracted by the first sensor from an image of the second stacking object. The second target image data may be used for extracting second target point cloud data corresponding to the second target region from a point cloud of the second stacking object.

The first target region of the first stacking object in the image typically has a boundary that separates the first target region from other parts in the image. The first target region may describe a shape, a size, a position, and possible texture or color features of part of the first stacking object. The second target region of the second stacking object in the image typically has a boundary that separates the second target region from other parts in the image. The second target region may describe a shape, a size, a position, and possible texture or color features of part of the second stacking object.

In an example, the controller may be configured to extract, based on an image segmentation model, the first target image data of the first target region from the image of the first stacking object, and extract the second target image data of the second target region from the image of the second stacking object. Image segmentation refers to a process of partitioning an image into a plurality of non-overlapping regions, with each region corresponding to an object in the image. An image segmentation method may include one or more of threshold segmentation, edge detection, region growing, clustering, and a deep learning method.

In another example, the controller may be configured to extract, based on a target detection model, the first target image data of the first target region from the image of the first stacking object, and extract the second target image data of the second target region from the image of the second stacking object. Target detection refers to a process of identifying and locating a specific target or object in an image. A target detection method is mainly implemented based on a deep learning model.

According to embodiments of the present disclosure, the image segmentation method or the target detection method may be used to accurately determine the first target region of the first stacking object and the second target region of the second stacking object in the image.

It should be noted that, in a process of target detection or image segmentation, a binary mask (or referred to as a mask) with a same size as the image is generally generated. Each pixel value in the mask indicates whether the pixel belongs to the first stacking object or the second stacking object (generally, 1 indicates Yes, and 0 indicates No). The mask may be used for extracting the first target region of the first stacking object and the second target region of the second stacking object.

Figure 8:
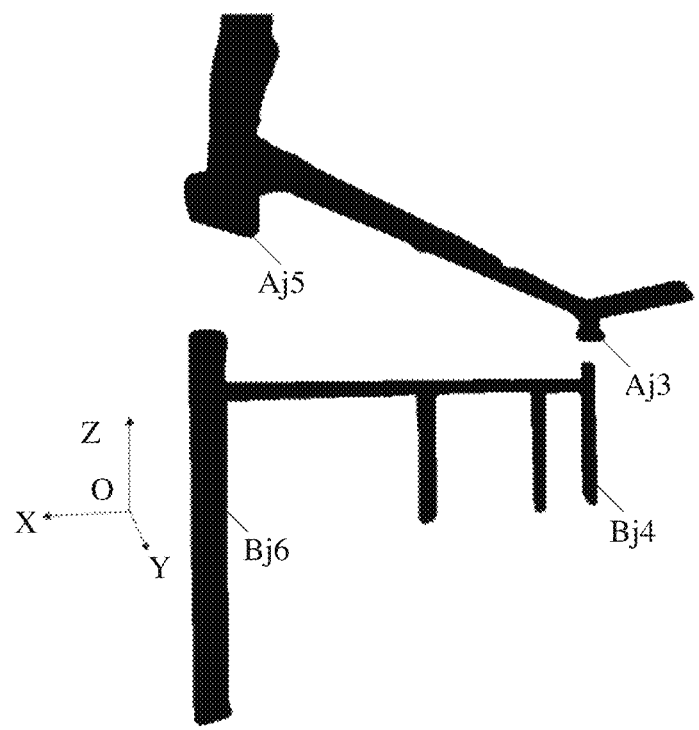
FIG. 8 is a schematic diagram of a segmented image according to an embodiment of the present disclosure.

For example, when the camera captures an image including the first stacking object and the second stacking object, after image segmentation, a segmentation result may be shown in FIG. 8, in which a first part (Aj5-Aj3) is at least a partial region of a fifth foot cup Aj5 and at least a partial region of a third foot cup Aj3 of the first stacking object, and a second part (Bj6-Bj4) is at least a partial region of a sixth upright Bj6 and at least a partial region of a fourth upright Bj4 of the second stacking object.

Herein, at least a partial region of a foot cup of the first stacking object and at least a partial region of an upright of the second stacking object to be presented in the image may be changed by adjusting a quantity of cameras and an orientation of a camera.

The foot cup is a supporting component installed at the bottom of a material cage, and is typically used for stabilizing the material cage, bearing a weight, and protecting the cage from being in direct contact with the ground. In industrial, warehousing, and logistics scenarios, the material cage (also referred to as a returnable cage or warehouse cage) is often equipped with foot cups to achieve better mobility, stackability, and durability.

The upright is a vertical supporting structure around the material cage, and is typically used to bear a weight of the material cage, fix a frame structure of the cage body, and provide stacking functionality. The upright is one of core components of the material cage, and the design of the upright directly affects the strength, stability, and functional performance of the material cage.

In embodiments of the present disclosure, the first target region at least includes a key structural region such as a foot cup or a border line of the first stacking object. The second target region at least includes a key structural region such as an upright or a border line of the second stacking object.

In an example, the first target region at least includes at least a partial region of at least one foot cup. The at least a partial region of the foot cup may be a region corresponding to all or part of the foot cup. The second target region at least includes at least a partial region of at least one upright. The at least a partial region of the upright may be a region corresponding to all or part of the upright.

For example, the first stacking object is a first material cage, and the second stacking object is a second material cage. The first target region includes at least a partial region of a first foot cup and at least a partial region of a third foot cup of the first material cage. The second target region includes at least a partial region of a second upright and at least a partial region of a fourth upright of the second material cage.

For example, the first target region further includes at least a partial region of a fifth foot cup and at least a partial region of a seventh foot cup of the first material cage; and the second target region further includes at least a partial region of a sixth upright and at least a partial region of an eighth upright of the second material cage. The following describes the first target region and the second target region in FIG. 2 in detail with reference to FIG. 9, FIG. 10, and FIG. 11.

Figure 9:
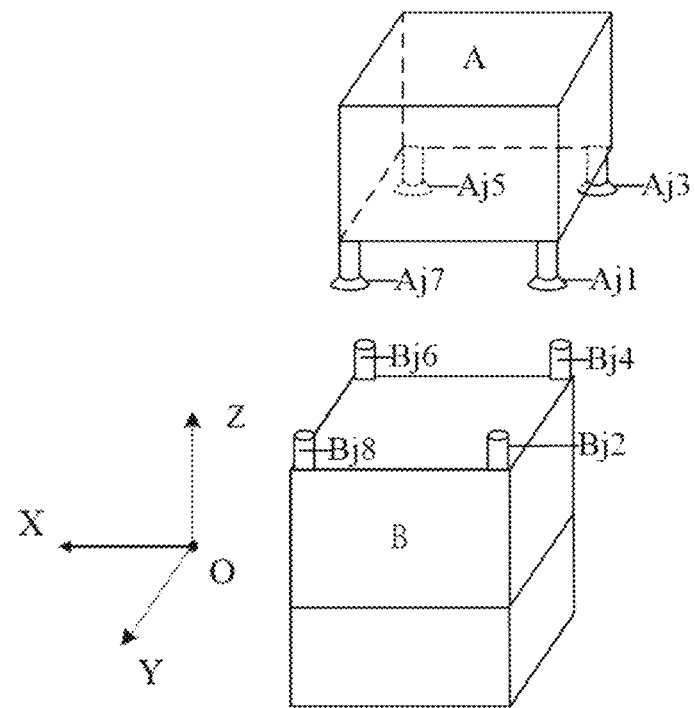
FIG. 9 is a schematic diagram of foot cups and uprights according to an embodiment of the present disclosure.

In FIG. 9, a first target region includes at least a partial region of a first foot cup Aj1, at least a partial region of a third foot cup Aj3, at least a partial region of a fifth foot cup Aj5, and at least a partial region of a seventh foot cup Aj7. A second target region includes at least a partial region of a second upright Bj2, at least a partial region of a fourth upright Bj4, at least a partial region of a sixth upright Bj6, and at least a partial region of an eighth upright Bj8.

Figure 10:
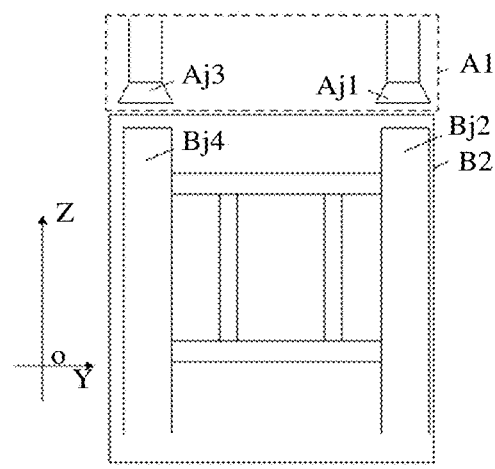
FIG. 10 is a first schematic diagram of a first target region and a second target region according to an embodiment of the present disclosure.

In FIG. 10, a first target region A1 includes at least a partial region of a first foot cup Aj1 and at least a partial region of a third foot cup Aj3. A second target region B2 includes at least a partial region of a second upright Bj2 and at least a partial region of a fourth upright Bj4.

Figure 11:
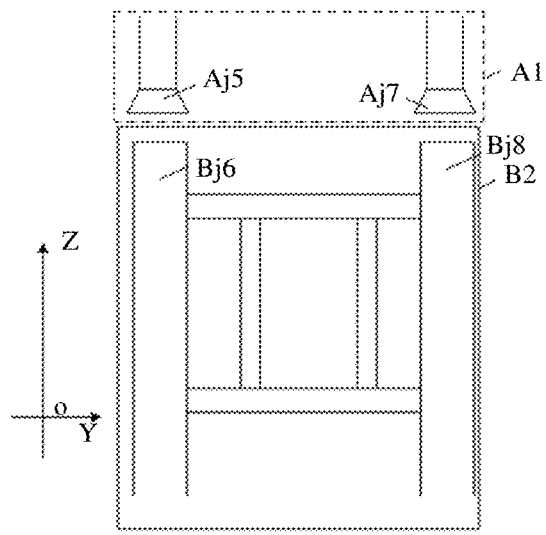
FIG. 11 is a second schematic diagram of a first target region and a second target region according to an embodiment of the present disclosure.

In FIG. 11, a first target region A1 includes at least a partial region of a fifth foot cup Aj5 and at least a partial region of a seventh foot cup Aj7. A second target region B2 includes at least a partial region of a sixth upright Bj6 and at least a partial region of an eighth upright Bj8.

In an example, the first target region includes at least one border line of the first stacking object; and the second target image region includes at least one border line of the second stacking object.

For example, the first stacking object is a first material cage, and the second stacking object is a second material cage. The first target region includes a first border line and a third border line of the first material cage, where the first border line intersects the third border line. The second target region includes a second border line and a fourth border line of the second material cage, where the second border line intersects the fourth border line.

For example, the first target region may further include a fifth border line and a seventh border line of the first material cage, where the fifth border line intersects the seventh border line. The second target region may further include a sixth border line and an eighth border line of the second material cage, where the sixth border line intersects the eighth border line. The following describes the first target region and the second target region in FIG. 2 in detail with reference to FIG. 12.

Figure 12:
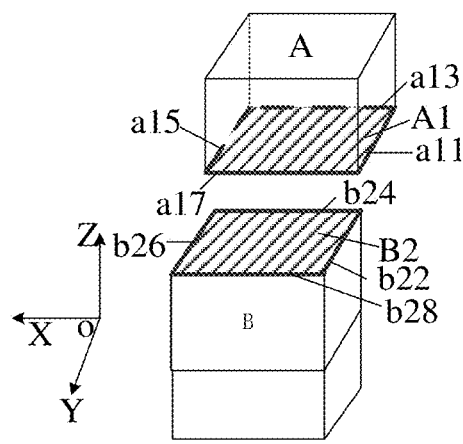
FIG. 12 is a schematic diagram of border lines of a first stacking object and a second stacking object according to an embodiment of the present disclosure.

In FIG. 12, a first target region A1 includes a first border line a11, a third border line a13, a fifth border line a15, and a seventh border line a17. The first border line a11 intersects the third border line a13, the third border line a13 intersects the fifth border line a15, the fifth border line a15 intersects the seventh border line a17, and the seventh border line a17 intersects the first border line a11.

A second target region B2 includes a second border line b22, a fourth border line b24, a sixth border line b26, and an eighth border line b28. The second border line b22 intersects the fourth border line b24, the fourth border line b24 intersects the sixth border line b26, the sixth border line b26 intersects the eighth border line b28, and the eighth border line b28 intersects the second border line b22.

It should be noted that in FIG. 12, the first target region A1 is located at the bottom of the first stacking object A, and the second target region B2 is located at the top of the second stacking object B in embodiments of the present disclosure.

Step S703: extracting, based on the first target image data, first target point cloud data corresponding to the first target region from the point cloud of the first stacking object; and extracting, based on the second target image data, second target point cloud data corresponding to the second target region from the point cloud of the second stacking object.

The first target point cloud data refers to point cloud data, acquired by a sensor, of the first target region of the first stacking object. The first target point cloud data may be used for calculating a pose, a stacking state, and the like of the first stacking object.

The second target point cloud data refers to point cloud data, acquired by the sensor, of the second target region of the second stacking object. The second target point cloud data may be used for calculating a pose, a stacking state, and the like of the second stacking object.

In embodiments of the present disclosure, by pre-establishing a correspondence between a point cloud and a pixel of an image, the first target point cloud data corresponding to the first target region of the first stacking object from the point cloud of the first stacking object, and the second target point cloud data corresponding to the second target region of the second stacking object from the point cloud of the second stacking object may be extracted based on the correspondence and the first target region of the first stacking object and the second target region of the second stacking object.

In embodiments of the present disclosure, before the extracting, based on the first target image data, the first target point cloud data corresponding to the first target region from the point cloud of the first stacking object; and extracting, based on the second target image data, the second target point cloud data corresponding to the second target region from the point cloud of the second stacking object, the method further includes: calibrating the camera and the radar.

After the camera and the radar are calibrated, the extracting, based on the first target image data, the first target point cloud data corresponding to the first target region from the target point cloud of the first stacking object includes: extracting, based on a joint calibration parameter and the first target image data, the first target point cloud data corresponding to the first target region from the target point cloud of the first stacking object.

The extracting, based on the second target image data, the second target point cloud data corresponding to the second target region from the target point cloud of the second stacking object includes: extracting, based on a joint calibration parameter and the second target image data, the second target point cloud data corresponding to the second target region from the target point cloud of the second stacking object.

In an example, the joint calibration may be performed by the controller in advance on the camera that acquires images and the radar that acquires point clouds, to obtain the joint calibration parameter.

In an example, the joint calibration parameter includes at least one of the following: an intrinsic parameter and an extrinsic parameter of the camera, an extrinsic parameter of the radar relative to the camera, and an extrinsic parameter of the radar relative to the material handling equipment.

Intrinsic parameters (Intrinsic Parameters) of the camera are parameters that describe internal attributes of the camera. These parameters are generally determined when the camera is calibrated, and are generally unchanged during usage of the camera. The intrinsic parameters mainly include the following aspects: a focal length (Focal Length), a principal point (Optical Center), a distortion coefficient (Distortion Coefficients), an intrinsic matrix (Intrinsic Matrix), and the like.

Extrinsic parameters of the camera are parameters that describe a position and an orientation of the camera in a world coordinate system. The extrinsic parameters mainly include the following aspects: a rotation matrix (Rotation Matrix), a translation vector (Translation Vector), and the like.

Different from the intrinsic parameters of the camera, the extrinsic parameters of the camera change as a position of camera in the world coordinate system changes or a shooting instant changes. For example, in stereo vision, if there are two cameras, when the cameras move, their relative position and orientation change, which leads to a change in the extrinsic parameters.

The extrinsic parameter of the radar relative to the camera is used for determining a rotational and translational relationship between the radar and the camera, so as to align their coordinate systems.

The extrinsic parameter of the radar relative to the material handling equipment is used for determining a relative position and orientation relationship between the radar and the material handling equipment (whose body is used as a reference coordinate system, such as the foregoing 3D coordinate system). This calibration is a key step to ensure that radar data can be accurately transformed into the 3D coordinate system, thereby achieving precise environmental perception, positioning, navigation, and obstacle avoidance functions.

When the joint calibration parameter includes the intrinsic parameter and extrinsic parameter of the camera, the extrinsic parameter of the radar relative to the camera, and the extrinsic parameter of the radar relative to the material handling equipment, the correspondence between a point cloud and a pixel may be represented by the following formula:

$$P_{img} = T_{img} \cdot T_{camera\text{-}img} \cdot T_{lidar\text{-}camera} \cdot T_{material\ handling\ equipment\text{-}lidar} \cdot P_n$$

Coordinates of a point in the point cloud in the coordinate system of the material handling equipment are denoted as $P_n$, coordinates of a pixel in the image (a format of the image may be .img) are denoted as $P_{img}$, the intrinsic parameter of the camera is denoted as $T_{img}$, the extrinsic parameter of the camera is denoted as $T_{camera\text{-}img}$, the extrinsic parameter of the radar relative to the camera is denoted as $T_{lidar\text{-}camera}$, and the extrinsic parameter of the material handling equipment relative to the Lidar is denoted as $T_{material\ handling\ equipment\text{-}lidar}$.

Step S704: determining a pose of the first stacking object based on the first target point cloud data, and determining a pose of the second stacking object based on the second target point cloud data.

According to embodiments of the present disclosure, step S704 may include the following steps.

Extracting a first border point cloud from the first target point cloud data corresponding to the first target region of the first stacking object; extracting a second border point cloud from the second target point cloud data corresponding to the second target region of the second stacking object; performing fitting on the first border point cloud by a least squares method to obtain a border line equation corresponding to the first stacking object, and performing fitting on the second border point cloud by the least squares method to obtain a border line equation corresponding to the second stacking object; and determining the pose of the first stacking object based on the border line equation corresponding to the first stacking object, and the pose of the second stacking object based on the border line equation corresponding to the second stacking object.

In an example, the controller may extract, based on Random Sample Consensus (RANSAC) or Progressive Sample Consensus (PROSAC), the first border point cloud from the first target point cloud data corresponding to the first target region of the first stacking object, and extract, based on RANSAC, the second border point cloud from the second target point cloud data corresponding to the second target region of the second stacking object. Then a fitting process is performed on the first border point cloud based on the least squares method to obtain the border line equation corresponding to the first stacking object, and a fitting process is performed on the second border point cloud based on the least squares method to obtain the border line equation corresponding to the second stacking object. Finally, the pose of the first stacking object may be determined based on the border line equation corresponding to the first stacking object, and the pose of the second stacking object may be determined based on the border line equation corresponding to the second stacking object.

Herein, the extracting, based on RANSAC, the first border point cloud from the first target point cloud data corresponding to the first target region of the first stacking object may include the following steps.

Firstly, randomly selecting a set of points from the first target point cloud data corresponding to the first target region of the first stacking object as an initial sample; secondly, estimating parameters of a model (namely, a model for extracting a border point cloud) by using the initial sample, where the parameters include vertices, edge lengths, angles, and other parameters of borders of the first stacking object; thirdly, classifying, based on the parameters of the model, remaining points in the first target point cloud data corresponding to the first target region of the first stacking object as inliers (points that fit the parameters of the model) and outliers (points that do not fit the parameters of the model); fourthly, repeating the foregoing steps of random sampling, model estimation, and classification of inliers and outliers, and recording a quantity of inliers of a current model for each iteration; lastly, selecting, among all iterations, a model with a maximum quantity of inliers as a final estimation result (namely, the border point cloud of the first stacking object).

It should be noted that a process of extracting, based on RANSAC or PROSAC, the second border point cloud from the second target point cloud data corresponding to the second target region of the second stacking object is similar to the process of extracting, based on RANSAC or PROSAC, the first border point cloud from the first target point cloud data corresponding to the first target region of the first stacking object, and details are not described herein again.

Next, the performing a fitting process on the first border point cloud based on the least squares method to obtain the border line equation corresponding to the first stacking object, and performing a fitting process on the second border point cloud based on the least squares method to obtain the border line equation corresponding to the second stacking object may include the following steps.

Firstly, selecting a suitable fitting model depending on shapes of the first stacking object and the second stacking object, where a linear fitting model may be used for the border line equations of the first stacking object and the second stacking object; secondly, determining parameters of a first fitting model corresponding to the first stacking object and parameters of a second fitting model corresponding to the second stacking object, such as slope and intercept; thirdly, constructing a first objective function (namely, an error function) based on the first fitting model and the first border point cloud; and constructing a second objective function based on the parameters of the second fitting model and the second border point cloud, where the objective function corresponding to the first stacking object represents a deviation or distance between the corresponding fitting model and the first border point cloud, and the objective function corresponding to the second stacking object represents a deviation or distance between the corresponding fitting model and the second border point cloud; fourthly, solving for, based on the least squares method, model parameters that minimize each of the first objective function and the second objective function respectively, where according to the least squares method, a best fitting is found by minimizing a sum of squares of distances from all point clouds of the first border line to the first fitting model, or a best fitting is found by minimizing a sum of squares of distances from all point clouds of the second border line to the second fitting model; lastly, solving for a minimum value of the first objective function to obtain the border line equation corresponding to the first stacking object; and solving for a minimum value of the second objective function to obtain the border line equation corresponding to the second stacking object.

For example, in embodiments of the present disclosure, distribution of border point clouds directly reflects a shape of a corresponding stacking object. For example, a point cloud with six rectangular faces may be generated for a cubic stacking object.

According to the shape (for example, a rectangle) of the first stacking object, a first border point cloud, a third border point cloud, a fifth border point cloud, and a seventh border point cloud are distributed on respective rectangular faces of the first stacking object. According to the shape of the second stacking object, a second border point cloud, a fourth border point cloud, a sixth border point cloud, and an eighth border point cloud are distributed on respective rectangular faces of the second stacking object.

A first border line equation is obtained by performing fitting on the first border point cloud distributed on the corresponding rectangular face using the least squares method; a third border line equation is obtained by performing fitting on the third border point cloud distributed on the corresponding rectangular face using the least squares method; a fifth border line equation is obtained by performing fitting on the fifth border point cloud distributed on the corresponding rectangular face using the least squares method; and a seventh border line equation is obtained by performing fitting on the seventh border point cloud distributed on the corresponding rectangular face using the least squares method.

A second border line equation is obtained by performing fitting on the second border point cloud distributed on the corresponding rectangular face using the least squares method; a fourth border line equation is obtained by performing fitting on the fourth border point cloud distributed on the corresponding rectangular face using the least squares method; a sixth border line equation is obtained by performing fitting on the sixth border point cloud distributed on the corresponding rectangular face using the least squares method; and an eighth border line equation is obtained by performing fitting on the eighth border point cloud distributed on the corresponding rectangular face using the least squares method.

In the following, the third border point cloud may be taken as an example, to obtain the third border line equation by performing fitting on the third border point cloud distributed on the corresponding rectangular face using the least squares method.

For example, a border line equation '$y=mx+b$' is found on a rectangular face, where m denotes a slope, and b denotes an intercept, such that the border line equation most closely approximates the third border point cloud distributed on the rectangular face. The goal of the least squares method is to find values of m and b that minimize a sum of squares of vertical distances (namely, errors) from all points (namely, all points in the third border point cloud distributed on the rectangular face) to the border line equation. The third border line equation is obtained by minimizing the sum of squares of the vertical distances (namely, errors) from all the points to the border line equation.

It should be noted that, edge lines of another border point cloud may be determined by using a same method as that applied to the third border point cloud.

In some embodiments, step S704 of "determining the pose of the first stacking object based on the border line equation corresponding to the first stacking object, and determining the pose of the second stacking object based on the border line equation corresponding to the second stacking object" may be implemented by the following steps.

The first stacking object is taken as an example.

The border line equation corresponding to the first stacking object that is obtained based on a linear fitting algorithm may include four border line equations, which are the first border line equation corresponding to the first border line a11, the third border line equation corresponding to the third border line a13, the fifth border line equation corresponding to the fifth border line a15, and the seventh border line equation corresponding to the seventh border line a17, respectively.

Position information of the first stacking object is determined based on coordinates of any intersection point between straight lines respectively corresponding to the four border line equations. For example, the position information of the first stacking object is determined based on coordinates of an intersection between the first border line a11 corresponding to the first border line equation and the third border line a13 corresponding to the third border line equation.

Alternatively, a centerline equation is obtained based on two parallel straight lines, and then position information of the first stacking object is determined based on coordinates of an intersection between a straight line corresponding to the centerline equation and a straight line corresponding to another border line equation. For example, a first centerline is obtained based on the first border line a11 corresponding to the first border line equation and the fifth border line a15 corresponding to the fifth border line equation, and then the position information of the first stacking object is determined based on coordinates of an intersection between the first centerline and the third border line a13 corresponding to the third border line equation.

Then, angle information of the first stacking object is determined based on an angle of any one of straight lines of the first border line a11 corresponding to the first border line equation, the third border line a13 corresponding to the third border line equation, the fifth border line a15 corresponding to the fifth border line equation, and the seventh border line a17 corresponding to the seventh border line equation.

Then the pose of the first stacking object is determined based on the position information and the angle information.

A similar step may be used to determine the pose of the second stacking object based on the border line equation corresponding to the second stacking object.

Step S705: calculating a relative pose of the first stacking object relative to the second stacking object based on the pose of the first stacking object and the pose of the second stacking object.

The relative pose of the first stacking object relative to the second stacking object refers to a pose difference between the first stacking object and the second stacking object. Specifically, taking the coordinate system in the present embodiment as an example, the coordinate difference includes a coordinate difference ($\Delta x$, $\Delta y$) of two stacking objects in the X-axis and the Y-axis and a rotation angle difference ($\Delta \theta$) of two stacking objects in the Z-axis.

In another implementation, when the first sensor is a 3D Lidar, the obtained target data of the first stacking object and the second stacking object includes a point cloud of the first stacking object and a point cloud of the second stacking object.

Figure 13:
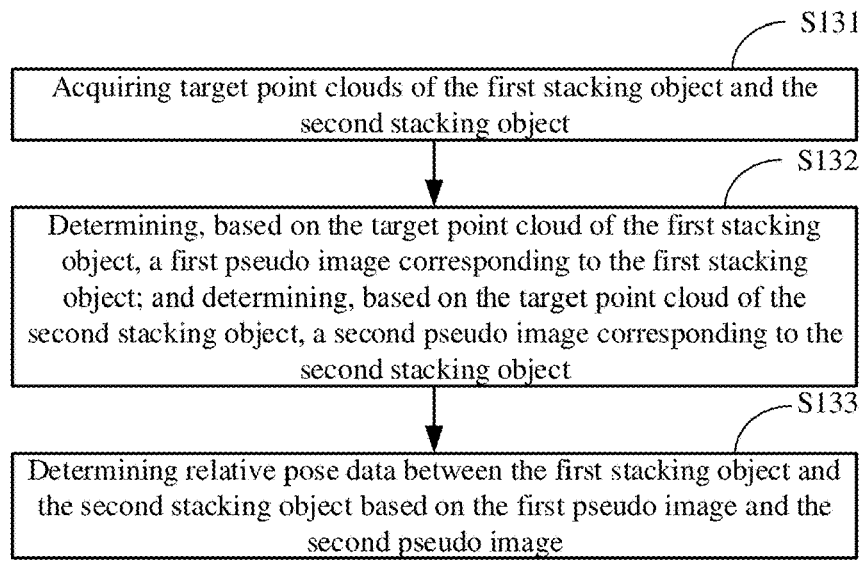
FIG. 13 is a flowchart of calculating a relative pose of a first stacking object relative to a second stacking object according to an embodiment of the present disclosure.

As shown in FIG. 13, the calculating the relative pose of the first stacking object relative to the second stacking object may be implemented in the following manner.

Step S131: acquiring target point clouds of the first stacking object and the second stacking object.

When the material handling equipment moves the first stacking object to a stacking operation position, lifts the first stacking object, and uses the first sensor carried by the material handling equipment to scan the first stacking object and the second stacking object, the first sensor acquires the target point clouds of the first stacking object and the second stacking object.

Considering distortions in the target point clouds collected when the first stacking object and the second stacking object are simultaneously scanned by the first sensor, in embodiments of the present disclosure, the acquiring, by using the first sensor, the target point clouds of the first stacking object and the second stacking object may further include: collecting, by using the first sensor carried by the material handling equipment, an original point cloud of the first stacking object, transforming the original point cloud of the first stacking object from a coordinate system in which the first sensor is located to a coordinate system in which the material handling equipment is located, and performing distortion correction on the original point cloud of the first stacking object based on odometer information collected by the material handling equipment, to obtain the target point cloud; and collecting, by using the first sensor carried by the material handling equipment, an original point cloud of the second stacking object, transforming the original point cloud of the second stacking object from the coordinate system in which the first sensor is located to the coordinate system in which the material handling equipment is located, and performing distortion correction on the original point cloud of the second stacking object based on odometer information collected by the material handling equipment, to obtain the target point cloud.

The distortion in the original point clouds of the first stacking object and the second stacking object refers to a shape distortion caused by movement of the first sensor or external factors. The odometer information contains motion information of the first sensor while collecting the original point clouds. The information generally includes a position, a speed, acceleration, and the like. A compensation transformation matrix may be determined based on the odometer information and then applied to each point in the original point clouds to obtain distortion-corrected point clouds (namely, the target point clouds of the first stacking object and the second stacking object).

In the present disclosure, the original point clouds collected by the first sensor are transformed from the coordinate system in which the first sensor is located to the coordinate system in which the material handling equipment is located, and distortion correction processing is performed on the original point clouds based on the odometer information, so that distortion-free target point clouds may be obtained.

Step S132: determining, based on the target point cloud of the first stacking object, a first pseudo image corresponding to the first stacking object; and determining, based on the target point cloud of the second stacking object, a second pseudo image corresponding to the second stacking object.

Pseudo image refers to an image generated by an algorithm or processed by using some special technologies in the field of computer image processing or computer vision. A pseudo image may not represent actual image data, or may have a virtualized or approximate relationship with a real image. In some cases, a pseudo image may also refer to a simulated image or an image used to represent an unreal world scenario.

The controller determines a projection point of each point in the target point cloud of the first stacking object and the target point cloud of the second stacking object on a same horizontal plane (for example, an XOY plane). This typically involves transforming coordinates of the point clouds from an original coordinate system to a coordinate system in which the XOY plane is located and retaining 2D position information (such as X and Y coordinates). Optionally, the controller projects the target point cloud of the first stacking object downward onto the XOY plane to generate a first projection (for example, an upper image or a lower image in part (a) of FIG. 14), and thus the first projection is used as the first pseudo image of the first stacking object. The controller projects the target point cloud of the second stacking object downward onto the XOY plane to generate a second projection (for example, an upper image or a lower image in part (a) of FIG. 15), and thus the second projection is used as the second pseudo image of the second stacking object. In the XOY plane, "X" corresponds to the X-axis in the 3D coordinate system described above; "O" corresponds to the origin O in the 3D coordinate system described above; and "Y" corresponds to the Y-axis in the 3D coordinate system described above.

Figure 14:
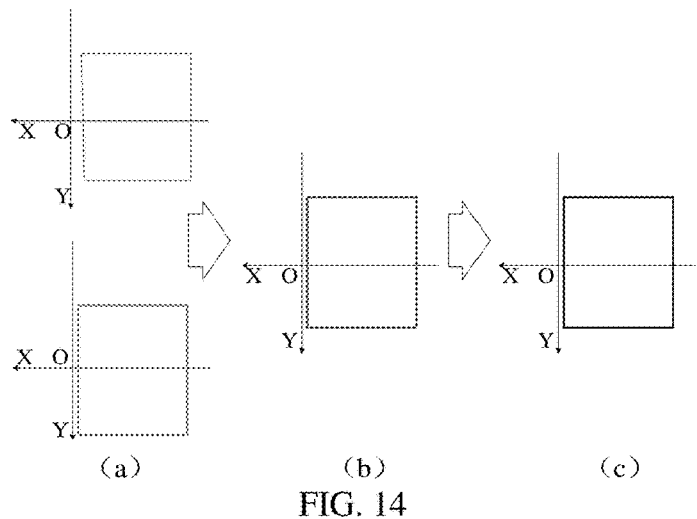
FIG. 14 is a schematic diagram of generating a first grayscale image according to an embodiment of the present disclosure.

As shown in FIG. 14, in some embodiments, the controller projects the target point cloud of the first stacking object onto the XOY plane by using at least two projection resolutions, to obtain at least two projections (as shown in part (a) of FIG. 14). Then the at least two projections obtained by using the at least two projection resolutions and corresponding to the target point cloud of the first stacking object are scaled to a uniform size, and superimposed to obtain a superimposed projection (as shown in part (b) of FIG. 14). The superimposed projection is used as the first pseudo image of the first stacking object. In the same manner, the controller projects the target point cloud of the second stacking object onto the XOY plane by using at least two projection resolutions, to obtain at least two projections (as shown in part (a) of FIG. 15), Then the at least two projections obtained by using the at least two projection resolutions and corresponding to the target point cloud of the second stacking object are scaled to a uniform size, and superimposed to obtain a superimposed projection (as shown in part (b) of FIG. 15). The superimposed projection is used as the second pseudo image of the second stacking object As shown in FIG. 14, in some embodiments, the controller projects the target point cloud of the first stacking object onto the XOY plane by using at least two projection resolutions, to obtain at least two projections (as shown in part (a) of FIG. 14). Then the at least two projections obtained by using the at least two projection resolutions and corresponding to the target point cloud of the first stacking object are scaled to a uniform size, and superimposed to obtain a superimposed projection (as shown in part (b) of FIG. 14). The superimposed projection is converted to a first greyscale image, which is used as the first pseudo image of the first stacking object. In the same manner, the controller projects the target point cloud of the second stacking object onto the XOY plane by using at least two projection resolutions, to obtain at least two projections (as shown in part (a) of FIG. 15), Then the at least two projections obtained by using the at least two projection resolutions and corresponding to the target point cloud of the second stacking object are scaled to a uniform size, and superimposed to obtain a superimposed projection (as shown in part (b) of FIG. 15). The superimposed projection is converted to a second greyscale image, which is used as the second pseudo image of the second stacking object. The purpose of scaling to the uniform size is to ensure that the projections obtained by using the at least two projection resolutions are correctly aligned with each other before superimposing, so as to avoid misalignment or ghosting after superimposing.

Unifying sizes of pseudo images obtained by using the at least two projection resolutions may refer to scaling the sizes of the pseudo images obtained by using different projection resolutions to a specified size.

Optionally, unifying sizes of pseudo images with at least two projection resolutions may alternatively refer to first determining a maximum pseudo image from the pseudo images obtained by using the at least two projection resolutions, and then unifying a size of a pseudo image obtained by using a projection resolution other than the projection resolution of the maximum pseudo image to the size of the maximum pseudo image.

It should be noted that pixel values in the grayscale images (namely, the first grayscale image and the second grayscale image) described above are generally used to indicate a brightness level, namely grayscale values, of the images. A larger grayscale value indicates a brighter pixel. On the contrary, a smaller grayscale value indicates a darker pixel. When a point cloud is projected onto pixels, a grayscale value of a pixel may be adjusted based on attributes of points in the point cloud.

In a process in which the controller projects each of the target point clouds of the first stacking object and the second stacking object onto the XOY plane and obtains a grayscale image through converting, a grayscale value in the grayscale image may be determined based on attributes of points (such as at least one of a point quantity, a point intensity, a distance between points, a point angle, or an elevation difference between points in the point cloud) in the point cloud projected onto the pixels.

After determining the grayscale value, a corresponding pixel position on the grayscale image may be found based on 2D position information (X and Y coordinates) of a corresponding projection point, and thus the determined grayscale value is used as a pixel value at the corresponding pixel position. This process is repeated until all projection points are processed, thereby generating the complete grayscale image.

Optionally, a projection resolution used for the target point cloud of the first stacking object may be the same as a projection resolution used for the target point cloud of the second stacking object. For example, two projection resolutions of 5 mm (millimeter)/pixel (pixel) and 1 cm (centimeter)/pixel may be used for both the target point cloud of the first stacking object and the target point cloud of the second stacking object.

For example, step of projecting the target point cloud of the first stacking object onto the XOY plane at 5 mm/pixel and 1 cm/pixel to generate the first grayscale image corresponding to the first stacking object may include the following steps.

Step 1: projecting, by the controller, the target point cloud of the first stacking object onto the XOY plane at 5 mm/pixel and 1 cm/pixel to generate a pseudo image corresponding to 5 mm/pixel and a pseudo image corresponding to 1 cm/pixel (corresponding to the upper image and the lower image in part (a) of FIG. 14, respectively). A higher projection resolution indicates a clearer image. In addition, lines in the upper image and the lower image in part (a) of FIG. 14 typically reflect contour lines or feature lines of the first stacking object from a specific perspective (namely, a perspective corresponding to a top view).

Step 2: scaling, by the controller, the projection corresponding to 5 mm/pixel and the projection corresponding to 1 cm/pixel to a uniform size, superimposing the projections to obtain a superimposed projection (as shown in part (b) of FIG. 14), and converting the superimposed projection into a grayscale image, to obtain the first grayscale image (as shown in part (c) of FIG. 14) corresponding to the first stacking object.

A manner of generating the second grayscale image may is similar to that of generating the first grayscale image.

It should be noted that, in FIG. 14, "O" corresponds to the origin O in the 3D coordinate system described above, "X" corresponds to the X-axis in the 3D coordinate system described above, and "Y" corresponds to the Y-axis in the 3D coordinate system described above.

It should be noted that, in some embodiments, each projection generated by using a projection resolution may be split into three channels. A first channel is generated by using a quantity of points in a point cloud projected onto the pixels. A larger quantity of point clouds indicates a higher pixel value. A second channel is generated by using relative pose data of a distance between the point cloud and a target (namely, a theoretical position of a stacking object). A larger amount of relative pose data indicates a lower pixel value. A third channel is generated by using an elevation difference between points in the point cloud. Within a specific height range, a larger elevation difference indicates a higher pixel value.

In the present disclosure, the pixel value in the grayscale image is determined based on at least one of the following attributes of the points in the point cloud projected onto the pixels: a point quantity, a point intensity, a distance between points, a point angle, or an elevation difference between points in the point cloud, so that the pixel values in the grayscale image reflect multi-dimensional attributes of the point cloud, improving accuracy of determining a boundary line from the grayscale image.

Step S133: determining relative pose data between the first stacking object and the second stacking object based on the first pseudo image and the second pseudo image.

The pose of the first stacking object is determined based on key structures such as boundaries and target points extracted from the first pseudo image that is generated by projecting the target point cloud of the first stacking object onto the horizontal plane. The pose of the second stacking object is determined based on key features such as boundaries and target points extracted from the second pseudo image that is generated by projecting the target point cloud of the second stacking object onto the horizontal plane. The relative pose data is determined based on the pose of the first stacking object and the pose of the second stacking object.

In embodiments of the present disclosure, the step S133 of determining the relative pose data between the first stacking object and the second stacking object based on the first pseudo image and the second pseudo image includes the following step.

determining a boundary line of the first pseudo image; determining a target point of the first pseudo image based on the boundary line of the first pseudo image; determining a boundary line of the second pseudo image; determining a target point of the second pseudo image based on the boundary line of the second pseudo image; and determining the relative pose data between the first stacking object and the second stacking object based on the boundary line of the first pseudo image and the target point in the first pseudo image and the boundary line of the second pseudo image and the target point of the second pseudo image.

In embodiments of the present disclosure, the boundary line of the first pseudo image may be as follows: a boundary line of a first projection generated by projecting the target point cloud of the first stacking object downward onto the XOY plane, for example, a boundary line (each corresponding to an edge of a rectangle) in the upper image or the lower image in part (a) of FIG. 14; or a boundary line of a superimposed projection obtained by scaling the projections that are obtained by using the at least two projection resolutions and corresponding to the target point cloud of the first stacking object to a uniform size and superimposing the projections, for example, a boundary line (each corresponding to an edge line of a rectangle) in the image shown in part (b) in FIG. 14; or a boundary line of the first grayscale image, for example, a boundary line (each corresponding to an edge of a rectangle) in the image shown in part (c) of FIG. 14.

Figure 15:
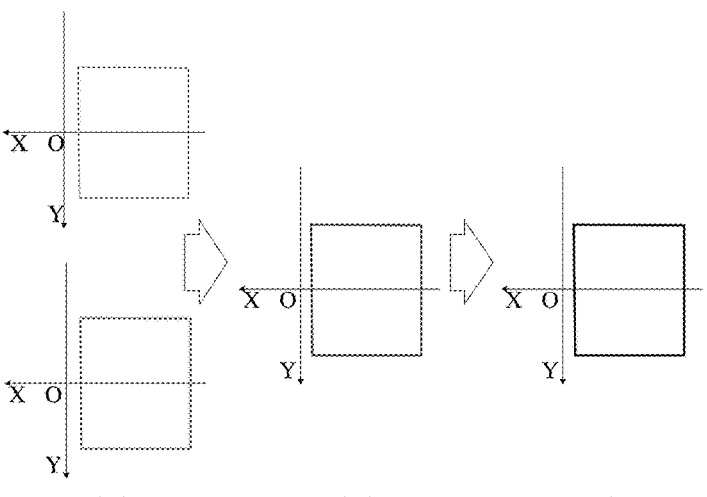
FIG. 15 is a schematic diagram of generating a second grayscale image according to an embodiment of the present disclosure.

In embodiments of the present disclosure, the boundary line of the second pseudo image may be as follows: a boundary line of a second projection generated by projecting the target point cloud of the second stacking object downward onto the XOY plane, for example, a boundary line (each corresponding to an edge line of a rectangle) in the upper image or the lower image in part (a) of FIG. 15; or a boundary line of a superimposed projection obtained by scaling the projections that are obtained by using the at least two projection resolutions and corresponding to the target point cloud of the second stacking object to a uniform size and superimposing the projections, for example, a boundary line (each corresponding to an edge line of a rectangle) in the image shown in part (b) of FIG. 15; or a boundary line of the second grayscale image, for example, a boundary line (each corresponding to an edge line of a rectangle) in the image shown in part (c) of FIG. 15.

In embodiments of the present disclosure, probabilistic Hough transform line detection algorithm may be used to extract lines from the first pseudo image and the second pseudo image, to determine the boundary lines of the first pseudo image and the second pseudo image, so that a detection speed may be increased and computing resource consumption may be reduced while ensuring detection accuracy.

Optionally, the boundary line of the first pseudo image may include a first boundary line of the first pseudo image, a third boundary line of the first pseudo image, a fifth boundary line of the first pseudo image, and a seventh boundary line of the first pseudo image.

The boundary line of the second pseudo image may include a second boundary line of the second pseudo image, a fourth boundary line of the second pseudo image, a sixth boundary line of the second pseudo image, and an eighth boundary line of the second pseudo image.

In embodiments of the present disclosure, the determining the target point of the first pseudo image based on the boundary line of the first pseudo image includes: determining a centerline of the first pseudo image based on the third boundary line of the first pseudo image and the fifth boundary line of the first pseudo image; and using an intersection between the centerline of the first pseudo image and the first boundary line of the first pseudo image as the target point of the first pseudo image.

The determining the target point of the second pseudo image based on the boundary line of the second pseudo image includes: determining a centerline of the second pseudo image based on the fourth boundary line of the second pseudo image and the sixth boundary line of the second pseudo image; and using an intersection between the centerline of the second pseudo image and the second boundary line of the second pseudo image as the target point of the second pseudo image.

In embodiments of the present disclosure, stacking objects with regular or irregular shapes may be used to complete stacking of the stacking objects. In the following, a stacking objects with a regular shape is taken as an example.

According to the foregoing descriptions, boundary lines of a stacking object with a regular shape have a relationship of being either parallel or perpendicular to one another in a pseudo image. In view of this, in embodiments of the present disclosure, the third boundary line of the first pseudo image and the fifth boundary line of the first pseudo image are parallel to each other. The second boundary line of the second pseudo image and the fourth boundary line of the second pseudo image are parallel to each other. The third boundary line of the first pseudo image is perpendicular to the first boundary line of the first pseudo image, and the fifth boundary line of the first pseudo image is perpendicular to the first boundary line of the first pseudo image. The fourth boundary line of the second pseudo image is perpendicular to the second boundary line of the second pseudo image, and the sixth boundary line of the second pseudo image is perpendicular to the second boundary line of the second pseudo image.

It should be noted that, the target point of the first pseudo image is a midpoint of the first boundary line of the first pseudo image; and the target point of the second pseudo image is a midpoint of the second boundary line of the second pseudo image.

The following provides a detailed description by using an example in which the first pseudo image is the first grayscale image and the second pseudo image is the second grayscale image.

Figure 16:
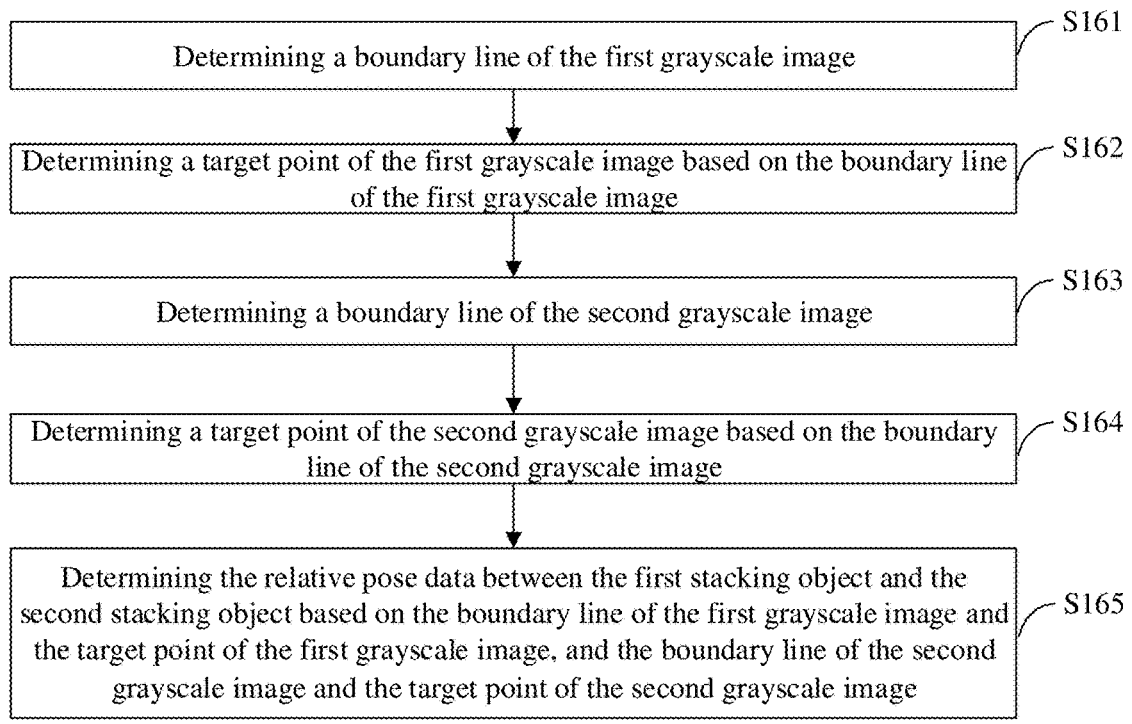
FIG. 16 is a flowchart of determining a relative pose data between a first stacking object and a second stacking object according to an embodiment of the present disclosure.

In FIG. 16, the determining the relative pose data between the first stacking object and the second stacking object based on the first grayscale image and the second grayscale image may include the following steps.

Step S161: determining a boundary line of the first grayscale image.

Step S162: determining a target point of the first grayscale image based on the boundary line of the first grayscale image.

Step S163: determining a boundary line of the second grayscale image.

Step S164: determining a target point of the second grayscale image based on the boundary line of the second grayscale image.

Step S165: determining the relative pose data between the first stacking object and the second stacking object based on the boundary line of the first grayscale image and the target point of the first grayscale image, and the boundary line of the second grayscale image and the target point of the second grayscale image.

In an example, the boundary lines of the first grayscale image and the second grayscale image may be extracted by the controller through the probabilistic Hough transform line detection algorithm. The boundary line of the first grayscale image at least includes the first boundary line of the first grayscale image, the third boundary line of the first grayscale image, and the fifth boundary line of the first grayscale image. The boundary line of the second grayscale image at least includes the second boundary line of the second grayscale image, the fourth boundary line of the second grayscale image, and the sixth boundary line of the second grayscale image.

Figure 17:
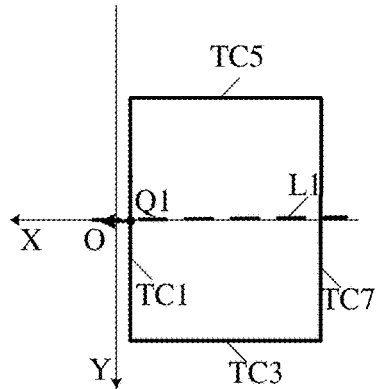
FIG. 17 is a schematic diagram of a first grayscale image according to an embodiment of the present disclosure.

As shown in FIG. 17, in some embodiments, the boundary line of the first grayscale image includes a first boundary line TC1 of the first grayscale image, a third boundary line TC3 of the first grayscale image, a fifth boundary line TC5 of the first grayscale image, and a seventh boundary line TC7 of the first grayscale image.

In some embodiments, the third boundary line TC3 of the first grayscale image is parallel to the fifth boundary line TC5 of the first grayscale image, and the first boundary line TC1 of the first grayscale image is parallel to the seventh boundary line TC7 of the first grayscale image.

Figure 18:
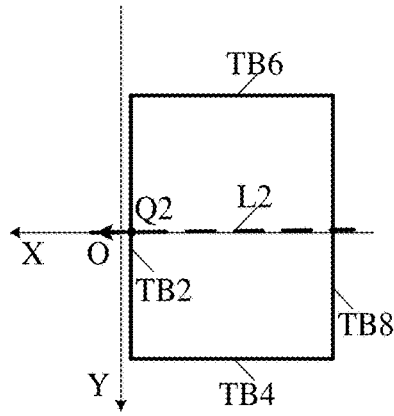
FIG. 18 is a schematic diagram of a second grayscale image according to an embodiment of the present disclosure.

As shown in FIG. 18, in some embodiments, the boundary line of the second grayscale image includes a second boundary line TB2 of the second grayscale image, a fourth boundary line TB4 of the second grayscale image, a sixth boundary line TB6 of the second grayscale image, and an eighth boundary line TB8 of the second grayscale image.

In some embodiments, the fourth boundary line TB4 of the second grayscale image and the sixth boundary line TB6 of the second grayscale image are parallel to each other, and the second boundary line TB2 of the second grayscale image and the eighth boundary line TB8 of the second grayscale image are parallel to each other.

In an example, the determining the target point of the first grayscale image based on the boundary line of the first grayscale image includes the following steps.

In FIG. 17, a centerline L1 (the dashed line) of the first grayscale image is determined by the controller based on the third boundary line TC3 of the first grayscale image and the fifth boundary line TC5 of the first grayscale image; and then an intersection between the centerline L1 of the first grayscale image and the first boundary line TC1 of the first grayscale image is determined to be a target point Q1 of the first grayscale image.

The determining the target point of the second grayscale image based on the boundary line of the second grayscale image includes the following steps.

In FIG. 18, ta centerline L2 (the yellow dashed line) of the second grayscale image is determined by the controller based on the fourth boundary line TB4 of the second grayscale image and the sixth boundary line TB6 of the second grayscale image; and then an intersection between the centerline L2 of the second grayscale image and the second boundary line TB2 of the second grayscale image is determined to be a target point Q2 of the second grayscale image.

In embodiments of the present disclosure, stacking objects with regular or irregular shapes may be used to complete stacking of the stacking objects. In the following, a stacking object with a regular shape is taken as an example.

According to the foregoing descriptions, boundary lines of a stacking object with a regular shape have a relationship of being either parallel or perpendicular to one another in a grayscale image. In view of this, in embodiments of the present disclosure, the third boundary line TC3 of the first grayscale image and the fifth boundary line TC5 of the first grayscale image are parallel to each other. The second boundary line TB2 of the second grayscale image and the fourth boundary line TB4 of the second grayscale image are parallel to each other. The third boundary line TC3 of the first grayscale image is perpendicular to the first boundary line TC1 of the first grayscale image, and the fifth boundary line TC5 of the first grayscale image is perpendicular to the first boundary line TC1 of the first grayscale image. The fourth boundary line TB4 of the second grayscale image is perpendicular to the second boundary line TB2 of the second grayscale image, and the sixth boundary line TB6 of the second grayscale image is perpendicular to the second boundary line TB2 of the second grayscale image.

In an example, the target point of the first grayscale image may be any point in the first grayscale image, such as a midpoint (as shown by Q1 in FIG. 17) of the first boundary line TC1 in the first grayscale image. The target point of the second grayscale image may be any point in the second grayscale image, such as a midpoint (as shown by Q2 in FIG. 18) of the second boundary line TB2 in the second grayscale image. In corresponding accompanying drawings of the present disclosure, it is taken as an example that the target point a midpoint.

It should be noted that, Step S161 and Step S162 are performed simultaneously with Step S163 and Step S164. Alternatively, Step S163 and Step S164 are performed before Step S161 and Step S162. Alternatively, Step S161 and Step S162 are performed before Step S163 and Step S164.

In some embodiments, pose data of the first stacking object may be determined by the controller based on position information of the target point Q1 of the first grayscale image and angle information of the centerline L1 of the first grayscale image. Pose data of the second stacking object may be determined by the controller based on position information of the target point Q2 of the second grayscale image and angle information of the centerline L2 of the second grayscale image. Then, a difference between the pose data of the first stacking object and the pose data of the second stacking object may be calculated by the controller to obtain the relative pose data between the first stacking object and the second stacking object.

In some embodiments, a method for determining the relative pose data between the first stacking object and the second stacking object is disclosed. The method includes the following specific steps:

determining a boundary line of the first pseudo image; determining, from the target point cloud of the first stacking object, a boundary point cloud, corresponding to the boundary line of the first pseudo image, of the first stacking object; determining a first target point of the first stacking object based on the boundary point cloud of the first stacking object; determining a boundary line of the second pseudo image; determining, from the target point cloud of the second stacking object, a boundary point cloud, corresponding to the boundary line of the second pseudo image, of the second stacking object; determining a second target point of the second stacking object based on the boundary point cloud of the second stacking object; determining a relative angle difference between the first stacking object and the second stacking object based on the boundary point cloud of the first stacking object and the boundary point cloud of the second stacking object; and determining the relative pose data between the first stacking object and the second stacking object based on a relative position difference between the first target point and the second target point and the relative angle difference.

Figure 19:
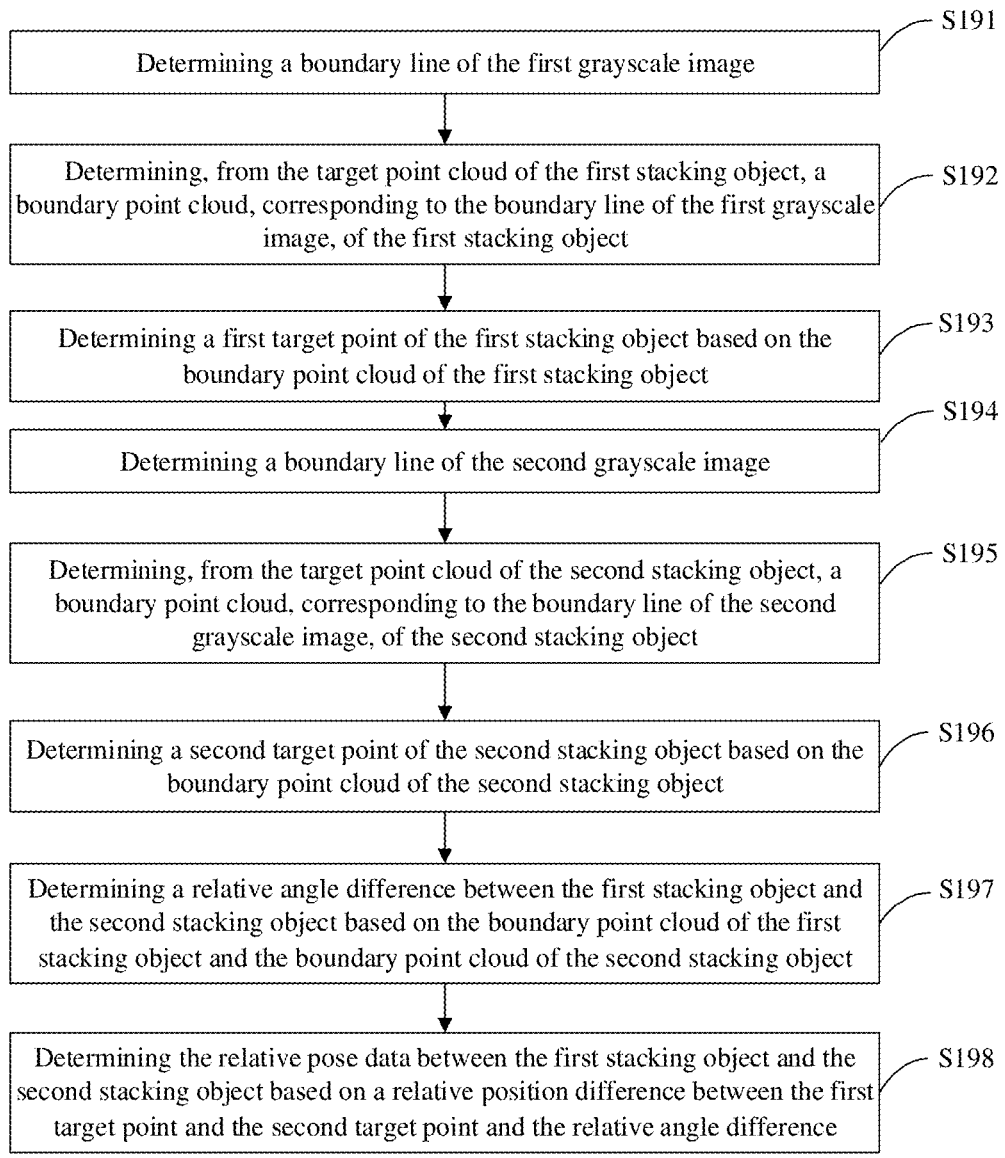
FIG. 19 is a flowchart of determining a relative pose data between a first stacking object and a second stacking object according to another embodiment of the present disclosure.

The following provides a specific description by using an example in which the first pseudo image is the first grayscale image and the second pseudo image is the second grayscale image. As shown in FIG. 19, the determining the relative pose data between the first stacking object and the second stacking object may include the following steps.

Step S191: determining a boundary line of the first grayscale image.

Step S192: determining, from the target point cloud of the first stacking object, a boundary point cloud, corresponding to the boundary line of the first grayscale image, of the first stacking object.

Step S193: determining a first target point of the first stacking object based on the boundary point cloud of the first stacking object.

Step S194: determining a boundary line of the second grayscale image.

Step S195: determining, from the target point cloud of the second stacking object, a boundary point cloud, corresponding to the boundary line of the second grayscale image, of the second stacking object.

Step S196: determining a second target point of the second stacking object based on the boundary point cloud of the second stacking object.

Step S197: determining a relative angle difference between the first stacking object and the second stacking object based on the boundary point cloud of the first stacking object and the boundary point cloud of the second stacking object.

Step S198: determining the relative pose data between the first stacking object and the second stacking object based on a relative position difference between the first target point and the second target point and the relative angle difference.

It should be noted that, Step S191 to Step S193 are performed simultaneously with Step S194 to Step S196. Alternatively, Step S194 to Step S196 are performed before Step S191 to Step S193. Alternatively, Step S191 to Step S193 are performed before Step S194 to Step S196.

For Step S192, the controller may determine, from the target point cloud of the first stacking object based on a first projection relationship, the boundary point cloud, corresponding to the boundary line of the first grayscale image, of the first stacking object.

Herein, the first projection relationship refers to a relationship between the target point cloud of the first stacking object and the first grayscale image.

For Step S195, the controller may determine, from the target point cloud of the second stacking object based on a second projection relationship, the boundary point cloud, corresponding to the boundary line of the second grayscale image, of the second stacking object.

Herein, the second projection relationship refers to a relationship between the target point cloud of the second stacking object and the second grayscale image.

In the following, the first boundary line TC1 of the first grayscale image, the third boundary line TC3 of the first grayscale image, and the fifth boundary line TC5 of the first grayscale image are taken as an example, to describe how to respectively obtain a first boundary point cloud S1, a third boundary point cloud S3, and a fifth boundary point cloud S5 based on the first projection relationship.

The first boundary point cloud S1 (for example, S1 in FIG. 20) corresponding to the first boundary line TC1 of the first grayscale image, the third boundary point cloud S3 (for example, S3 in FIG. 20) corresponding to the third boundary line TC3 of the first grayscale image, and the fifth boundary point cloud S5 (for example, S5 in FIG. 20) corresponding to the fifth boundary line TC5 of the first grayscale image may be determined, based on the first projection relationship described above, through the first boundary line TC1 (for example, TC1 in FIG. 17) of the first grayscale image, the third boundary line TC3 (for example, TC3 in FIG. 17) of the first grayscale image, and the fifth boundary line TC5 (for example, TC5 in FIG. 17) of the first grayscale image described above.

In the following, the second boundary line TB2 of the second grayscale image, the fourth boundary line TB4 of the second grayscale image, and the sixth boundary line TB6 of the second grayscale image are taken as an example, to describe how to respectively obtain a second boundary point cloud T2, a fourth boundary point cloud T4, and a sixth boundary point cloud T6 based on the second projection relationship.

The second boundary point cloud T2 (for example, T2 in FIG. 20) corresponding to the second boundary line TB2 of the second grayscale image, the fourth boundary point cloud T4 (for example, T4 in FIG. 20) corresponding to the fourth boundary line TB4 of the second grayscale image, and the sixth boundary point cloud T6 (for example, T6 in FIG. 20) corresponding to the sixth boundary line TB6 of the second grayscale image may be determined, based on the second projection relationship described above, through the second boundary line TB2 (for example, TB2 in FIG. 18) of the second grayscale image, the fourth boundary line TB4 (for example, TB4 in FIG. 18) of the second grayscale image, and the sixth boundary line TB6 (for example, TB6 in FIG. 18) of the second grayscale image described above.

In embodiments of the present disclosure, distribution of boundary point clouds directly reflects a geometrical shape of a corresponding stacking object. For example, a point cloud with six rectangular faces may be generated for a cubic stacking object.

Figure 20:
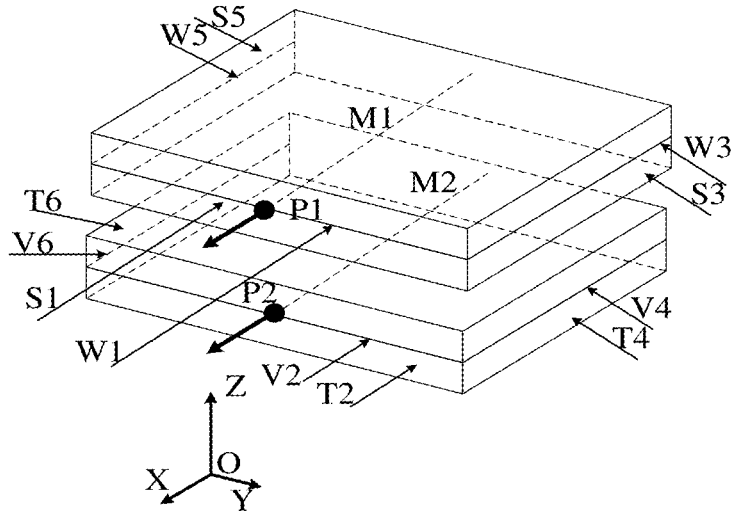
FIG. 20 is a schematic diagram of calculating a first target point and a second target point according to an embodiment of the present disclosure.

In FIG. 20, according to a geometrical shape (for example, a rectangular shape) of the first stacking object, the first boundary point cloud S1, the third boundary point cloud S3, and the fifth boundary point cloud S5 are distributed on respective rectangular faces of the first stacking object. According to a geometrical shape of the second stacking object, the second boundary point cloud T2, the fourth boundary point cloud T4, and the sixth boundary point cloud T6 are distributed on respective rectangular faces of the second stacking object.

In FIG. 20, a fitting process is performed, by using the least squares method, on the first boundary point cloud S1 distributed on the corresponding rectangular face, to obtain a first edge line W1; a fitting process is performed, by using the least squares method, on the third boundary point cloud S3 distributed on the corresponding rectangular face, to obtain a third edge line W3; and a fitting process is performed, by using the least squares method, on the fifth boundary point cloud S5 distributed on the corresponding rectangular face, to obtain a fifth edge line W5.

In FIG. 20, a fitting process is performed, by using the least squares method, on the second boundary point cloud T2 distributed on the corresponding rectangular face, to obtain a second edge line V2; a fitting process is performed, by using the least squares method, on the fourth boundary point cloud T4 distributed on the corresponding rectangular face, to obtain a fourth edge line V4; and a fitting process is performed, by using the least squares method, on the sixth boundary point cloud T6 distributed on the corresponding rectangular face, to obtain a sixth edge line V6.

In the following, the third edge line S3 is taken as an example that a fitting process is performed, by using the least squares method, on the third boundary point cloud S3 distributed on the rectangular face, to obtain the third edge line W3.

For example, a line y=mx+b is found on a rectangular face, where m denotes a slope, and b denotes an intercept, such that the line most closely approximates the third boundary point cloud S3 distributed on the rectangular face. The goal of the least squares method is to find values of m and b that minimize a sum of squares of vertical distances (namely, errors) from all points (namely, all points in the third boundary point cloud S3 distributed on the rectangular face) to the line. The line is determined by minimizing the sum of squares of the vertical distances (namely, errors) from all the points to the line, and the determined line is used as the third edge line W3.

It should be noted that, edge lines of the other boundary point clouds may be determined by using a same method as that applied to the third boundary point cloud.

In embodiments of the present disclosure, the first target point may be any point on the first stacking object, such as a midpoint (for example, P1 in FIG. 20) of the first edge line W1 of the first stacking object. The second target point may be any point on the second stacking object, such as a midpoint (for example, P2 in FIG. 20) of the second edge line V2 of the second stacking object. A midpoint is used as an example in corresponding accompanying drawings of the present disclosure.

In an example, in embodiments of the present disclosure, the first target point (for example, the first target point P1 in FIG. 20) and the second target point (the second target point P2 in FIG. 20) may be determined specifically in the following manner.

In FIG. 20, the first edge line W1 of the first stacking object is determined based on the first boundary point cloud S1; the third edge line W3 of the first stacking object is determined based on the third boundary point cloud S3; the fifth edge line W5 of the first stacking object is determined based on the fifth boundary point cloud S5; a first centerline M1 is determined based on the third edge line W3 and the fifth edge line W5; and the first target point P1 is determined based on the first centerline M1 and the first edge line W1.

In FIG. 20, the second edge line V2 of the second stacking object is determined based on the second boundary point cloud T2; he fourth edge line V4 of the second stacking object is determined based on the fourth boundary point cloud T4; the sixth edge line V6 of the second stacking object is determined based on the sixth boundary point cloud T6; a second centerline M2 is determined based on the fourth edge line V4 and the sixth edge line V6; and the second target point is determined based on the second centerline M2 and the second edge line V2.

The relative pose data involved in the embodiments includes a relative position difference and a relative angle difference. The relative position difference may be determined based on a position difference between the first target point P1 and the second target point P2.

In the following, several manners of determining the relative angle difference will be described in detail.

Manner 1:
calculating a first angle between the first edge line W1 and the second edge line V2, and determining the relative angle difference between the first stacking object and the second stacking object based on the first angle.

In FIG. 20, the first angle is an angle in the XOY plane in the 3D coordinate system, and the first angle is an angle formed by projecting both the first edge line W1 and the second edge line V2 onto the XOY plane.

Optionally, the first angle may alternatively be an angle between the third edge line W3 and the fourth edge line V4, or an angle between the fifth edge line W5 and the sixth edge line V6, or an angle between the seventh edge line and the eighth edge line.

Manner 2:
calculating a second angle between the first centerline M1 and the second centerline M2, and determining the relative angle difference between the first stacking object and the second stacking object based on the second angle.

In FIG. 20, the second angle is an angle in the XOY plane in the 3D coordinate system, and the second angle is an angle formed by projecting both the first centerline M1 and the second centerline M2 onto the XOY plane.

Manner 3:
calculating a second angle between the first centerline M1 and the second centerline M2;
calculating a first angle between the first edge line W1 and the second edge line V2;
acquiring the relative angle difference between the first stacking object and the second stacking object by weighting the first angle and the second angle.

Figure 21:
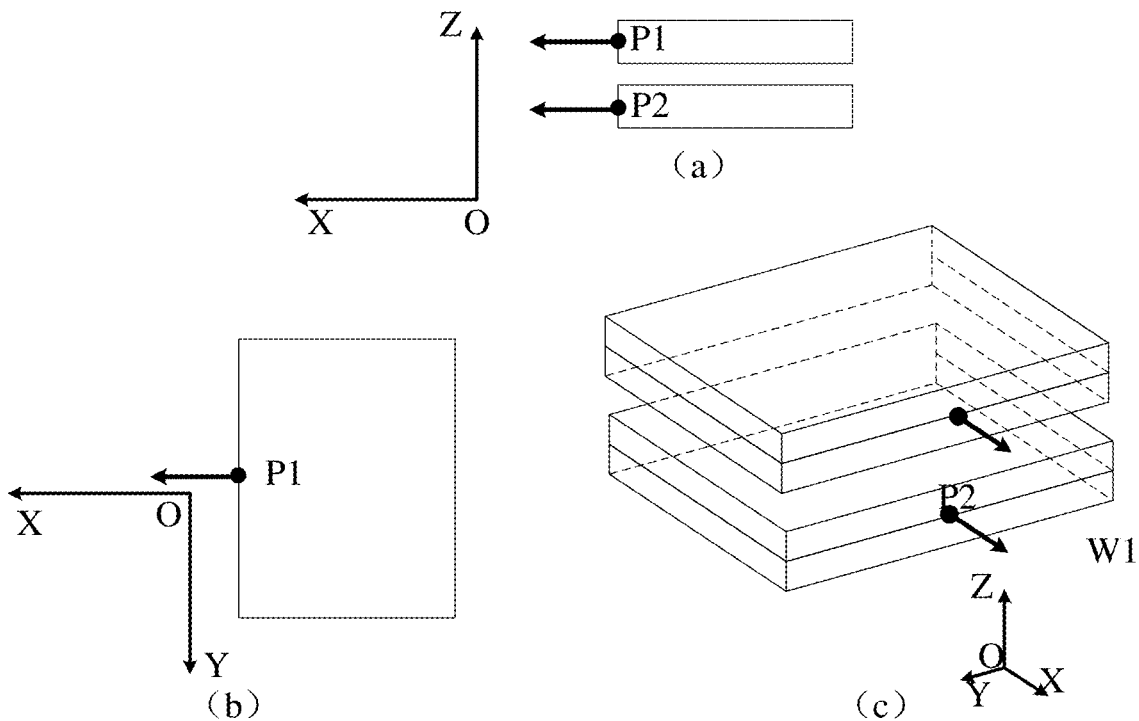
FIG. 21 is a schematic diagram of a direction indicated by an arrow at a first target point and a direction indicated by an arrow at a second target point from different perspectives according to an embodiment of the present disclosure.

In FIG. 20, the relative angle difference may be obtained by weighting the sum of the second angle between the first centerline M1 and the second centerline M2, and the first angle between the first edge line W1 and the second edge line V2. Allocation of a weighted ratio may be adjusted according to an actual situation. For example, when clarity of the boundary point clouds corresponding to the first edge line W1 and the second edge line V2 is higher, a weighted ratio of the first angle may be increased. In FIG. 20, an angle difference may be obtained by calculating a difference between a direction indicated by the arrow at the root of the upper arrow, namely, the arrow at the first target point P1, and a direction indicated by the arrow at the root of the lower arrow, namely, the arrow at the second target point P2. In addition, in parts (a) to (c) in FIG. 21, different perspectives from that in FIG. 20 are used to represent a direction indicated by the first target point arrow and a direction indicated by the second target point arrow.

Manner 4:
  determining a first angle value of the first stacking object;
  determining a second angle value of the second stacking object; and
  determining the relative angle difference between the first stacking object and the second stacking object based on a difference between the first angle value and the second angle value.

The determining the first angle value of the first stacking object may include:
  determining the first angle value of the first stacking object based on an angle of the first edge line W1; or
  determining the first angle value of the first stacking object based on an angle of the first centerline M1; or
  obtaining the first angle value of the first stacking object by weighting the angle of the first centerline M1 and the angle of the first edge line W1. A weighted ratio may be adjusted according to an actual situation, for example, when clarity of the boundary point cloud data corresponding to the first edge line W1 is higher, the weighted ratio of the angle of the first centerline W1 may be increased appropriately.

Similarly, the determining the second angle value of the second stacking object may include:
  determining the second angle value of the second stacking object based on an angle of the second edge line V2; or
  determining the second angle value of the second stacking object based on an angle of the second centerline M2; or
  obtaining the second angle value of the second stacking object by weighting the angle of the second centerline M2 and the angle of the second edge line V2. A weighted ratio may be adjusted according to an actual situation, for example, when clarity of the boundary point cloud data corresponding to the second edge line V2 is higher, the weighted ratio of the second edge line V2 may be increased appropriately.

In addition, it should be noted that, the first angle value of the first stacking object and the second angle value of the second stacking object may be flexibly selected according to an actual situation. For example, when the first angle value of the first stacking object is determined based on the angle of the first edge line W1, the second angle value of the second stacking object may be determined based on the angle of the second centerline M2.

In embodiments of the present disclosure, the boundary line of the first grayscale image may be obtained in the following manner: extracting lines from the first grayscale image by using a probabilistic Hough transform line detection algorithm, and determining the boundary line of the first grayscale image from the extracted lines based on a size of the first stacking object. The boundary line of the second grayscale image is obtained in the following manner: extracting lines from the second grayscale image by using the probabilistic Hough transform line detection algorithm, and determining the boundary line of the second grayscale image from the extracted lines based on a size of the second stacking object.

Herein, for the probabilistic Hough transform line detection algorithm (Probabilistic Hough Transform), a calculation amount may be reduced by randomly selecting parameters of an edge point in parameter space.

In a rectangular coordinate system, a line in the first grayscale image may be represented in polar coordinates as $r = x \cos \theta + y \sin \theta$, where r denotes a distance from the line to an origin and $\theta$ denotes a direction angle of the line. Each edge point in the first grayscale image corresponds to a sine curve in the parameter space, and intersections of these curves represent a line passing through these points. For the probabilistic Hough transform, edge points are randomly selected to calculate curves respectively corresponding to the edge points in the parameter space, and then intersections of these curves may be used to determine parameters of a line.

Herein, a size of the first stacking object may include a length, a width, and a height. These sizes are used as a basis for selecting and matching a line from extracted lines, so that the boundary line of the first grayscale image may be determined.

In embodiments of the present disclosure, a conventional probabilistic Hough transform line detection algorithm may be used to extract a line from a grayscale image. In scenarios with simple structures of the first stacking object and the second stacking object and few environmental interferences, Hough transform line detection may also be used.

However, to adapt to a first stacking object and a second stacking object with more complex structures and improve detection accuracy, the probabilistic Hough transform line detection algorithm has been improved in embodiments of the present disclosure. Specifically, the extracting a line from a grayscale image (namely, the first grayscale image or the second grayscale image) by using the improved probabilistic Hough transform line detection algorithm may include the following steps:
  sorting pixels in the grayscale image by grayscale values to obtain a pixel sequence set, where the pixel sequence set includes a plurality of pixel sequences, with each pixel sequence including pixels corresponding to a same grayscale value; sequentially selecting, according to the sorting, a pixel sequence as a current pixel sequence, and randomly selecting a pixel from the current pixel sequence to find a line with a highest probability within an angle range, where a quantity of pixels on the line meets a line length requirement and a sum of grayscale values on the line is maximized; if a distance between the found line and an extracted line is greater than or equal to a maximum line spacing threshold, extracting the line, removing the current pixel sequence from the pixel sequence set, and selecting a next pixel sequence as a current pixel sequence, until the pixel sequence set is empty.

It should be noted that the angle range and the maximum line spacing threshold described above, and a quantity of lines may all be line parameters selected in parameter space by the probabilistic Hough transform line detection algorithm.

For a pixel in the current pixel sequence, a set of line parameters (r and $\theta$ in a polar coordinate system) corresponding to the pixel are calculated, and voted in the parameter space. The angle range is used to limit a direction of a line to be searched for. The angle range is required to be adjusted depending on specific application scenarios.

In an example, parameters of a line include at least one of a pixel distance resolution, an angle resolution, an angle range, a minimum line length threshold, a maximum line spacing threshold, or a quantity of lines.

Specifically, (1) all pixels in the grayscale image are sorted in descending order of grayscale values to form a pixel sequence set; (2) a pixel sequence is sequentially selected from the pixel sequence set according to the descending order of grayscale values, and a pixel is randomly selected from the pixel sequence; (3) a line with a highest probability within an angle range is found within selected pixels, where a quantity of pixels on the line meets a line length threshold requirement (for example, the minimum line length threshold described above) and a sum of grayscale values on the line is maximized; (4) all pixels on the line are found, and whether a distance between the found line and an extracted line satisfies the maximum line spacing threshold is determined; and if no, (2) is performed; or if yes, (5) is performed; (5) the line is selected, and pixels on the line are removed from pixels to be selected; (6) whether all pixels in the pixel sequence set are traversed is determined; if yes, a selected line set is returned; otherwise, whether a quantity of selected lines meets a requirement is determined, and if no, (2) is performed; if yes, a selected line set is returned.

It should be noted that a manner of determining the boundary line of the second grayscale image is the same as a manner of determining the boundary line of the first grayscale image, and details are not described herein again.

In the following, the "controlling, based on the relative pose, material handling equipment to move, to align the first stacking object with the second stacking object" in Step S504 will be described in detail with reference to the embodiment.

Figure 32:
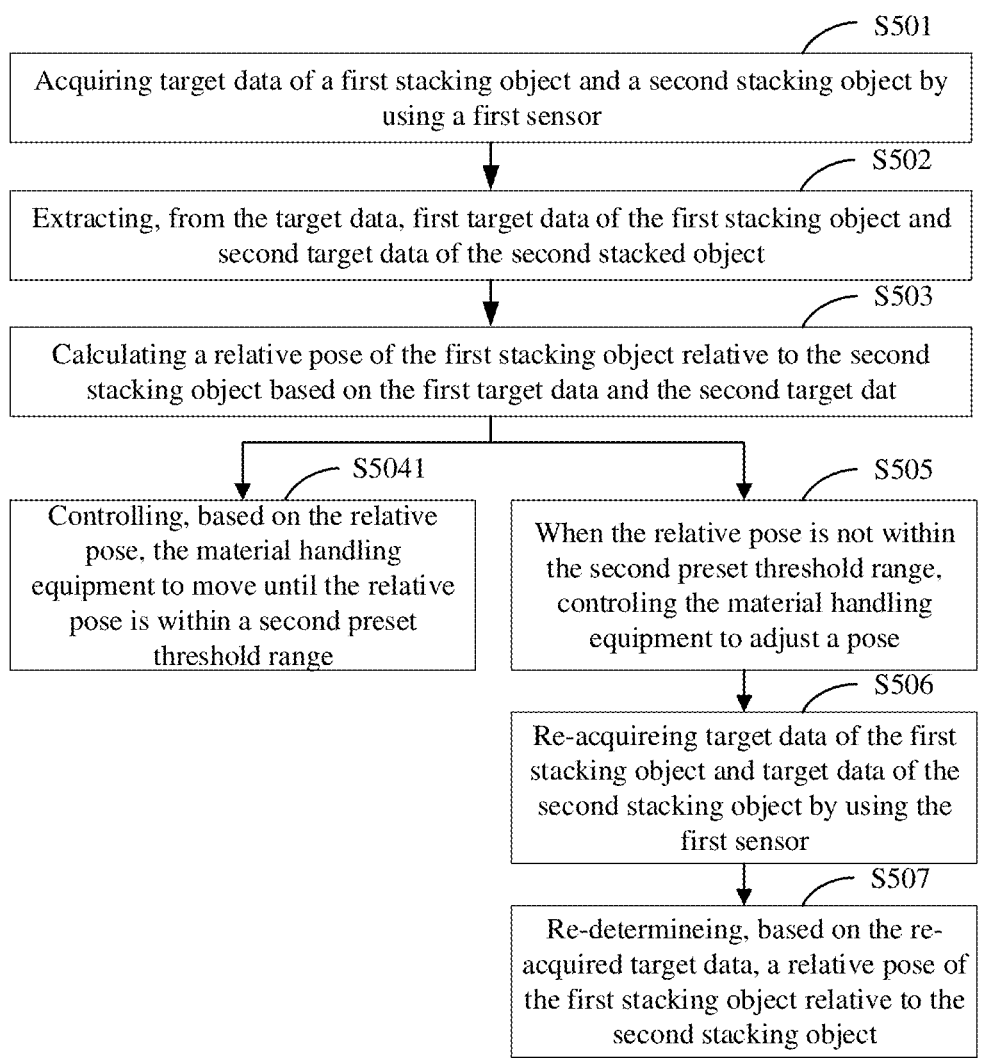
FIG. 32 is a flowchart of a method for aligning a first stacking object and a second stacking object according to still another embodiment of the present disclosure.
Figure 33:
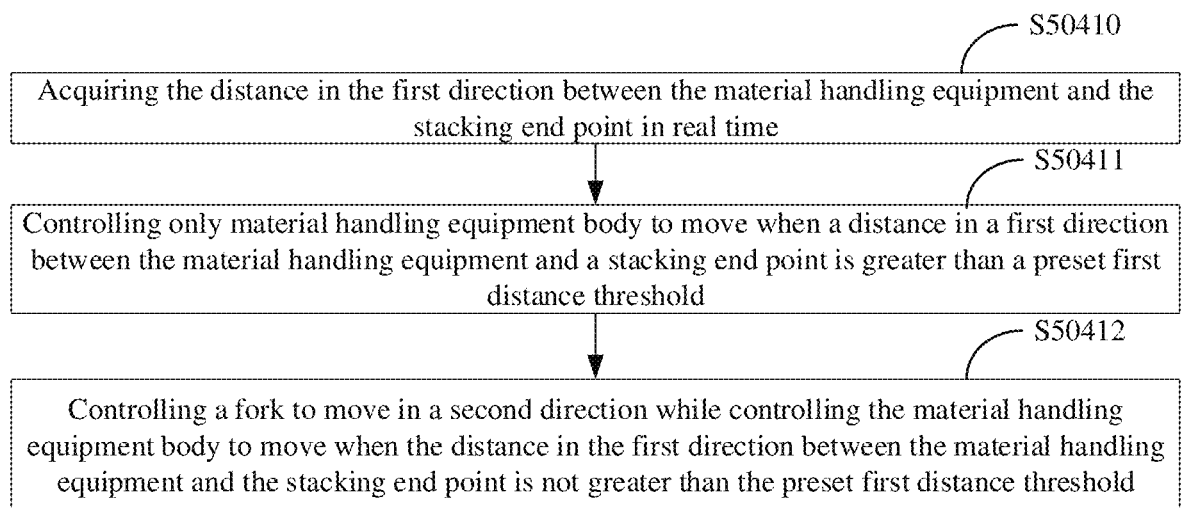
FIG. 33 is a flowchart of a method for aligning a first stacking object and a second stacking object according to still another embodiment of the present disclosure.

In embodiments of the present disclosure, once the relative pose between the first stacking object and the second stacking object is calculated, as shown in FIG. 32, the step S504 may include the following steps.

Step S5041: controlling, based on the relative pose, the material handling equipment to move until the relative pose is within a second preset threshold range.

Optionally, the second preset threshold range may be set to −5 mm<$\Delta x_2$<5 mm, −5 mm <$\Delta y_2$<5 mm, and −0.5°<$\Delta \theta_2$<0.5°. In the 3D coordinate system provided in embodiments of the present disclosure, $\Delta x_2$ refers to a relative position difference of the relative pose along the x-axis direction, $\Delta y_2$ refers to a relative position difference of the relative pose along the y-axis direction, and $\Delta \theta_2$ refers to a relative angle difference of the relative pose. It should be noted that, the threshold range is only an example and may be adjusted depending on different stacking objects and material handling equipment in practice.

Further, as shown in FIG. 32, the aligning method provided by embodiments of the present disclosure may further include the following steps.

Step S505: when the relative pose is not within the second preset threshold range, controlling the material handling equipment to adjust a pose.

Step S506: re-acquireing target data of the first stacking object and target data of the second stacking object by using the first sensor.

Step S507: re-determineing, based on the re-acquired target data, a relative pose of the first stacking object relative to the second stacking object.

Figure 34:
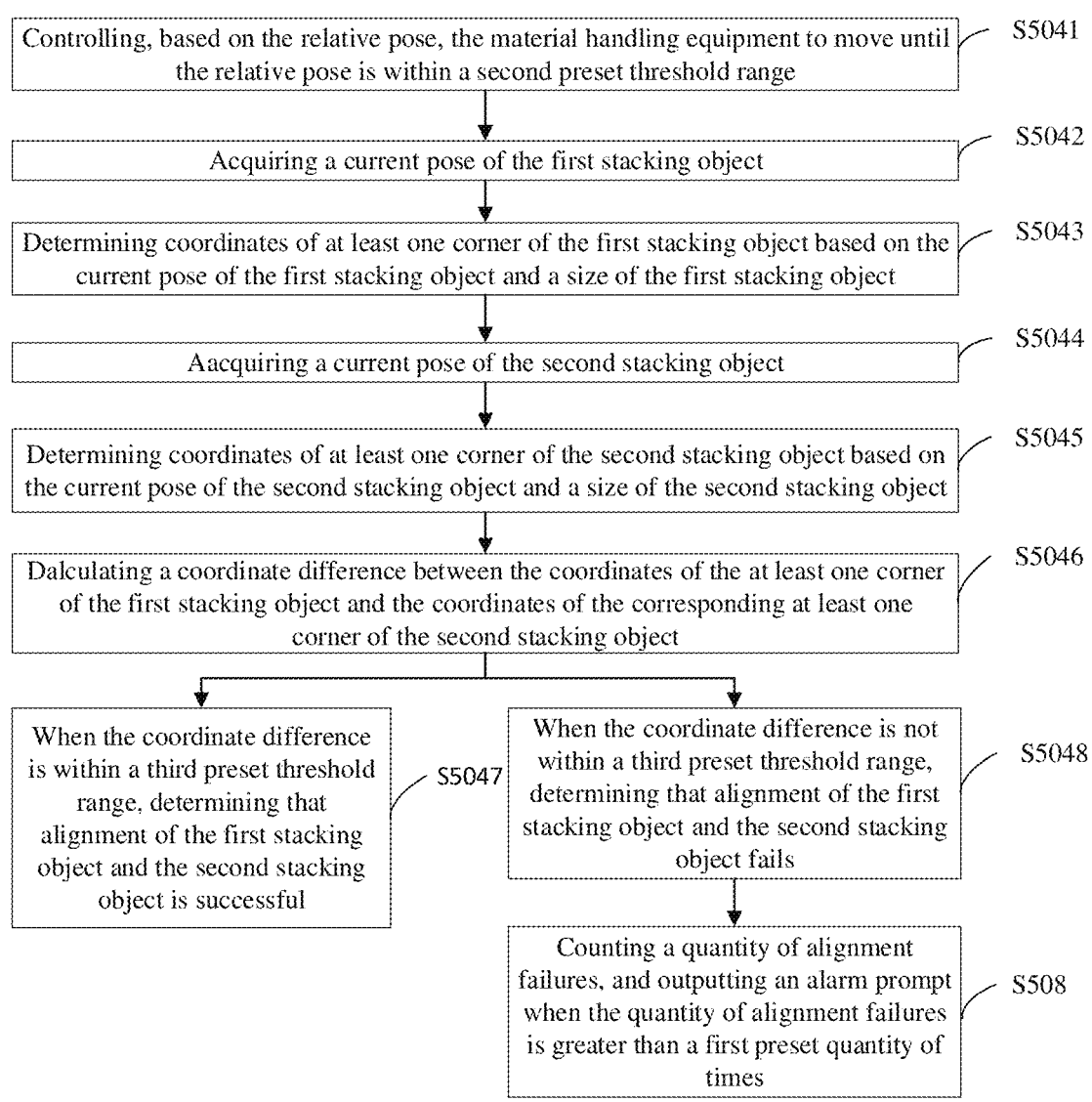
FIG. 34 is a flowchart of a controlling method for material handling equipment according to still another embodiment of the present disclosure.

According to an aligning method provided by embodiments of the present disclosure, in the process of controlling the material handling equipment to move, there may be two phases. FIG. 34 is a flowchart of a controlling method for material handling equipment provided by an embodiment of the present disclosure.

As shown in FIG. 32, a first phase may include the following steps.

Step S50411: controlling only material handling equipment body to move when a distance in a first direction between the material handling equipment and a stacking end point is greater than a preset first distance threshold.

The stacking end point refers to a position where the material handling equipment is located when the first stacking object and the second stacking object are aligned. The first direction is a traveling direction of the material handling equipment body.

In this case, errors of the X-axis and the Y-axis are corrected only by using a motion of a chassis of the material handling equipment body.

A second phase may include the following steps.

Step S50412: controlling a fork to move in a second direction while controlling the material handling equipment body to move when the distance in the first direction between the material handling equipment and the stacking end point is not greater than the preset first distance threshold.

In this case, errors of the X-axis and the Y-axis are corrected by using both a motion of the material handling equipment body and movement of the fork in the second direction. The movement of the fork in the second direction means that the fork moves, from side to side, in a direction, namely, the Y-axis direction, perpendicular to the traveling direction of the material handling equipment body.

Optionally, the first distance threshold may be set to, but is not limited to, 15 cm. Before step S50411, the first Phase may further include the following steps.

Step S50410: acquiring a distance in the first direction between the material handling equipment and the stacking end point in real time.

Figure 22:
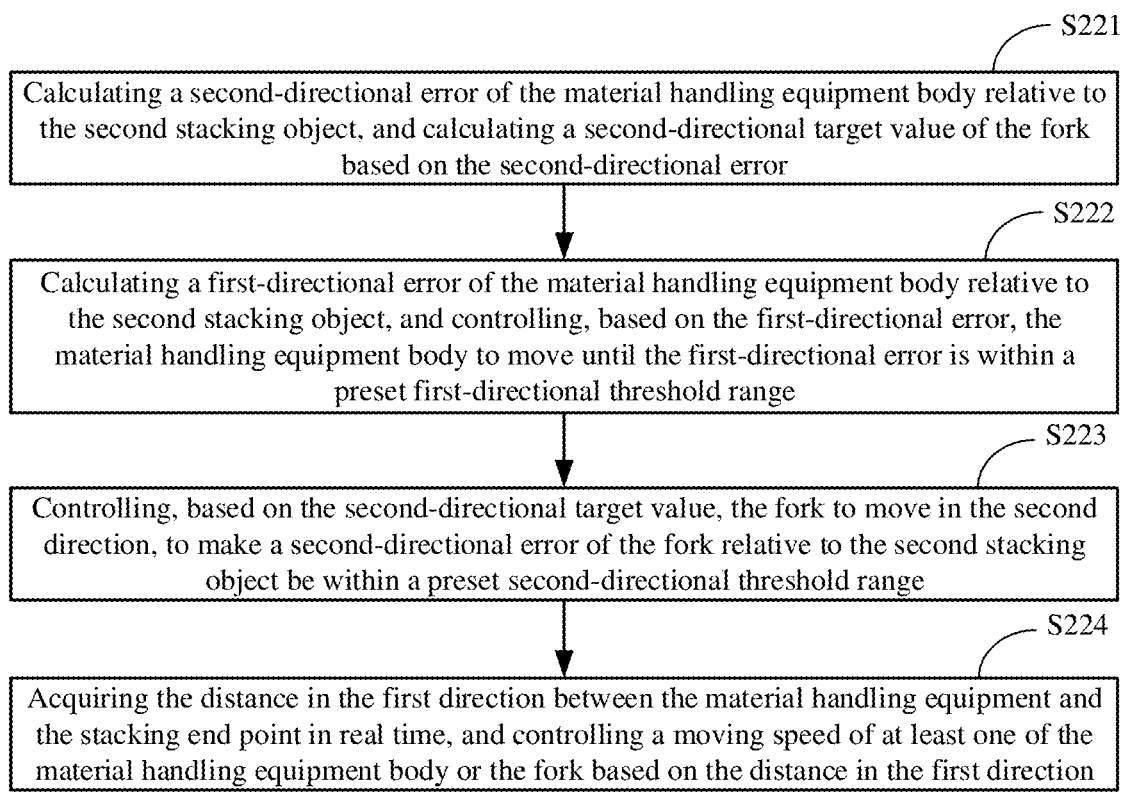
FIG. 22 is a flowchart of implementing a second phase of controlling material handling equipment to move according to an embodiment of the present disclosure.

FIG. 22 is a flowchart of implementing a second phase of controlling material handling equipment to move according to an embodiment of the present disclosure. As shown in FIG. 22, step S50412 may include the following steps.

Step 221: calculating a second-directional error of the material handling equipment body relative to the second stacking object, and calculating a second-directional target value of the fork based on the second-directional error.

In embodiments of the present disclosure, when the distance in the first direction between the material handling equipment and the stacking end point is less than 15 cm, the second phase of controlling the material handling equipment to move starts. In this case, a pose of the material handling equipment body and a position of the fork in the Y-axis may be acquired by using the first sensor. The position of the fork in the Y-axis is denoted as 'forkY_current'.

Figure 49:
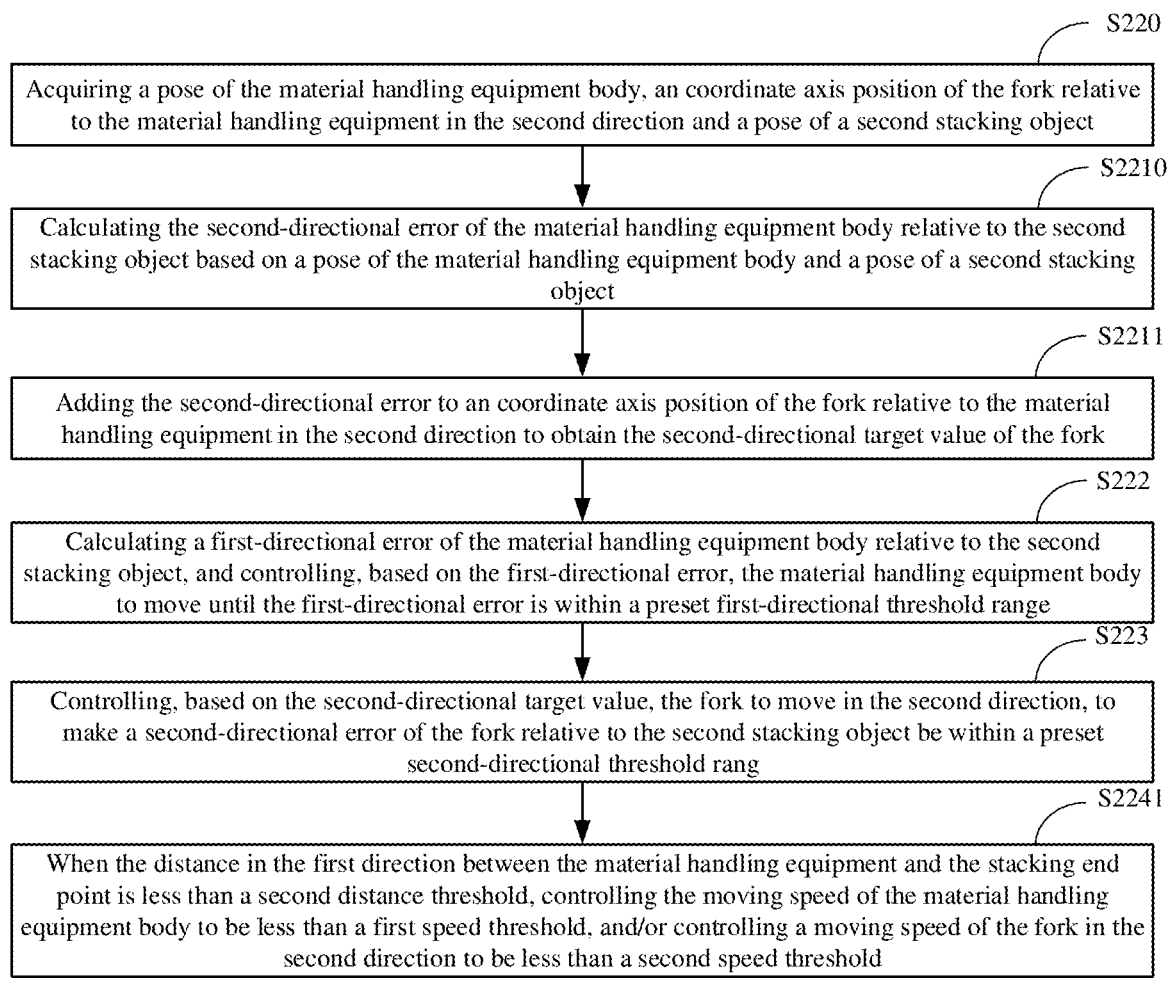
FIG. 49 is a flowchart of implementing a second phase of controlling material handling equipment to move according to another embodiment of the present disclosure.

FIG. 49 is a flowchart of implementing a second phase of controlling material handling equipment to move according to another embodiment of the present disclosure. Exemplarily, step S221 may include the following steps.

Step S2210: calculating the second-directional error of the material handling equipment body relative to the second stacking object based on a pose of the material handling equipment body and a pose of a second stacking object.

Step S2211: adding the second-directional error to an coordinate axis position of the fork relative to the material handling equipment in the second direction to obtain the second-directional target value of the fork.

Before step S221, Step S50412 may further include the following step.

Step S220: acquiring a pose of the material handling equipment body, an coordinate axis position of the fork relative to the material handling equipment in the second direction and a pose of a second stacking object.

Based on the pose of the material handling equipment body and the pose of the second stacking object, the second-directional error and the first-directional error of the material handling equipment body relative to the second stacking object may be obtained. The second-directional error of the material handling equipment body relative to the second stacking object is denoted as "dy", and thus a Y-axis target value (that is, the second-directional target value) of the fork is calculated according to "forkY_target=forkY_current+dy".

Herein the second direction refers to a lateral direction of the material handling equipment body, namely, the Y-axis direction; and the first direction refers to a forward-backward travelling direction of the material handling equipment body, namely, the X-axis direction.

Step S222: calculating a first-directional error of the material handling equipment body relative to the second stacking object, and controlling, based on the first-directional error, the material handling equipment body to move until the first-directional error is within a preset first-directional threshold range.

Step S223: controlling, based on the second-directional target value, the fork to move in the second direction, to make a second-directional error of the fork relative to the second stacking object be within a preset second-directional threshold range.

The material handling equipment body is controlled based on the first-directional error of the material handling equipment body relative to the second stacking object to move. Meanwhile, the fork is controlled based on the calculated second-directional target value to move in the second direction.

The operations of motion of the material handling equipment body and second-directional movement of the fork are performed repeatedly until the first-directional error of the material handling equipment body relative to the second stacking object is less than a preset first-directional threshold, and the second-directional error of the fork relative to the second stacking object is less than a preset second-directional threshold. Herein, the second-directional error of the fork relative to the second stacking object is an error between a Y-axis position of the fork ("forkY_current") and a Y-axis target value ("forkY_target") of the fork.

Optionally, the first-directional threshold range may be set to, but is not limited to, a threshold range of (−3, 3) mm, and the second-directional threshold range may be set to, but is not limited to, a threshold range of (−3, 3) mm.

In addition, because high perception and control accuracy is required in the alignment phase, the controlling method for material handling equipment according to embodiments of the present disclosure may further include the following steps.

Step S224: acquiring the distance in the first direction between the material handling equipment and the stacking end point in real time, and controlling a moving speed of at least one of the material handling equipment body or the fork based on the distance in the first direction. For example, as shown in FIG. 49, step S224 may include the following steps.

Step S2241: when the distance in the first direction between the material handling equipment and the stacking end point is less than a second distance threshold, controlling the moving speed of the material handling equipment body to be less than a first speed threshold, and/or controlling a moving speed of the fork in the second direction to be less than a second speed threshold.

Therein, the second distance threshold is less than the first distance threshold. The second distance threshold may be set to 30 cm, the first speed threshold may be set to 5 cm/s and the second speed threshold may be set to 5 cm/s.

For example, when the distance in the first direction between the material handling equipment and the stacking end point is less than 30 cm, the moving speed of the material handling equipment body is less than 5 cm/s, a direction change speed of the material handling equipment body is less than 0.2 rad/s, and the moving speed of the fork in the second direction is less than 5 cm/s.

Further, when the relative pose of the first stacking object relative to the second stacking object is within the second preset threshold range, to ensure accuracy of alignment, in embodiments of the present disclosure, final determining and confirmation may be further performed on the alignment state of the first stacking object and the second stacking object.

Specifically, FIG. 34 is a flowchart of a method for determining an alignment state according to an embodiment of the present disclosure. The method for determining an alignment state may also be implemented after step S5041. As shown in FIG. 34, the method for determining an alignment state may include the following steps.

Step S5042: acquiring a current pose of the first stacking object.

Step S5043: determining coordinates of at least one corner of the first stacking object based on the current pose of the first stacking object and a size of the first stacking object. Step S5044: acquiring a current pose of the second stacking object.

Step S5045: determining coordinates of at least one corner of the second stacking object based on the current pose of the second stacking object and a size of the second stacking object.

Step S5046: calculating a coordinate difference between the coordinates of the at least one corner of the first stacking object and the coordinates of the corresponding at least one corner of the second stacking object.

Step S5047: when the coordinate difference is within a third preset threshold range, determining that alignment of the first stacking object and the second stacking object is successful.

Step S5048: when the coordinate difference is not within a third preset threshold range, determining that alignment of the first stacking object and the second stacking object fails.

Figure 23:
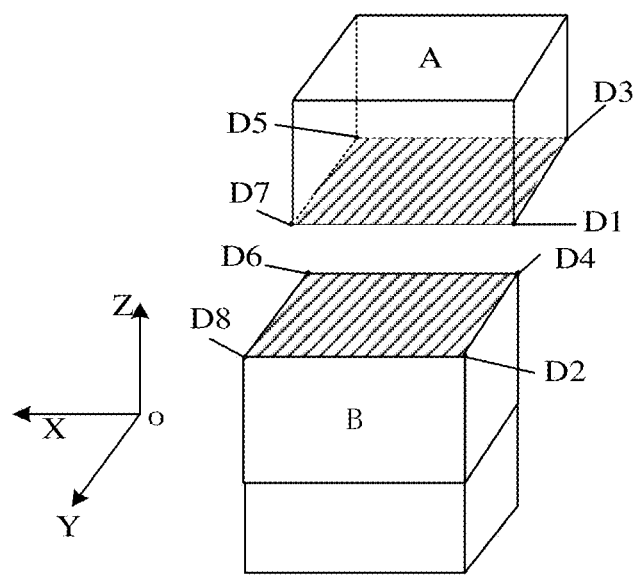
FIG. 23 is a schematic diagram of corner points of a first stacking object and a second stacking object according to an embodiment of the present disclosure.

It should be noted that, the at least one corner of the first stacking object corresponds to the at least one corner of the second stacking object in one to one correspondence. The correspondence refers to that two corners are adjacent to each other when the first stacking object and the second stacking object are aligned. As shown in FIG. 23, a first stacking object A includes a first corner D1, a third corner D3, a fifth corner D5, and a seventh corner D7, and a second stacking object B includes a second corner D2, a fourth corner D4, a sixth corner D6, and an eighth corner D8. When a relative pose of the first stacking object A relative to the second stacking object B is within a second preset threshold range, the first corner D1 and the second corner D2 are adjacent to each other, the third corner D3 and the fourth corner D4 are adjacent to each other, the fifth corner D5 and the sixth corner D6 are adjacent to each other, and the seventh corner D7 and the eighth corner D8 are adjacent to each other.

It is taken as an example that coordinates of four corners of the first stacking object and coordinates of four corners of the second stacking object are determined. To determine an alignment state, coordinates of the first corner D1, the third corner D3, the fifth corner D5, and the seventh corner D7 of the first stacking object and coordinates of the second corner D2, the fourth corner D4, the sixth corner D6, and the eighth corner D8 of the second stacking object are first determined. A first coordinate difference between the first corner D1 and the second corner D2, a second coordinate difference between the third corner D3 and the fourth corner D4, a third coordinate difference between the fifth corner D5 and the sixth corner D6, and a fourth coordinate difference between the seventh corner D7 and the eighth corner D8 are separately calculated. When the first coordinate difference, the second coordinate difference, the third coordinate difference, and the fourth coordinate difference are all within the third preset threshold range, alignment of the first stacking object and the second stacking object may be determined to be successful; otherwise, alignment of the first stacking object and the second stacking object may be determined to be failed.

Optionally, the third preset threshold of the coordinate difference may be set to, but is not limited to (−7, 7) mm in both the X-axis and Y-axis.

Further, considering that failure to align the first stacking object and the second stacking object may be caused by inaccuracy of odometer information, embodiments of the present disclosure further propose that the pose of the material handling equipment may be re-adjusted to determine whether the first stacking object and the second stacking object are aligned.

Figure 35:
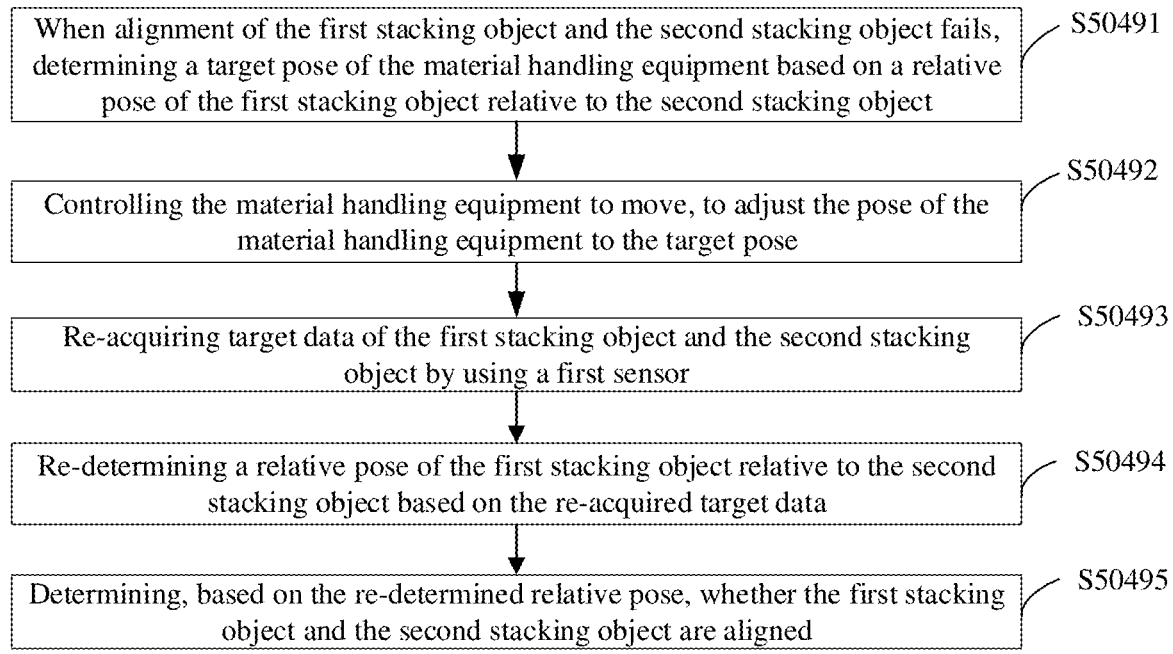
FIG. 35 is a flowchart of a method for aligning a first stacking object and a second stacking object according to still another embodiment of the present disclosure.

In an implementation, after step S5048, as shown in FIG. 35, the aligning method provided by an embodiment of the present disclosure may further include the following steps.

Step S50491: when alignment of the first stacking object and the second stacking object fails, determining a target pose of the material handling equipment based on a relative pose of the first stacking object relative to the second stacking object.

Step S50492: controlling the material handling equipment to move, to adjust the pose of the material handling equipment to the target pose.

Step S50493: re-acquiring target data of the first stacking object and the second stacking object by using a first sensor.

Step S50494: re-determining a relative pose of the first stacking object relative to the second stacking object based on the re-acquired target data.

Step S50495: determining, based on the re-determined relative pose, whether the first stacking object and the second stacking object are aligned.

Figure 36:
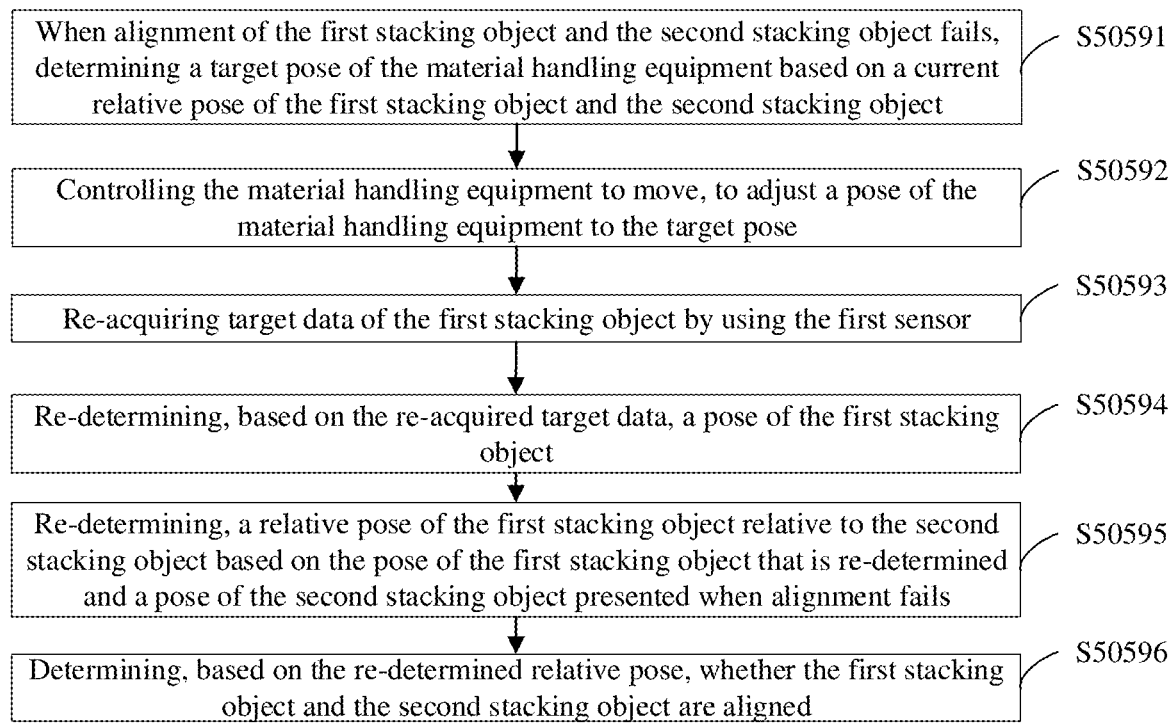
FIG. 36 is a flowchart of a method for aligning a first stacking object and a second stacking object according to still another embodiment of the present disclosure.

In another implementation, after step S5048, as shown in FIG. 36, the aligning method provided by another embodiment of the present disclosure may further include the following steps.

Step S50591: when alignment of the first stacking object and the second stacking object fails, determining a target pose of the material handling equipment based on a current relative pose of the first stacking object and the second stacking object.

Step S50592: controlling the material handling equipment to move, to adjust a pose of the material handling equipment to the target pose.

Step S50593: re-acquiring target data of the first stacking object by using the first sensor.

Step S50594: re-determining, based on the re-acquired target data, a pose of the first stacking object.

Step S50595: re-determining, a relative pose of the first stacking object relative to the second stacking object based on the pose of the first stacking object that is re-determined and a pose of the second stacking object presented when alignment fails.

Step S50596: determining, based on the re-determined relative pose, whether the first stacking object and the second stacking object are aligned.

Figure 37:
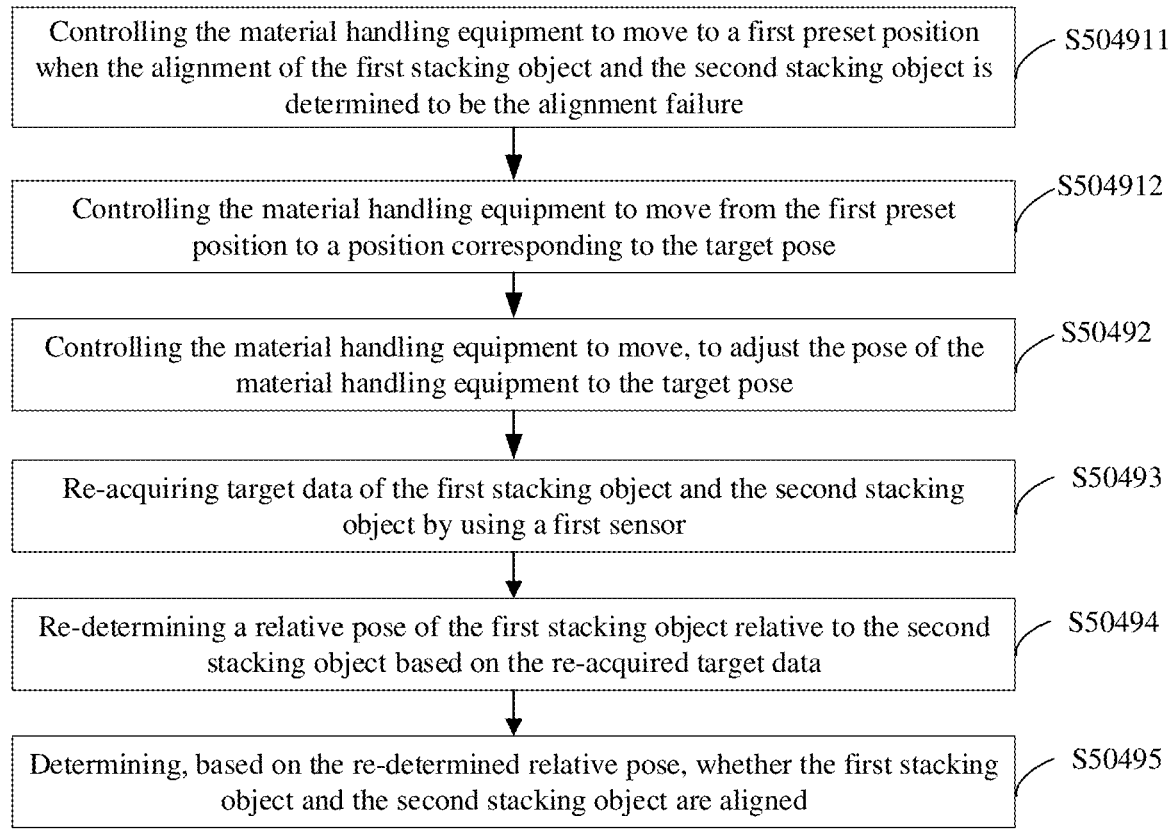
FIG. 37 is a flowchart of a method for aligning a first stacking object and a second stacking object according to still another embodiment of the present disclosure.

In the foregoing two implementations, as shown in FIG. 37, step of controlling the material handling equipment to move, to adjust a pose of the material handling equipment to the target pose may specifically include the following steps.

Step S504911: controlling the material handling equipment to move to a first preset position when the alignment of the first stacking object and the second stacking object is determined to be the alignment failure.

Step S504912: controlling the material handling equipment to move from the first preset position to a position corresponding to the target pose.

The first preset position herein refers to a position away from the second stacking object by a relative preset distance. The preset distance may be flexibly adjusted. for example, the preset distance may be set to 50 cm.

Further, when alignment of the first stacking object and the second stacking object fails, a retry mechanism for alignment failure is further provided in embodiments of the present disclosure.

Figure 38:
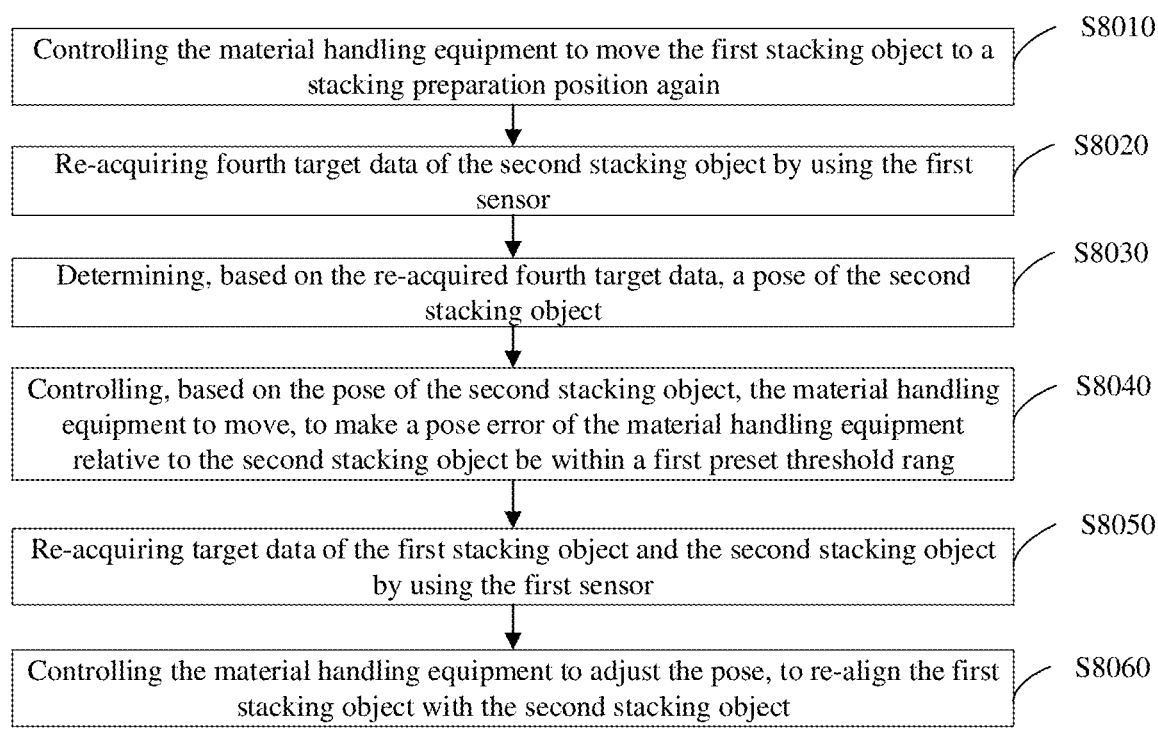
FIG. 38 is a flowchart of a method for aligning a first stacking object and a second stacking object according to still another embodiment of the present disclosure.

In an implementation, when alignment of the first stacking object and the second stacking object fails, as shown in FIG. 38, the following steps may be implemented.

Step S8010: controlling the material handling equipment to move the first stacking object to a stacking preparation position again.

Step S8020: re-acquiring fourth target data of the second stacking object by using the first sensor.

Step S8030: determining, based on the re-acquired fourth target data, a pose of the second stacking object.

Step S8040: controlling, based on the pose of the second stacking object, the material handling equipment to move, to make a pose error of the material handling equipment relative to the second stacking object be within a first preset threshold range.

Step S8050: re-acquiring target data of the first stacking object and the second stacking object by using the first sensor.

Step S8060: controlling the material handling equipment to adjust the pose, to re-align the first stacking object with the second stacking object.

In this manner, when alignment of the first stacking object and the second stacking object fails, the material handling equipment may be controlled to return to a start position, namely, the stacking preparation position, in a pre-alignment phase, to re-perform operations in the pre-alignment phase and the alignment phase, so as to implement re-alignment.

Figure 39:
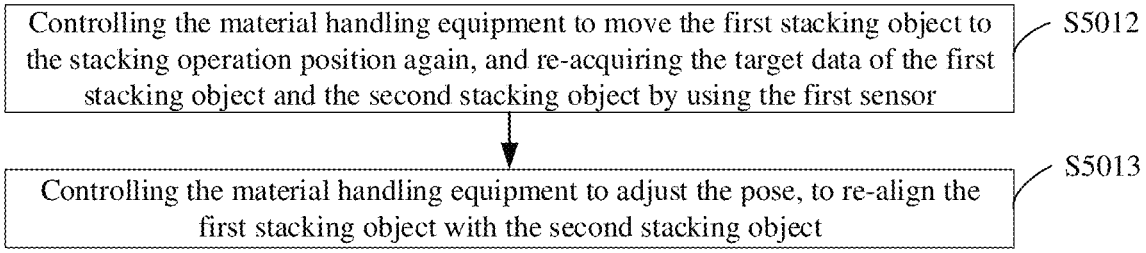
FIG. 39 is a flowchart of a method for aligning a first stacking object and a second stacking object according to still another embodiment of the present disclosure.

In another implementation, when alignment of the first stacking object and the second stacking object fails, as shown in FIG. 39, the following steps may be implemented.

Step S5012: controlling the material handling equipment to move the first stacking object to the stacking operation position again, and re-acquiring the target data of the first stacking object and the second stacking object by using the first sensor.

Step S5013: controlling the material handling equipment to adjust the pose, to re-align the first stacking object with the second stacking object.

Therein, step S5012 may include the following step.

Step S50120: controlling the material handling equipment to move close to the second stacking object until a distance in a first direction between the first sensor of the material handling equipment and the second stacking object is less than a first preset distance.

In this manner, when alignment of the first stacking object and the second stacking object fails, the material handling equipment may be controlled to return to a start position, namely, the stacking preparation position, in the pre-alignment phase, to re-perform operations in the alignment phase, so as to implement re-alignment.

In the retry mechanism for alignment failure, processes of re-prealignment and re-alignment are the same as implementation principles for the pre-alignment phase and the alignment phase, and details are not described herein again.

Further, as shown in FIG. 34, an embodiment of the present disclosure may further include the following step.

Step S508: counting a quantity of alignment failures, and outputting an alarm prompt when the quantity of alignment failures is greater than a first preset quantity of times.

According to the foregoing mechanism, when the quantity of alignment failures is excessive, an alarm prompt may be used to alert a user to intervene, avoiding invalid alignment retries.

After the pickup phase, the pre-alignment phase, and the alignment phase, an embodiment of the present disclosure may further include a stacking phase.

Figure 40:
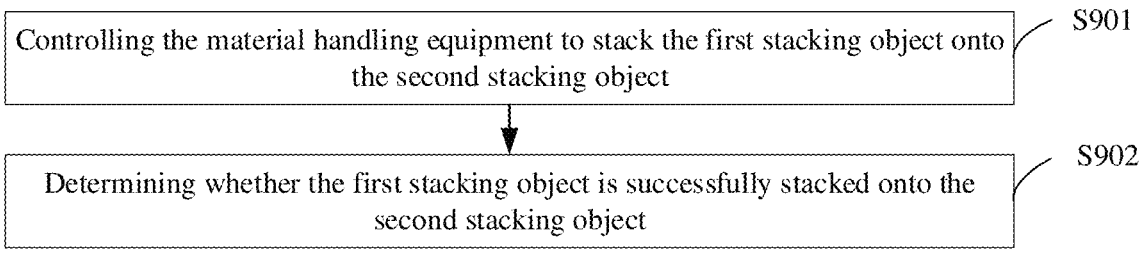
FIG. 40 is a flowchart of a method for aligning a first stacking object and a second stacking object according to still another embodiment of the present disclosure.

After the first stacking object and the second stacking object are aligned, as shown in FIG. 40, an embodiment of the present disclosure provides a method for determining a stacking state. The method for determining the stacking state may include the following steps.

Step S901: controlling the material handling equipment to stack the first stacking object onto the second stacking object.

Step S902: determining whether the first stacking object is successfully stacked onto the second stacking object.

Specifically, the first stacking object may be stacked onto the second stacking object by reducing a fork height of the material handling equipment. When the first stacking object is successfully stacked onto the second stacking object, the controller controls the material handling equipment to perform an end stacking operation. For example, the material handling equipment may be controlled to perform a fork-out operation.

To avoid the first stacking object from getting stuck or being partially stacked, in an embodiment of the present disclosure, a stacking state of the first stacking object relative to the second stacking object may be further determined, so as to determine whether the first stacking object is successfully stacked onto the second stacking object.

Figure 41:
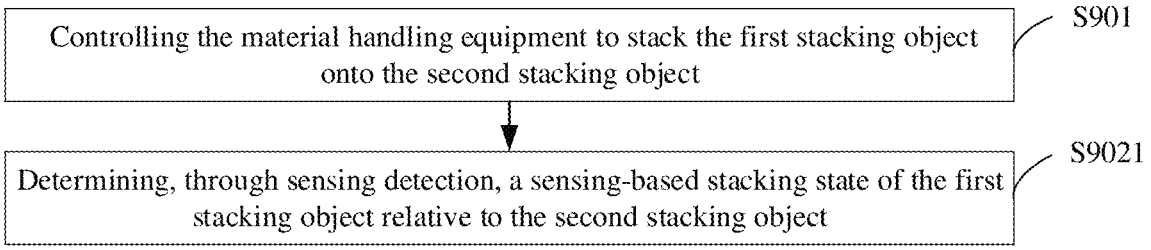
FIG. 41 is a flowchart of a method for aligning a first stacking object and a second stacking object according to still another embodiment of the present disclosure.

In an implementation, as shown in FIG. 41, step S902 may include the following step.

Step S9021: determining, through sensing detection, a sensing-based stacking state of the first stacking object relative to the second stacking object.

Figure 42:
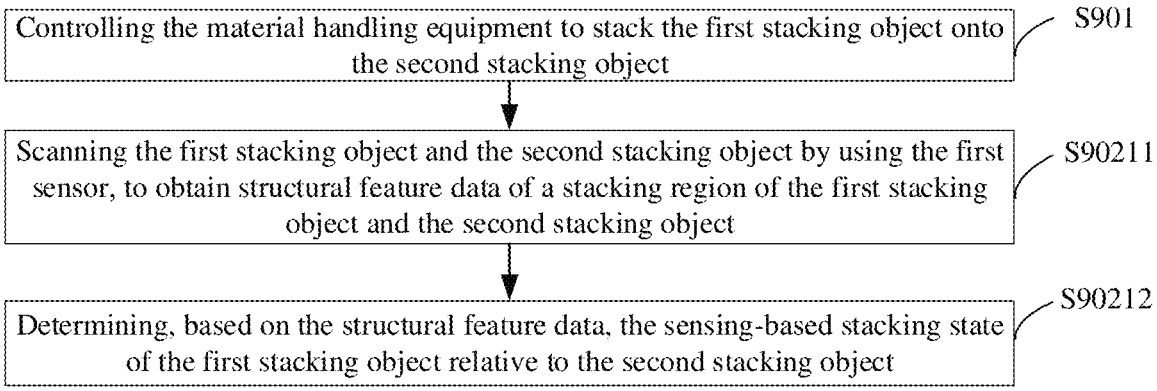
FIG. 42 is a flowchart of a method for aligning a first stacking object and a second stacking object according to still another embodiment of the present disclosure.

Specifically, as shown in FIG. 42, step S9021 may include the following step.

Step S90211: scanning the first stacking object and the second stacking object by using the first sensor, to obtain structural feature data of a stacking region of the first stacking object and the second stacking object.

Step S90212: determining, based on the structural feature data, the sensing-based stacking state of the first stacking object relative to the second stacking object.

Figure 43:
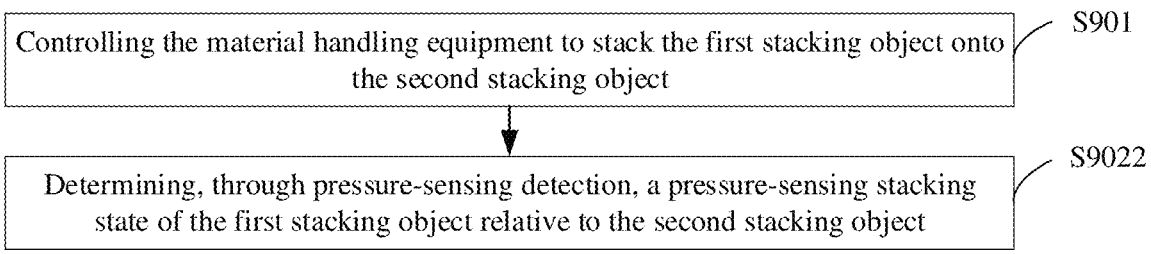
FIG. 43 is a flowchart of a method for aligning a first stacking object and a second stacking object according to still another embodiment of the present disclosure.

In another implementation, as shown in FIG. 43, step S902 may further include the following step.

Step S9022: determining, through pressure-sensing detection, a pressure-sensing stacking state of the first stacking object relative to the second stacking object.

Figure 44:
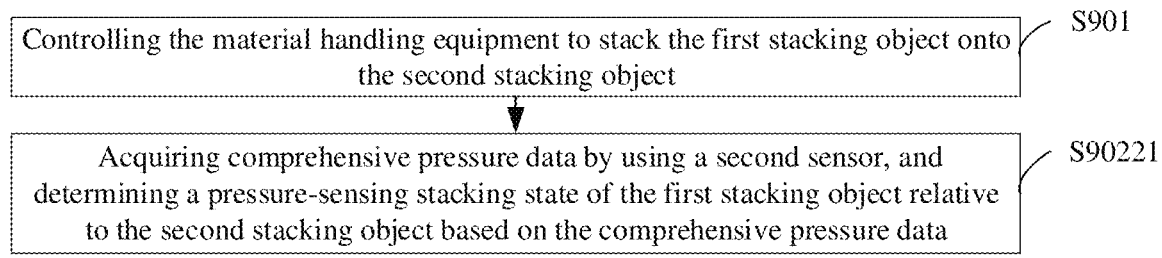
FIG. 44 is a flowchart of a method for aligning a first stacking object and a second stacking object according to still another embodiment of the present disclosure.

Specifically, as shown in FIG. 44, step S9022 may include the following step.

Step S90221: acquiring comprehensive pressure data by using a second sensor, and determining a pressure-sensing stacking state of the first stacking object relative to the second stacking object based on the comprehensive pressure data. The second sensor herein may be a pressure switch.

In a preferred manner, the sensing-based stacking state of the first stacking object relative to the second stacking object may be first determined in the sensing detection manner. When the sensing-based stacking state is the sensing-based stacking success, the pressure-sensing stacking state of the first stacking object relative to the second stacking object is then determined in the pressure-sensing detection manner. When the pressure-sensing stacking state is the pressure-sensing stacking success, it is determined that the first stacking object is successfully stacked onto the second stacking object. When the sensing-based stacking state is the sensing-based stacking failure, or the pressure-sensing stacking state is the pressure-sensing stacking failure, it is determined that the first stacking object fails to be stacked onto the second stacking object.

In addition, during determination of the sensing-based stacking state and the pressure-sensing stacking state, whether time for determining a stacking state exceeds a preset time may be further monitored. If the sensing-based stacking state or the pressure-sensing stacking state is not successfully determined within the preset time, the material handling equipment may also be controlled to send an alarm prompt. This may avoid falling into an infinite waiting state under exceptional circumstances.

Further, considering that the first stacking object failing to be stacked onto the second stacking object may be caused by an obvious obstacle on the second stacking object, when the first stacking object fails to be stacked onto the second stacking object, the material handling equipment may be controlled to lift the first stacking object. When the first stacking object is lifted, the obstacle may be removed. In this case, the controller controls the material handling equipment to re-stack the first stacking object onto the second stacking object, and further re-determines whether the stacking is successful.

Further, when the first stacking object fails to be stacked onto the second stacking object, an embodiment of the present disclosure further proposes a stacking failure retry mechanism used when stacking fails.

Figure 45:
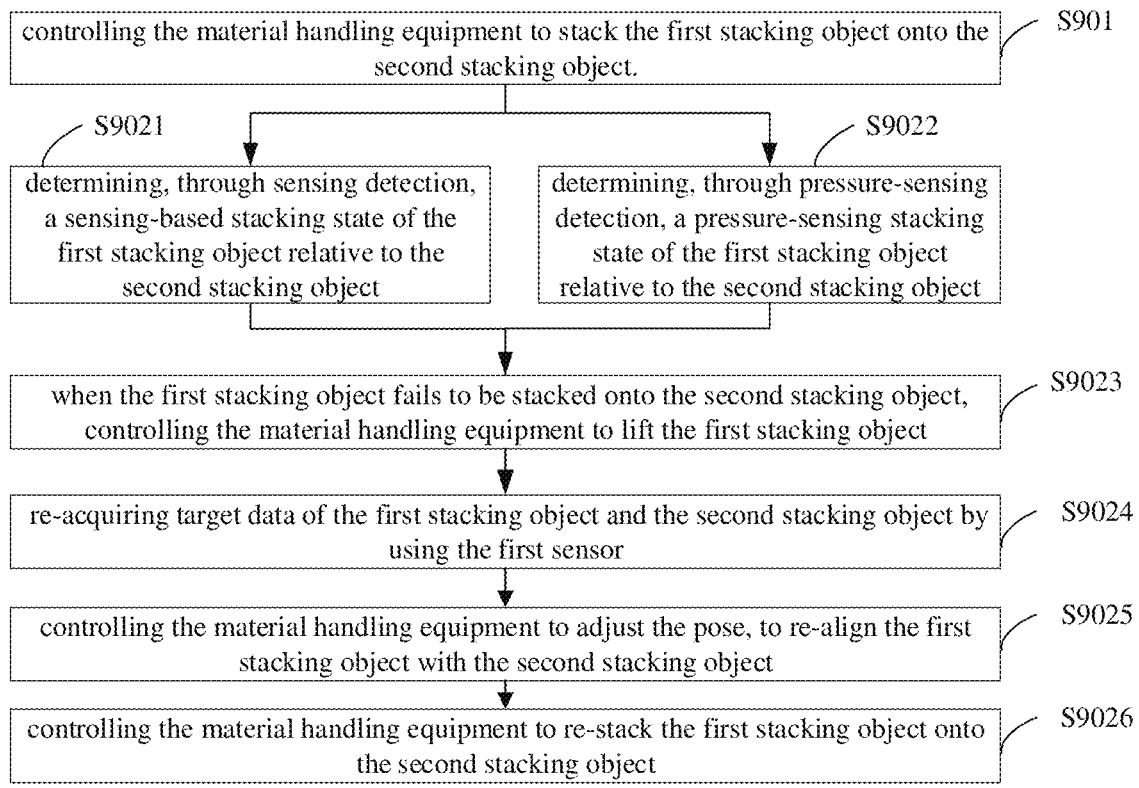
FIG. 45 is a flowchart of a method for aligning a first stacking object and a second stacking object according to still another embodiment of the present disclosure.

In an implementation, as shown in FIG. 45, step S902 may further include the following steps.

Step S9023: when the first stacking object fails to be stacked onto the second stacking object, controlling the material handling equipment to lift the first stacking object.

Step S9024: re-acquiring target data of the first stacking object and the second stacking object by using the first sensor.

Step S9025: controlling the material handling equipment to adjust the pose, to re-align the first stacking object with the second stacking object.

Step S9026: controlling the material handling equipment to re-stack the first stacking object onto the second stacking object.

In this manner, the material handling equipment body is not required to move. Only the first stacking object is required to lift, and the target data is re-acquired by using the first sensor to perform re-alignment and re-stacking.

Figure 46:
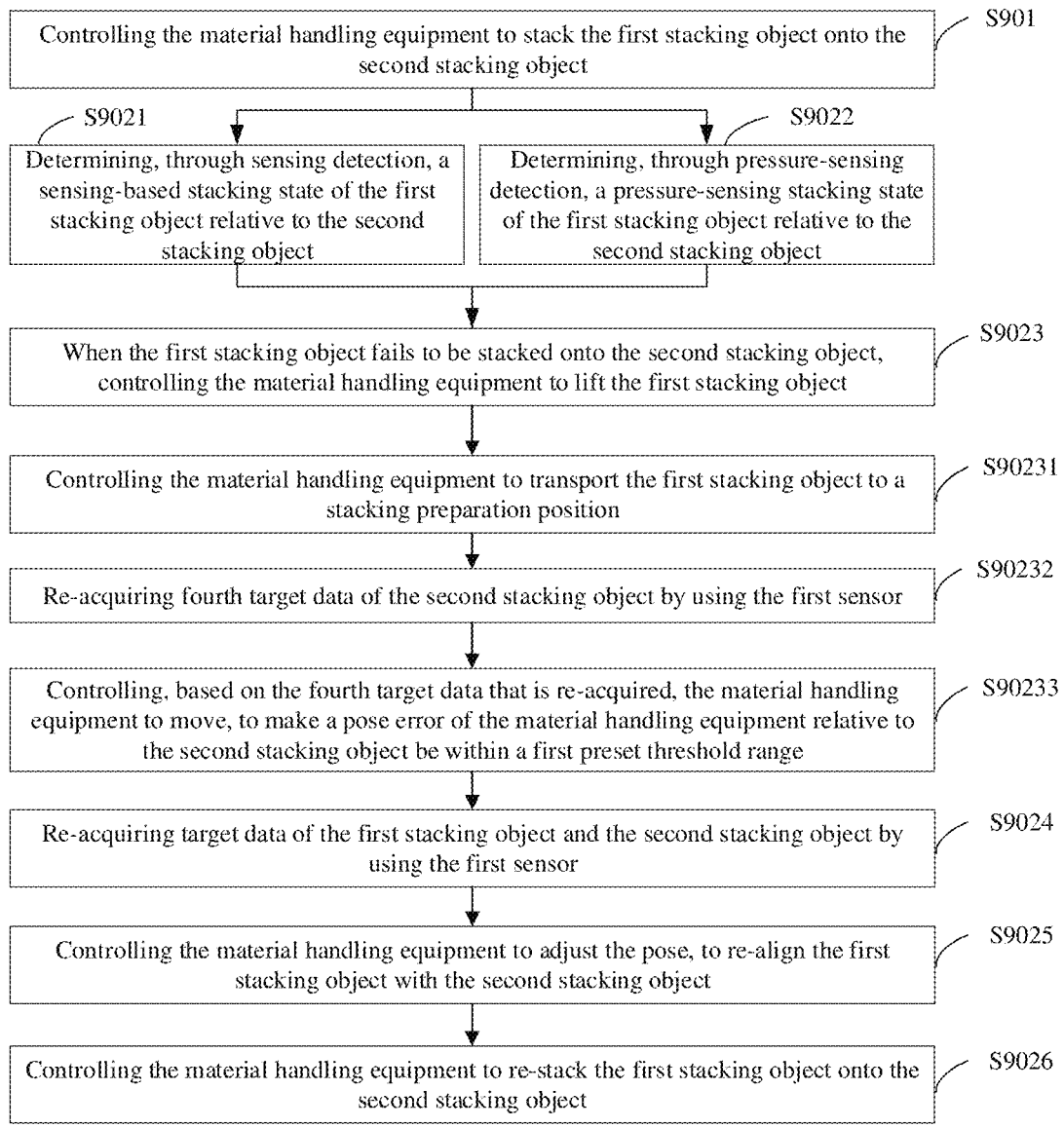
FIG. 46 is a flowchart of a method for aligning a first stacking object and a second stacking object according to still another embodiment of the present disclosure.

In another implementation, as shown in FIG. 46, step S902 may further include the following steps.

Step S9023: when the first stacking object fails to be stacked onto the second stacking object, controlling the material handling equipment to lift the first stacking object.

Step S90231: controlling the material handling equipment to transport the first stacking object to a stacking preparation position.

Step S90232: re-acquiring fourth target data of the second stacking object by using the first sensor.

Step S90233: controlling, based on the fourth target data that is re-acquired, the material handling equipment to move, to make a pose error of the material handling equipment relative to the second stacking object be within a first preset threshold range.

Step S9024: re-acquiring target data of the first stacking object and the second stacking object by using the first sensor.

Step S9025: controlling the material handling equipment to adjust the pose, to re-align the first stacking object with the second stacking object.

Step S9026: controlling the material handling equipment to re-stack the first stacking object onto the second stacking object.

In this manner, after the material handling equipment is controlled to lift the first stacking object, the material handling equipment is controlled to return to a start position, namely, the stacking preparation position, in the pre-alignment phase, and operations in the pre-alignment phase, the alignment phase, and the stacking phase are re-performed to implement re-alignment and re-stacking.

Figure 47:
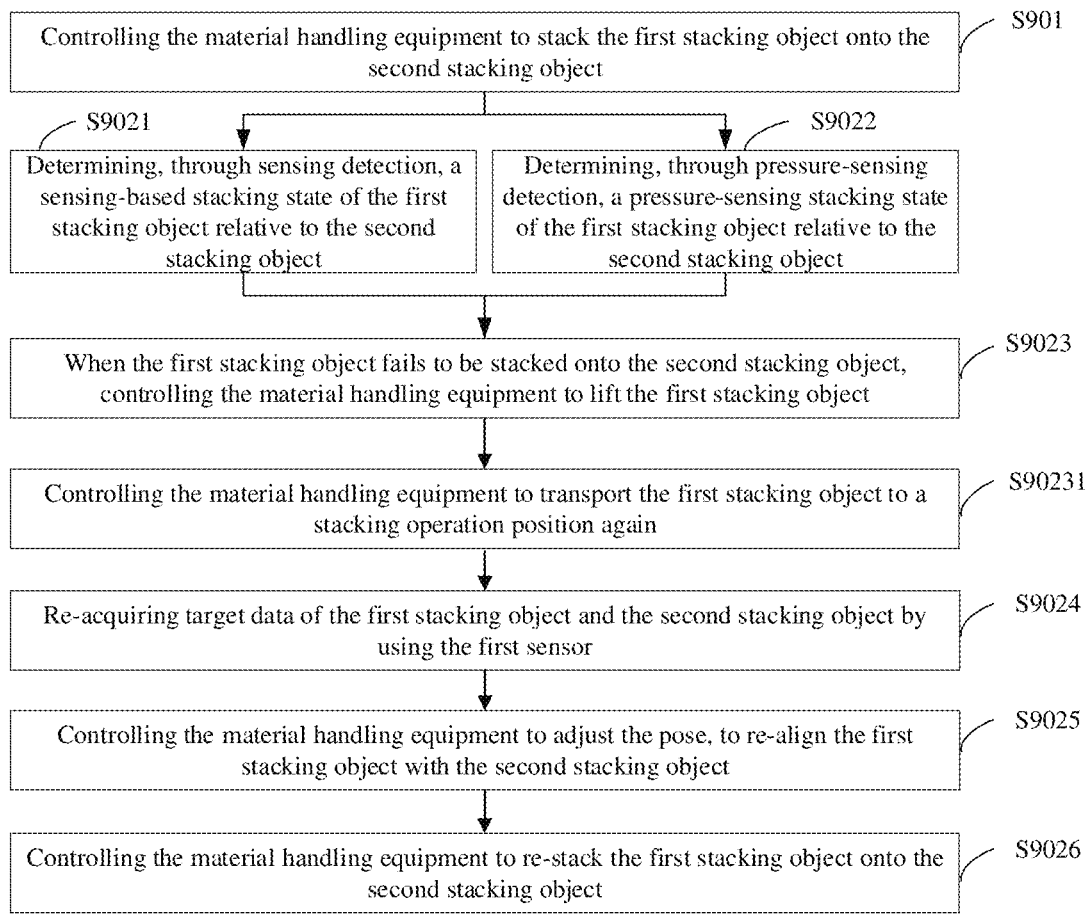
FIG. 47 is a flowchart of a method for aligning a first stacking object and a second stacking object according to still another embodiment of the present disclosure.

In another implementation, as shown in FIG. 47, step S902 may further include the following steps.

Step S9023: when the first stacking object fails to be stacked onto the second stacking object, controlling the material handling equipment to lift the first stacking object.

Step S90234: controlling the material handling equipment to transport the first stacking object to a stacking operation position again.

Step S9024: re-acquiring target data of the first stacking object and the second stacking object by using the first sensor.

Step S9025: controlling the material handling equipment to adjust the pose, to re-align the first stacking object with the second stacking object.

Step S9026: controlling the material handling equipment to re-stack the first stacking object onto the second stacking object.

In this manner, after the material handling equipment is controlled to lift the first stacking object, the material handling equipment is controlled to return to a start position, namely, the stacking operation position, in the alignment phase, and operations in the alignment phase and the stacking phase are re-performed to implement re-alignment and re-stacking.

In the retry mechanism for stacking failure, processes of re-prealignment, re-alignment, and re-stacking are the same as implementation principles for the pre-alignment phase, the alignment phase, and the stacking phase, and details are not described herein again.

Further, as shown in FIG. 40, the method for determining the stacking state may further include the following steps.

Step S903: counting a quantity of unsuccessful stacking times, and outputting an alarm prompt when the quantity of unsuccessful stacking times is greater than a second preset quantity of times.

According to the foregoing mechanism, when the quantity of unsuccessful stacking times is excessive, an alarm prompt may be used to alert a user to intervene, avoiding invalid stacking retries.

Figure 48:
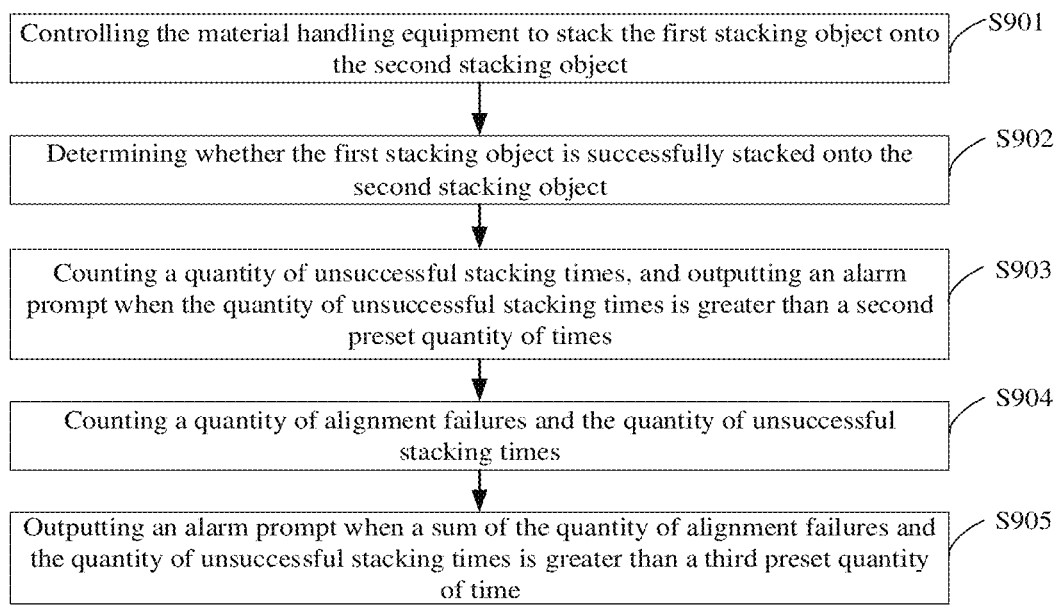
FIG. 48 is a flowchart of a method for aligning a first stacking object and a second stacking object according to still another embodiment of the present disclosure.

Further, as shown in FIG. 48, the method for determining the stacking state according to an embodiment of the present disclosure may further include the following steps.

Step S904: counting a quantity of alignment failures and the quantity of unsuccessful stacking times; and Step S905: outputting an alarm prompt when a sum of the quantity of alignment failures and the quantity of unsuccessful stacking times is greater than a third preset quantity of times.

According to the foregoing mechanism, when the sum of the quantity of alignment failures and the quantity of unsuccessful stacking times is excessive, an alarm prompt may be used to alert a user to intervene, avoiding invalid retries.

According to embodiments of the present disclosure, a full-procedure operation of the material handling equipment in the pickup phase for the first stacking object, the pre-alignment phase for the first stacking object and the second stacking object, the alignment phase, and the stacking phase is provided, thereby ensuring accuracy and efficiency of a stacking operation.

In the following, the methods provided in embodiments of the present disclosure will be described in detail by using an example in which the first stacking object is a material cage A and the second stacking object is a material cage B.

Figure 24:
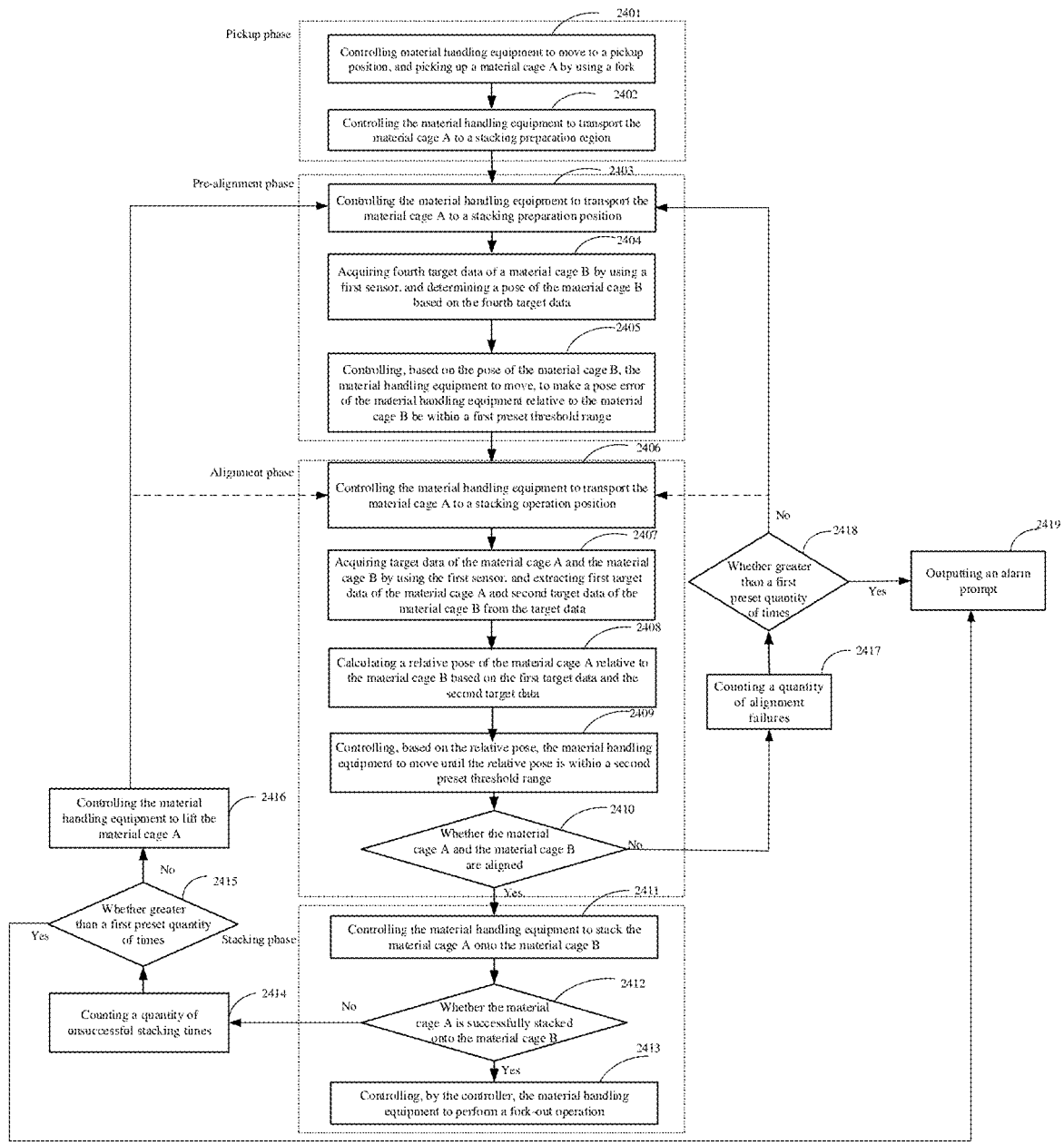
FIG. 24 is an entire schematic flowchart of a stacking operation according to an embodiment of the present disclosure.

FIG. 24 is an entire schematic flowchart of a stacking operation according to an embodiment of the present disclosure. The method provided in embodiments of the present disclosure may be divided into four parts: a pickup phase, a pre-alignment phase, an alignment phase, and a stacking phase.

The pickup phase may include the following steps.

Step S2401: controlling material handling equipment to move to a pickup position, and picking up a material cage A by using a fork.

Step S2402: controlling the material handling equipment to transport the material cage A to a stacking preparation region.

Before controlling the material handling equipment to move to a position of the material cage A, in a moving process, first sensor may be invoked to perform detection and pose calculation on the material cage A. Meanwhile, a path may be planed in real time, and the material handling equipment is controlled to complete pickup of the material cage A by using a fork.

Optionally, the first sensor may be a dual-Lidar and dual-camera architecture, and can perform high-density detection on a core feature region of the material cage A, and a detection density of the first sensor is twice as high as that of an original single Lidar, so that integration time is reduced by half, thereby significantly improving detection efficiency. In this way, an entire pickup process may be completed in a servo mode, that is, a key feature such as an upright or a socket of the material cage may be detected continuously by the material handling equipment without parking, thereby implementing an efficient pickup operation of detecting while moving to a stacking preparation region.

The pre-alignment phase may include the following steps.

Step S2403: controlling the material handling equipment to transport the material cage A to a stacking preparation position.

Step S2404: acquiring fourth target data of a material cage B by using the first sensor, and determining a pose of the material cage B based on the fourth target data.

Step S2405: controlling, based on the pose of the material cage B, the material handling equipment to move, to make a pose error of the material handling equipment relative to the material cage B be within a first preset threshold range.

The purpose of the pre-alignment phase is to ensure that the material handling equipment and the material cage B are substantially aligned before the alignment phase, so as to reduce the need for large error correction and improve overall efficiency and precision.

In the pre-alignment phase, before the material handling equipment carries the material cage A to move to the material cage B, the material handling equipment first lifts the fork to an optimal detection height, namely, the stacking preparation position, then calculates, by detecting features such as an upright of the material cage B, a pose of the material cage B, and adjusts the body to complete pre-alignment. In this phase, the controller may use a plurality of path planning manners to ensure that the body is substantially aligned with the material cage B in a traveling direction and a rotating direction. In addition, a forward and backward path planning policy is used to implement large error correction.

It should be noted that, in embodiments of the present disclosure, the first sensor keeps in an active state from start of servo pre-alignment to the stacking phase and in the entire retry process. The controller adopts different control policies at different phases to ensure precision and stability. In a conventional stacking operation solution, after picking up the material cage A by using the fork, the material handling equipment will turn off the first sensor after running a specific distance, which causes a lack of perception support (blind travel) in the last part of a travel process, thereby increasing a risk of cumulative errors.

The alignment phase may include the following steps.

Step S2406: controlling the material handling equipment to transport the material cage A to a stacking operation position.

Specifically, the material handling equipment is controlled to move close to the material cage B until a distance in a first direction between the material handling equipment and a stacking end point reaches 10 to 30 cm.

Step S2407: acquiring target data of the material cage A and the material cage B by using the first sensor, and extracting first target data of the material cage A and second target data of the material cage B from the target data.

Step S2408: calculating a relative pose of the material cage A relative to the material cage B based on the first target data and the second target data.

Step S2409: controlling, based on the relative pose, the material handling equipment to move until the relative pose is within a second preset threshold range.

Specifically, when the distance in the first direction between the material handling equipment and the stacking end point is greater than 15 cm, only the body of the material handling equipment is controlled to move.

When the distance in the first direction between the material handling equipment and the stacking end point is not greater than 15 cm, the fork is controlled to move in a second direction while the body of the material handling equipment is controlled to move.

Step S2410: determining whether the material cage A and the material cage B are aligned.

When it is determined that the material cage A and the material cage B are aligned, the stacking operation may be performed, that is, Step S2411 is performed. When it is determined that the material cage A and the material cage B are not aligned, the stacking operation may not be performed, and a retry procedure is performed, that is, Step S2417 is performed. The retry procedure may return to the pre-alignment phase or to the alignment phase.

Specifically, whether the material cage A and the material cage B are aligned may be determined in the following manner:

determining a current pose of the material cage A based on the relative pose;

determining coordinates of a first corner, a third corner, a fifth corner, and a seventh corner of the material cage A based on the current pose of the material cage A and a size of the material cage A; and determining coordinates of a second corner, a fourth corner, a sixth corner, and an eighth corner of the material cage B based on the current pose of the material cage B and a size of the material cage B;

calculating a first coordinate difference between the first corner and the second corner, a second coordinate difference between the third corner and the fourth corner, a third coordinate difference between the fifth corner and the sixth corner, and a fourth coordinate difference between the seventh corner and the eighth corner; and when the first coordinate difference, the second coordinate difference, the third coordinate difference, and the fourth coordinate difference are all within a third preset threshold range, determining that alignment of the material cage A and the material cage B is successful, and performing the stacking operation; otherwise, determining that alignment of the material cage A and the material cage B fails, and skipping performing the stacking operation.

After the pre-alignment phase is completed, the material handling equipment enters the alignment phase directly. In this case, a detection object of the first sensor is switched from the material cage B in the pre-alignment phase to stacking alignment planes of the material cage A and the material cage B. Based on synchronous observation of both material cages, a relative pose between the upper and lower material cages can be calculated in real time and transferred to the controller for correction. The whole process simulates a human-like operation manner, and a positional deviation in stacking is constantly corrected.

In the alignment phase, the material handling equipment continuously adjusts the body and the fork based on feedback information from the first sensor until the relative pose of the material cage A relative to the material cage B is corrected to a threshold range (namely, the first preset threshold) (for example, coordinate differences in the x-axis and y-axis are within a range of a threshold of (−5, 5) mm, and a rotation angle difference around the Z axis is within a range of a threshold of (−0.5°, 0.5°) set by the controller. After the relative pose meets the setting requirement, the first sensor performs final determination and confirmation, to ensure that coordinates of four corners of the upper and lower material cages are within a preset threshold range (namely, the third preset threshold) (for example, coordinate differences in the x-axis and y-axis are within a range of a threshold of (−10, 10) mm). In this case, the fork can be safely lowered, to complete a stacking operation.

If a preset threshold is not reached during the correction process, the material handling equipment body and the fork are continuously adjusted until a precision requirement is met. If it is still found, in the final determination, that coordinate differences of the four corners of the upper and lower material cages are not within the preset threshold range, the retry mechanism for alignment failure is started, and a retry procedure is entered to ensure that the material cage A and the material cage B can be successfully aligned. The retry mechanism is designed to cope with a large deviation and improve a success rate of the alignment by performing adjustment and correction many times.

According to a servo closed-loop alignment technology used in embodiments of the present disclosure, synchronous observation and controlled correction of upper and lower material cages are implemented by using the configured first sensor. Throughout the process, the first sensor remains active, monitors status of a material cage in real time, and forms closed-loop feedback between perception and control. In this way, accumulative errors in the stacking process such as a pose deviation caused by uneven ground, a deformation of a door frame, a perception and control error during pickup, an odometer error, and problems of sliding of a material cage on the fork in the stacking process may be effectively reduced.

The stacking phase may include the following steps.

Step S2411: controlling the material handling equipment to stack the material cage A onto the material cage B.

Step S2412: determining whether the material cage A is successfully stacked onto the material cage B, and when it is determined that the material cage A is successfully stacked onto the material cage B, performing Step S2413; otherwise, entering a retry procedure and performing Step S2414. The retry procedure may return to the pre-alignment phase or to the alignment phase.

Step S2413: controlling the material handling equipment to perform a fork-out operation. The procedure ends.

Step S2414: counting a quantity of unsuccessful stacking times.

Step S2415: determining whether the quantity of unsuccessful stacking times is greater than a second preset quantity of times, and when the quantity of unsuccessful stacking times is greater than the second preset quantity of times, performing Step S2419; otherwise, performing Step S2416.

Step S2416: controlling the material handling equipment to lift the material cage A. If the procedure returns to the pre-alignment phase, Step S2403 is performed. If the procedure returns to the alignment phase, Step S2406 is performed (as shown by dashed lines in FIG. 24).

Step S2417: counting a quantity of alignment failures.

Step S2418: determining whether the quantity of alignment failures is greater than a first preset quantity of times; and when the quantity of alignment failures is greater than the first preset quantity of times, performing Step S2419; otherwise, performing Step S2403 if the procedure returns to the pre-alignment phase; or performing Step S2406 (as shown by dashed lines in FIG. 24) if the procedure returns to the alignment phase.

Step S2419: outputting an alarm prompt. The procedure ends.

Based on closed-loop control on the entire stacking process, in embodiments of the present disclosure, stacking errors are simplified as a combination of a single control error and a single perception error, which greatly improves the precision. In this way, a success rate of stacking is improved, and a tolerance requirement for a material cage is lowered, so that the entire stacking process is more efficient and safer.

Because a closed-loop detection technology is used, in embodiments of the present disclosure, even if the material cage slides slightly in the retry process, there is no need to place the material cage on the ground to pick up again, thereby greatly simplifying complexity of the retry process and improving efficiency. The introduction of the retry mechanism significantly improves the success rate of stacking, making it close to 100%, thus effectively ensuring stability and reliability of the entire stacking process.

Figure 25:
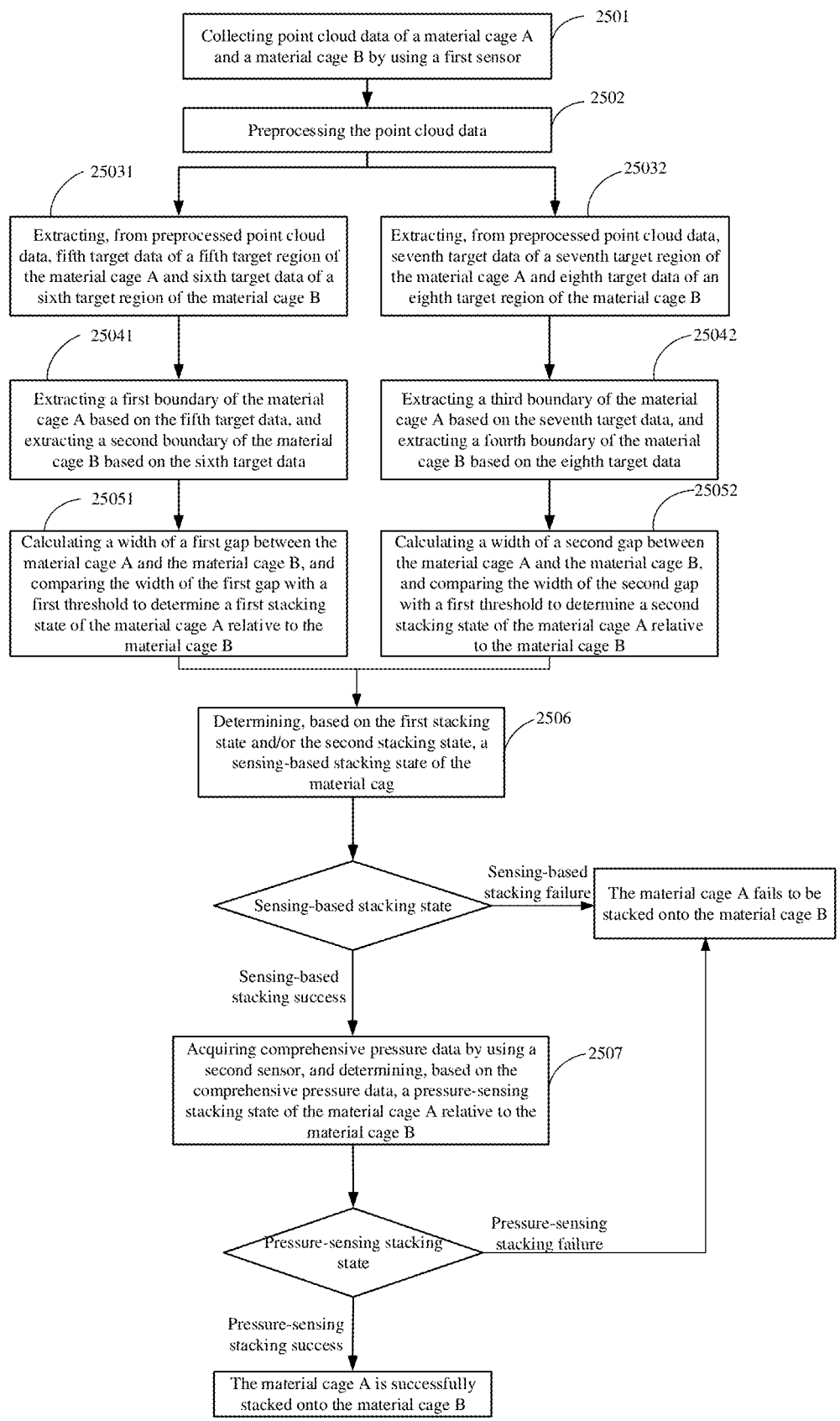
FIG. 25 is a flowchart of a method for determining a stacking state according to an embodiment of the present disclosure.

FIG. 25 is a specific implementation flowchart of determining whether the material cage A is successfully stacked onto the material cage B according to an embodiment of the present disclosure. The procedure shown in FIG. 25 is a specific implementation of Step S2412 in FIG. 24. The procedure specifically includes the following steps.

Step S2501: collecting point cloud data by using the first sensor, where the point cloud data is point cloud data of the material cage A and the material cage B.

Step S2502: preprocessing the point cloud data, including performing filtering processing on the point cloud data, removing a noise point from the point cloud data to reserve valid point clouds.

Step S25031: extracting, from preprocessed point cloud data, fifth target data of a fifth target region of the material cage A and sixth target data of a sixth target region of the material cage B.

In embodiments of the present disclosure, the fifth target region at least includes a bottom beam on a side of a first stacking object, and the sixth target region at least includes a top beam on a side of a second stacking object.

In a stacking process, along the X-axis, it may be observed that, in an implementation, as shown in FIG. 4a, the fifth target region includes a bottom beam on a left (or right) side of the first stacking object, and the sixth target region includes a top beam on a left (or right) side of the second stacking object. In another implementation, as shown in FIG. 4b, the fifth target region includes a bottom beam on a front (or rear) side of the first stacking object, and the sixth target region includes a top beam on a front (or rear) side of the second stacking object.

It should be noted that, the fifth target region and the sixth target region herein are only required to be located on a same side of the first stacking object and the second stacking object respectively and at least include a bottom beam and a top beam of the first stacking object and the second stacking object respectively, and specification positions thereof are not limited in embodiments of the present disclosure.

Specifically, the controller may obtain pre-stored specifications (such as size and shape) of the first stacking object and the second stacking object from a memory, and then determine the fifth target data of the fifth target region and the six target data of the sixth target region from the target data according to the specifications.

Step S25032: extracting, from preprocessed point cloud data, seventh target data of a seventh target region of the material cage A and eighth target data of an eighth target region of the material cage B.

In embodiments of the present disclosure, the seventh target region at least includes a bottom beam on a side of a first stacking object, and the eighth target region at least includes a top beam on a side of a second stacking object.

A manner of acquiring the seventh target data of the seventh target region is the same as that of acquiring the fifth target data of the fifth target region, and details are not described herein again.

A manner of acquiring the eighth target data of the eighth target region is the same as that of acquiring the sixth target data of the sixth target region, and details are not described herein again.

It should be noted that, the fifth target region and the seventh target region may be respectively located on opposite sides of the first stacking object, or may be respectively located on adjacent sides of the first stacking object. Similarly, the sixth target region and the eighth target region may be respectively located on opposite sides of the second stacking object, or may be respectively located on adjacent sides of the second stacking object. In embodiments of the present disclosure, it is only required to ensure that the fifth target region and the sixth target region are located on a same side, and the seventh target region and the eighth target region are located on a same side.

Step S25041: extracting a first boundary of the material cage A based on the fifth target data, and extracting a second boundary of the material cage B based on the sixth target data.

In an implementation, in the embodiment of the present disclosure, the fifth target data and the sixth target data are projected onto a two-dimensional plane to obtain a first projection, and then contour extraction is performed on the first projection to obtain the first boundary of the first stacking object and the second boundary of the second stacking object.

The two-dimensional plane herein may include but is not limited to a plane for projecting and analyzing target data in a coordinate system of material handling equipment.

When the fifth target region includes a bottom beam on a left (or right) side of the first stacking object, and the sixth target region includes a top beam on a left (or right) side of the second stacking object, the two-dimensional plane is an XOZ plane in a coordinate axis centered on the material handling equipment, where an X-axis represents a first direction (namely, a moving direction) of the material handling equipment, a Y-axis represents a second direction of the material handling equipment, and a Z-axis represents a height direction of the material handling equipment.

When the fifth target region includes the bottom beam on the front (or rear) side of the first stacking object, and the sixth target region includes the top beam on the front (or rear) side of the second stacking object, the two-dimensional plane is a YOZ plane in the coordinate axis centered on the material handling equipment.

It should be noted that, a projection direction is not limited to a direction perpendicular to the XOZ plane or the YOZ place, and any projection direction perpendicular to the Z axis may be used as the projection direction in the embodiments.

Step S25042: extracting a third boundary of the material cage A based on the seventh target data, and extracting a fourth boundary of the material cage B based on the eighth target data.

An implementation of this step is the same as an implementation principle of Step S25041, and details are not described herein again.

Step S25051: calculating a width of a first gap between the material cage A and the material cage B based on the first boundary and the second boundary, and comparing the width of the first gap with a first threshold to determine a first stacking state of the material cage A relative to the material cage B.

In embodiments of the present disclosure, the first stacking state includes a first safe state and a first unsafe state, where the first safe state refers to that the width of the first gap is less than or equal to the first threshold.

A target region configuration manner in FIG. 4a is used as an example to describe the first stacking state.

Figure 26:
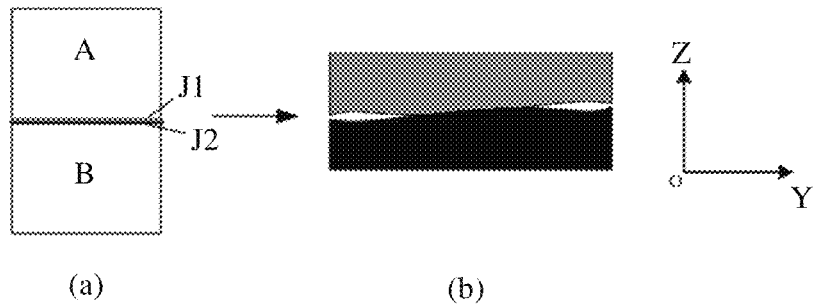
FIG. 26 is a schematic diagram of stacking success according to an embodiment of the present disclosure.

As shown in FIG. 26, part (a) in FIG. 26 is a side view in a case that the first stacking state is stacking successful, in which a gap width, that is formed by stacking a first stacking object A onto a second stacking object B and calculated based on a first boundary corresponding to a first edge J1 of the first stacking object A and a second boundary corresponding to a second edge J2 of the second stacking object B, is less than the first threshold. Part (b) in FIG. 26 is a projection obtained by projecting the first edge J1 and the second edge J2 on a YOZ plane.

Figure 27:
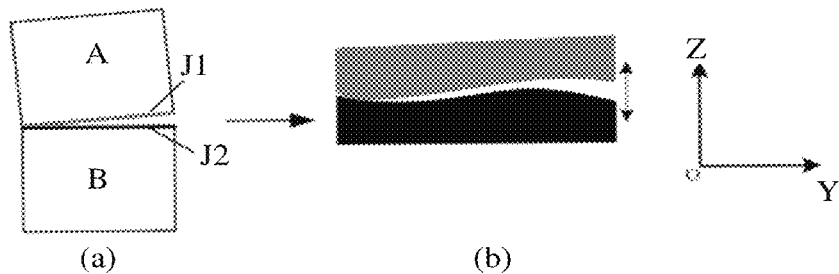
FIG. 27 is a schematic diagram of stacking failure according to an embodiment of the present disclosure.

As shown in FIG. 27, part (a) in FIG. 27 is a side view in a case that the first stacking state is stacking failed, in which a gap width, that is formed by stacking a first stacking object A onto a second stacking object B and calculated based on a first boundary corresponding to a first edge J1 of the first stacking object A and a second boundary corresponding to a second edge J2 of the second stacking object B is greater than or equal the first threshold. Part (b) in FIG. 27 is a projection obtained by projecting the first edge J1 and the second edge J2 on a YOZ plane.

Specifically, when the width of the first gap between the first stacking object and the second stacking object is calculated based on the first boundary and the second boundary, if the width of the gap formed between the first boundary and the second boundary is uneven, the width of the first gap is determined based on a maximum width of a gap formed between the first boundary and the second boundary.

It should be noted that, the first threshold in embodiments of the present disclosure may be obtained through automatic learning based on historical data, or may be set according to an actual requirement, which is not limited in embodiments of the present disclosure.

Step S25052: calculating a width of a second gap between the material cage A and the material cage B based on the third boundary and the fourth boundary, and comparing the width of the second gap with a first threshold to determine a second stacking state of the material cage A relative to the material cage B.

In embodiments of the present disclosure, the second stacking state includes a second safe state and a second unsafe state, and the second safe state refers to that the width of the second gap is less than or equal to the first threshold.

An implementation of this step is the same as an implementation principle of Step S25051, and details are not described herein again.

It should be further noted that, each pair of Step S25031 and Step S25032, Step S25041 and Step S25042, and Step S25051 and Step S25052 may be performed simultaneously, or only Step S25031, Step S25041, and Step S25051 may be performed, or only Step S25032, Step S25042, and Step S25052 are performed.

Step S2506: determining, based on the first stacking state and/or the second stacking state, a sensing-based stacking state of the material cage A relative to the material cage B; and performing Step S2507 when the sensing-based stacking state is sensing-based stacking success; otherwise, determining that the material cage A fails to be stacked onto the material cage B.

In this step, in the foregoing procedure, when only Step S25031, Step S25041, and Step S25051 are performed, the sensing-based stacking state of the material cage A relative to the material cage B is determined based on the first stacking state; when only Step S25032, Step S25042, and Step S25052 are performed, the sensing-based stacking state of the material cage A relative to the material cage B is determined based on the second stacking state; when each pair of Step S25031 and Step S25032, Step S25041 and Step S25042, and Step S25051 and Step S25052 are performed simultaneously, sensing-based stacking state of the material cage A relative to the material cage B is determined based on the first stacking state and the second stacking state.

The determining, based on the first stacking state and the second stacking state, the sensing-based stacking state of the material cage A relative to the material cage B specifically includes:

when the first stacking state is a first safe state, and the second stacking state is a second safe state, determining that the sensing-based stacking state is sensing-based stacking success; when the first stacking state is a first unsafe state and/or the second stacking state is a second unsafe state, determining the sensing-based stacking state to be sensing-based stacking failure.

In other word, when the width of the first gap is less than or equal to the first threshold, and the width of the second gap is less than or equal to the first threshold, it is determined the sensing-based stacking state to be sensing-based stacking success; when the width of the first gap is greater than the first threshold, or the width of the second gap is greater than the first threshold, it is determined the sensing-based stacking state to be sensing-based stacking failure.

Step S2507: acquiring comprehensive pressure data by using a second sensor, and determining, based on the comprehensive pressure data, a pressure-sensing stacking state of the material cage A relative to the material cage B; and when the pressure-sensing stacking state is pressure-sensing stacking success, determining that the material cage A is successfully stacked onto the material cage B; when the pressure-sensing stacking state is pressure-sensing stacking failure, determining that the material cage A fails to be stacked onto the material cage B.

The foregoing describes specific embodiments of this specification. Other embodiments fall within the scope of the appended claims. In some cases, actions or steps defined in the claims may be performed in an order other than those described in the embodiments, while still bringing desired results. In addition, the desired results do not require a process illustrated in the drawings to necessarily follow the shown specific order or sequential order. In some implementations, multitasking and parallel processing are also possible or may be advantageous.

According to another embodiment, a controller is provided. The controller is configured to execute program instructions to implement any method disclosed in embodiments of the present disclosure.

According to another embodiment, material handling equipment is further provided, including a controller, configured to execute program instructions to implement any method disclosed in embodiments of the present disclosure.

Embodiments in this specification are all described in a progressive manner, for same or similar parts in embodiments, mutual reference may be made. Each embodiment focuses on what is different from other embodiments. Especially, embodiments for stacking apparatuses of stacking objects are basically similar to method embodiments, and therefore are described briefly; and for related parts, reference may be made to partial descriptions in the method embodiments. The embodiments for stacking apparatuses of stacking objects described above are merely an example. The units described as separate parts may be or may not be physically separate, and parts displayed as units may be or may not be physical units, that is, may be located at one position, or may be distributed on a plurality of network units. Some or all of the modules may be selected according to an actual need to achieve the objectives of the solutions of the embodiments. A person of ordinary skill in the art may understand and implement embodiments of the present disclosure without creative efforts.

In addition, an embodiment of the present disclosure further provides a computer-readable storage medium, where the computer-readable storage medium stores a computer program. When the program is executed by a processor, the steps of the method in any one of the foregoing method embodiments are implemented.

The present disclosure further provides a computer program product, including a computer program. When the computer program is executed by a processor, the method in any one of the foregoing method embodiments is implemented.

According to specific embodiments provided in the present disclosure, the present disclosure discloses the following technical effects.

In the present disclosure, a controller may acquire target data of two stacking objects by using a first sensor, and extract first target data of a first stacking object and second target data of a second stacking object from the target data. Further, the controller may calculate a relative pose of the first stacking object relative to the second stacking object, and control, based on the relative pose, material handling equipment to move, to align the first stacking object with the second stacking object. Compared with an existing solution, in the present disclosure, a relative pose between two stacking objects is corrected by simultaneously acquiring and processing target data of the two stacking objects, thereby significantly improving accuracy and efficiency of a stacking operation.

Certainly, any invention of the present disclosure is not necessarily required to achieve all of the advantages described above.

Based on the foregoing descriptions of the implementations, a person skilled in the art may clearly understand that the present disclosure may be implemented by software in addition to a necessary universal hardware platform. Based on such an understanding, the technical solutions in the present disclosure essentially, or the part contributing to the conventional technology may be implemented in a form of a computer program product. The computer program product may be stored in a storage medium, for example, a ROM/RAM, a magnetic disk, or an optical disc.

The technical solutions provided in the present disclosure are described above in detail. The principles and implementations of the present disclosure are described herein by using specific examples. The descriptions about embodiments of the present disclosure are merely provided to help understand the methods and core ideas of the present disclosure. In addition, a person of ordinary skill in the art can make variations to the present disclosure in terms of the specific implementations and application scopes according to the ideas of the present disclosure.

Therefore, the content of this specification shall not be construed as a limitation on the present disclosure.

What is claimed is:

1. A material handling equipment, comprising a controller, wherein the controller is configured to execute program instructions to implement following steps:
   acquiring a distance in a first direction between a material handling equipment body and a stacking end point in real time;
   controlling only the material handling equipment body to move when the distance in the first direction between the material handling equipment body and the stacking end point is greater than a preset first distance threshold; and
   controlling a fork to move in a second direction while controlling the material handling equipment body to move when the distance in the first direction between the material handling equipment body and the stacking end point is not greater than the first distance threshold.

2. The material handling equipment according to claim 1, wherein the controller is further configured to implement following steps:
   controlling, based on the distance in the first direction between the material handling equipment body and the stacking end point, a moving speed of the material handling equipment body and/or a moving speed of the fork.

3. The material handling equipment according to claim 1, wherein the stacking end point is a position where the material handling equipment is located when a first stacking object and a second stacking object are aligned.

4. The material handling equipment according to claim 2, wherein the controlling, based on the distance in the first direction between the material handling equipment body and the stacking end point, the moving speed of the material handling equipment body and/or the moving speed of the fork comprises:
   when the distance in the first direction between the material handling equipment body and the stacking end point is less than a second distance threshold, controlling the moving speed of the material handling equipment body to be less than a first speed threshold, and/or controlling the moving speed of the fork to be less than a second speed threshold;
   wherein the second distance threshold is greater than the first distance threshold.

5. The material handling equipment according to claim 4, wherein the first distance threshold is 15 cm, the second distance threshold is 30 cm, the first speed threshold is 5 cm/s, and the second speed threshold is 5 cm/s.

6. The material handling equipment according to claim 1, wherein the controlling the fork to move in the second direction while controlling the material handling equipment body to move comprises:
   calculating a second-directional error of the material handling equipment body relative to a second stacking object, and calculating a second-directional target value of the fork based on the second-directional error of the material handling equipment body; and
   calculating a first-directional error of the material handling equipment body relative to the second stacking object, and controlling, based on the first-directional error, the material handling equipment body to move until the first-directional error of the first direction is within a preset first-directional threshold range; and
   controlling, based on the second-directional target value, the fork to move in the second direction, to make a second-directional error of the fork relative to the second stacking object be within a preset second-directional threshold range.

7. The material handling equipment according to claim 6, wherein the first-directional threshold range is (−3, 3) mm.

8. The material handling equipment according to claim 6, wherein the second-directional threshold range is (−3, 3) mm.

9. The material handling equipment according to claim 6, wherein the controller is further configured to implement following steps:
   acquiring a pose of the material handling equipment body, a coordinate axis position of the fork in the second direction and a pose of the second stacking object.

10. The material handling equipment according to claim 9, wherein the calculating the second-directional error of the material handling equipment body relative to the second stacking object comprises:
    calculating the second-directional error of the material handling equipment body relative to the second stacking object based on the pose of the material handling equipment body and the pose of the second stacking object.

11. The material handling equipment according to claim 9, wherein the calculating the second-directional target value of the fork based on the second-directional error comprises:
    adding the second-directional error of the material handling equipment body relative to the second stacking object to the coordinate axis position of the fork in the second direction to obtain the second-directional target value of the fork.

12. The material handling equipment according to claim 6, wherein
   the controller is further configured to implement following steps:
   acquiring a current pose of a first stacking object;
   determining coordinates of at least one corner of the first stacking object based on the current pose of the first stacking object and a size of the first stacking object;
   acquiring a current pose of the second stacking object;
   determining coordinates of at least one corner of the second stacking object based on the current pose of the second stacking object and a size of the second stacking object,
   wherein the at least one corner of the first stacking object corresponds to the at least one corner of the second stacking object in one-to-one correspondence;
   calculating a coordinate difference between the coordinates of the at least one corner of the first stacking object and the corresponding coordinates of the at least one corner of the second stacking object; and
   when the coordinate difference is within a third preset threshold range, determining alignment of the first stacking object and the second stacking object to be alignment success; and
   when the coordinate difference is not within the third preset threshold range, determining the alignment of the first stacking object and the second stacking object to be alignment failure.

13. The material handling equipment according to claim 12, wherein the controller is further configured to implement following steps:
    determining a target pose of the material handling equipment body based on a relative pose of the first stacking object relative to the second stacking object when the alignment of the first stacking object and the second stacking object is determined to be the alignment failure;

controlling the material handling equipment body to move, to adjust a pose of the material handling equipment body to the target pose;

acquiring target data of the first stacking object by using a first sensor;

re-determining, based on the target data of the first stacking object, the current pose of the first stacking object;

re-determining the relative pose of the first stacking object relative to the second stacking object based on the pose of the first stacking object that is re-determined and the current pose of the second stacking object presented when the alignment is determined to be the alignment failure; and determining, based on the re-determined relative pose, whether the first stacking object and the second stacking object are aligned.

14. The material handling equipment according to claim 12, wherein the controller is further configured to implement following steps:

controlling the material handling equipment body to move to a stacking operation position when the alignment of the first stacking object and the second stacking object is determined to be the alignment failure, and acquiring target data of the first stacking object and the second stacking object by using a first sensor; and controlling the material handling equipment body and the fork to adjust a poses of the material handling equipment body and the fork, to re-align the first stacking object with the second stacking object.

15. The material handling equipment according to claim 12, wherein the controller is further configured to implement following steps:

counting a quantity of alignment failures, and outputting an alarm prompt when the quantity of alignment failures is greater than a first preset quantity of times.

16. The material handling equipment according to claim 12, wherein the controller is further configured to implement following steps:

determining a target pose of the material handling equipment body based on a relative pose of the first stacking object relative to the second stacking object when the alignment of the first stacking object and the second stacking object is determined to be the alignment failure;

controlling the material handling equipment body to move, to adjust a pose of the material handling equipment body to the target pose;

acquiring target data of the first stacking object and the second stacking object by using a first sensor;

re-determining the relative pose of the first stacking object relative to the second stacking object based on the target data; and determining, based on the re-determined relative pose, whether the first stacking object and the second stacking object are aligned.

17. The material handling equipment according to claim 16, wherein the controlling the material handling equipment body to move, to adjust the pose of the material handling equipment body to the target pose comprises:

controlling the material handling equipment body to move to a first preset position; and controlling the material handling equipment body to move from the first preset position to a position corresponding to the target pose.

18. The material handling equipment according to claim 12, wherein the controller is further configured to implement following steps:

acquiring target data of the first stacking object and the second stacking object by using a first sensor when alignment of the first stacking object and the second stacking object is determined to be the alignment failure; and controlling the material handling equipment body and the fork to adjust a poses of the material handling equipment body and the fork, to align the first stacking object with the second stacking object again.

19. The material handling equipment according to claim 18, wherein before the acquiring the target data of the first stacking object and the second stacking object by using the first sensor, the controller is further configured to implement following steps:

controlling the material handling equipment to transport the first stacking object to a stacking preparation position;

acquiring fourth target data of the second stacking object by using the first sensor;

determining a pose of the second stacking object based on the fourth target data; and controlling, based on the pose of the second stacking object, the material handling equipment body to move, to make a pose error of the material handling equipment body relative to the second stacking object be within a first preset threshold range.

20. A controller, configured to execute program instructions to implement following steps:

acquiring a distance in a first direction between a material handling equipment body and a stacking end point in real time;

controlling only the material handling equipment body to move when the distance in the first direction between the material handling equipment body and the stacking end point is greater than a preset first distance threshold; and controlling a fork to move in a second direction while controlling the material handling equipment body to move when the distance in the first direction between the material handling equipment body and the stacking end point is not greater than the first distance threshold.

21. A controlling method for material handling equipment, comprising:

acquiring a distance in a first direction between a material handling equipment body and a stacking end point in real time;

controlling only the material handling equipment body to move when the distance in the first direction between the material handling equipment body and the stacking end point is greater than a preset first distance threshold; and controlling a fork to move in a second direction while controlling the material handling equipment body to move when the distance in the first direction between the material handling equipment body and the stacking end point is not greater than the first distance threshold.

* * * * *